(12) United States Patent
Sato

(10) Patent No.: US 12,345,594 B2
(45) Date of Patent: Jul. 1, 2025

(54) ECCENTRICITY MEASUREMENT METHOD AND ECCENTRICITY MEASUREMENT DEVICE

(71) Applicant: OLYMPUS CORPORATION, Tokyo (JP)

(72) Inventor: Yosuke Sato, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 85 days.

(21) Appl. No.: 18/287,572

(22) PCT Filed: Apr. 20, 2021

(86) PCT No.: PCT/JP2021/016020
§ 371 (c)(1),
(2) Date: Oct. 19, 2023

(87) PCT Pub. No.: WO2022/224344
PCT Pub. Date: Oct. 27, 2022

(65) Prior Publication Data
US 2024/0385074 A1    Nov. 21, 2024

(51) Int. Cl.
*G01M 11/02* (2006.01)
*G01B 11/27* (2006.01)

(52) U.S. Cl.
CPC ......... *G01M 11/0221* (2013.01); *G01B 11/27* (2013.01)

(58) Field of Classification Search
CPC .... G01M 11/0221; G01M 11/00; G01B 11/27
(Continued)

(56) References Cited

U.S. PATENT DOCUMENTS 5,548,396 A * 8/1996 Morita ............... G01M 11/0221
356/127
5,844,670 A * 12/1998 Morita ................. G01M 11/025
356/127
(Continued)

FOREIGN PATENT DOCUMENTS

JP          2621119 B2    6/1997
JP       2002048673 A    2/2002
(Continued)

OTHER PUBLICATIONS

International Search Report dated Jul. 13, 2021 issued in PCT/JP2021/016020.

*Primary Examiner* — Isiaka O Akanbi
(74) *Attorney, Agent, or Firm* — Scully, Scott, Murphy & Presser, P.C.

(57) ABSTRACT

An eccentricity measurement method includes first to eighth steps. In the first step, an eccentricity measurement device for relatively linearly moving an optical image for measurement to an optical unit under test and acquiring an image on an observed surface orthogonal to a reference axis defined by a relative movement trajectory of the optical image is provided. In the second step, a position of a reference point is identified. In the third step, an optical unit under test is arranged. In the fourth step, the optical image is projected onto a projection position on the reference axis and a reflected image reflected on the surface under test is formed at an observation position where a distance from the projection position is a set value L. In the fifth step, a measurement image is acquired. In the sixth step, an image of the reflected image is identified. In the seventh step, an amount of positional deviation of the image of the reflected image is (Continued)

measured. In the eighth step, an amount of eccentricity of the apparent spherical center of the surface under test is calculated.

19 Claims, 25 Drawing Sheets

(58) Field of Classification Search
USPC .......................... 356/512, 73, 127, 138, 128
See application file for complete search history.

(56) References Cited

U.S. PATENT DOCUMENTS

| | | | | |
|---|---|---|---|---|
| 2003/0214646 | A1* | 11/2003 | Ito | B29D 11/00942 |
| | | | | 356/124 |
| 2005/0128468 | A1* | 6/2005 | Murata | G01M 11/0221 |
| | | | | 356/127 |
| 2005/0264795 | A1* | 12/2005 | Murata | G01M 11/0221 |
| | | | | 356/127 |
| 2013/0010286 | A1 | 1/2013 | Zhao et al. | |
| 2013/0027692 | A1* | 1/2013 | Ogura | G01M 11/0221 |
| | | | | 356/127 |
| 2015/0089789 | A1* | 4/2015 | Nagayama | G01M 11/0221 |
| | | | | 29/525.01 |
| 2024/0085269 | A1* | 3/2024 | Sugimoto | G01B 9/0209 |

FOREIGN PATENT DOCUMENTS

| | | |
|---|---|---|
| JP | 2005003667 A | 1/2005 |
| JP | 2005114404 A | 4/2005 |
| JP | 2006112896 A | 4/2006 |
| JP | 2008298739 A | 12/2008 |
| JP | 2009281980 A | 12/2009 |
| JP | 2010096516 A | 4/2010 |
| JP | 2010127828 A | 6/2010 |
| JP | 2020060480 A | 4/2020 |

* cited by examiner

ECCENTRICITY MEASUREMENT METHOD AND ECCENTRICITY MEASUREMENT DEVICE

TECHNICAL FIELD

The present invention relates to an eccentricity measurement method and an eccentricity measurement device.

BACKGROUND ART

When it is difficult to obtain required optical performance in a process of manufacturing an optical unit including a plurality of lenses, there is a possibility that eccentricity of a lens surface will be caused. Thus, there is a need for an eccentricity measurement method and an eccentricity measurement device capable of accurately measuring eccentricity of each lens surface of the optical unit in an assembled state.

For example, Patent Document 1 describes an eccentricity measurement device capable of measuring eccentricity of each lens surface of an optical unit in an assembled state. In the eccentricity measurement device described in Patent Document 1, an autocollimation method is used. In the autocollimation method, an optical image called an "index (image)" is projected onto an apparent spherical center of a surface under test in an optical system under test and the eccentricity of each surface under test is measured by measuring an amount of deviation of a reflected image.

CITATION LIST

Patent Document

Patent Document 1

Japanese Patent No. 2621119

SUMMARY OF INVENTION

Technical Problem

For example, in the objective optical system of an endoscope, a lens having strong negative power is arranged at a front tip and positions of apparent spherical centers of surfaces are close together. Moreover, the endoscope has a large structure that makes fixation difficult and the measurement of eccentricity to be performed generally by rotating the object under test with high accuracy is difficult.

When such an optical system is measured using an autocollimation method (an equal magnification method) disclosed in Patent Document 1, a large number of reflected images formed on optical surfaces other than the surface under test are observed when a rear surface under test is measured. As a result, measurement is difficult because the reflected image from the surface under test cannot be identified.

On the other hand, technology for performing eccentricity measurement (an unequal magnification method) using a setting where an I-O distance, which is a distance between a projection position of the index image and a formation position of the reflected image in a direction along a reference axis of eccentricity measurement, is not 0 is also conceivable.

However, a method of performing eccentricity measurement in the unequal magnification method without rotating an object under test is not known. For example, a measurement method to be performed without rotating an object under test using an image rotator disclosed in Patent Document 1 is a method applied to an autocollimation method and cannot be applied to the unequal magnification method.

Also, because the method using the image rotator is a method of identifying a reference axis of eccentricity every time the reflected image of each surface under test is observed, measurement is time-consuming.

In recent years, the need for measuring the eccentricity of a lens frame and the eccentricity of an imager assembled on the lens as well as the eccentricity of only the lens that is the assembled lens has increased. However, there is no known eccentricity measurement method in which the eccentricity of the lens frame, the eccentricity of the imager assembled on the lens, and the like can be measured along with the eccentricity of the lens.

The present invention has been made in view of the above-described problems and an objective of the present invention is to provide an eccentricity measurement method and an eccentricity measurement device capable of accurately and quickly measuring an amount of eccentricity of a surface under test without rotating an optical unit under test.

Solution to Problem

According to a first aspect for achieving the above-described object, there is provided an eccentricity measurement method including: a first step of providing an eccentricity measurement device configured to hold an optical unit under test having a surface under test, project an optical image for measurement onto the optical unit under test, and relatively linearly move the projected optical image to the optical unit under test and having a measurement imager configured to acquire an image of an observed surface orthogonal to a reference axis defined by a relative movement trajectory of the projected optical image in air for the optical unit under test; a second step of identifying a position of a reference point corresponding to an intersection between the observed surface and the reference axis in the image acquired by the measurement imager; a third step of arranging the optical unit under test on the reference axis; a fourth step of projecting the optical image onto a projection position on the reference axis and forming a reflected image of the optical image reflected on the surface under test at an observation position set so that a distance from the projection position along the reference axis is a set value L; a fifth step of arranging the observed surface at the observation position, capturing an image of the observed surface using the measurement imager, and acquiring a measurement image; a sixth step of identifying an image of the reflected image at the observation position in the measurement image; a seventh step of measuring an amount of positional deviation from the reference point of the identified image of the reflected image; and an eighth step of calculating an amount of eccentricity of an apparent spherical center of the surface under test for the reference axis on the basis of the amount of positional deviation.

Here, the term "orthogonal" also includes intersections deviating from a right angle due to factors such as various errors. The angle recognized as "orthogonal" herein is 89 degrees or more and 91 degrees or less. However, in order to improve the measurement accuracy, the angle considered to be "orthogonal" is more preferably closer to 90 degrees. For example, the angle considered to be "orthogonal" is more preferably 90 degrees±30 minutes.

According to a second aspect, there is provided an eccentricity measurement device including: a light source unit configured to form an optical image for measurement; a holding table configured to hold an optical unit under test having a surface under test; an optical projection system configured to project the optical image onto the optical unit under test; a moving mechanism configured to movably hold at least one of the light source unit, the optical projection system, and the holding table and relatively linearly move the optical image projected from the optical projection system to the holding table in air; a measurement imager configured to acquire an image of an observed surface orthogonal to a reference axis at an observation position set so that a distance from the projection position of the optical image on the reference axis is a set value L when a relative movement trajectory of the optical image for the holding table formed by the moving mechanism is set as the reference axis; and an eccentricity amount calculation unit configured to measure an amount of positional deviation from a reference point corresponding to an intersection between the observed surface and the reference axis on the basis of the image acquired by the measurement imager at the observation position and calculate an amount of eccentricity of an apparent spherical center of the surface under test for the reference axis on the basis of the amount of positional deviation.

Advantageous Effects of Invention

According to the above-described first and second aspects, it is possible to provide an eccentricity measurement method and an eccentricity measurement device capable of accurately and quickly measuring an amount of eccentricity of a surface under test without rotating an optical unit under test.

DESCRIPTION OF EMBODIMENTS

Hereinafter, embodiments of the present invention will be described with reference to the accompanying drawings. In all drawings, even if the embodiments are different, the same or equivalent members are denoted by the same reference signs and common descriptions are omitted.

First Embodiment

An eccentricity measurement device according to a first embodiment of the present invention will be described.

Figure 1:
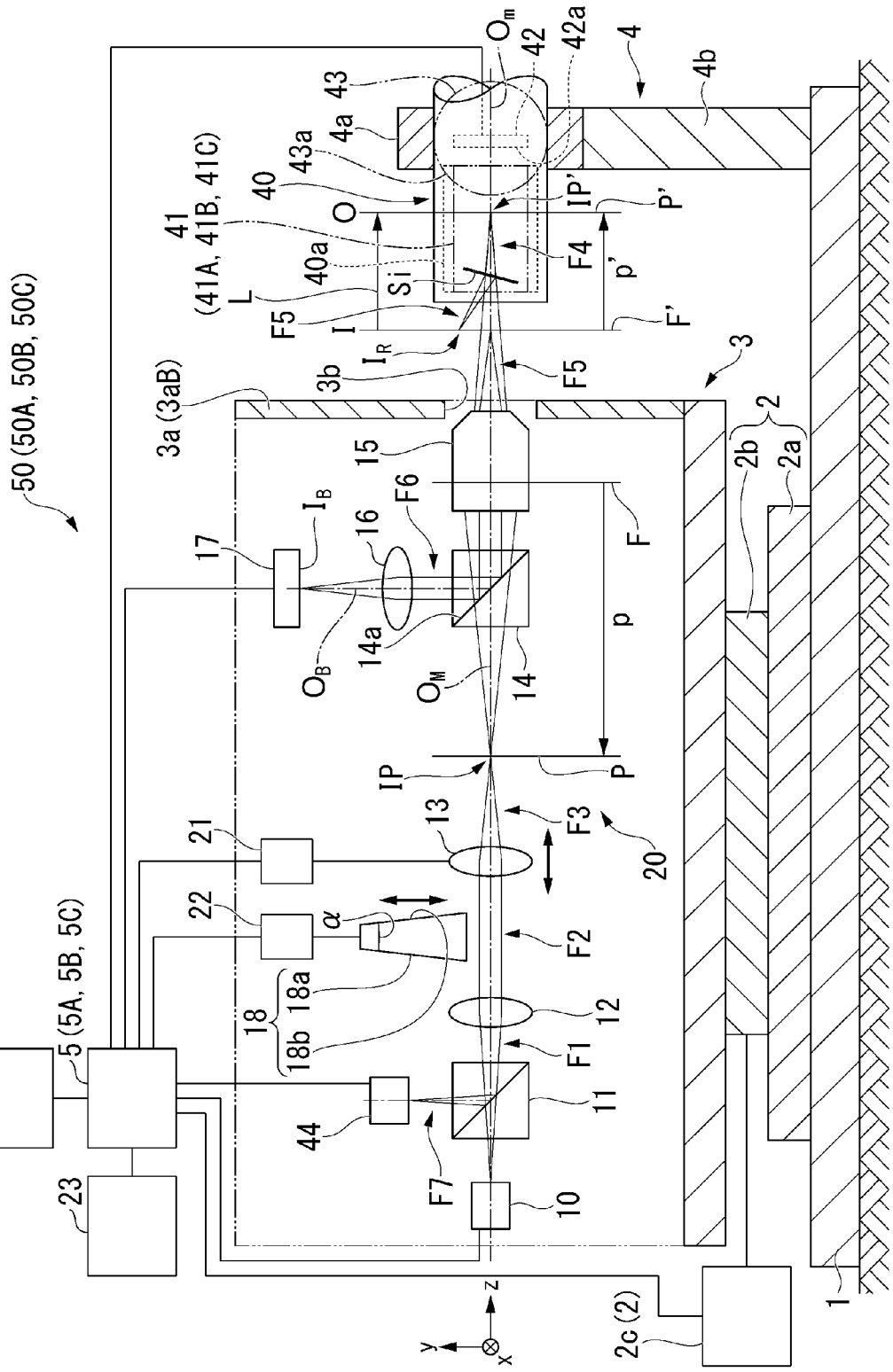
FIG. 1 is a schematic cross-sectional view showing an example of an eccentricity measurement device according to a first embodiment of the present invention.

FIG. 1 is a schematic cross-sectional view showing an example of the eccentricity measurement device according to the first embodiment of the present invention.

An eccentricity measurement device 50 of the present embodiment shown in FIG. 1 can be used for eccentricity measurement of each optical surface in various optical systems including a plurality of lenses. Here, the optical surface is a surface having optical functions such as refraction and reflection in an optical element.

A shape of the optical surface is not particularly limited. For example, the shape of the optical surface may be spherical, aspherical, flat, or the like.

In an optical system of a measurement target, for example, a plurality of optical elements, such as lenses and parallel plates, are appropriately arranged on holding members on the basis of a surface interval based on a design value of the optical system, and are fixed to a holding member.

The eccentricity measurement device 50 can measure the eccentricity of each optical surface in an optical unit (an optical unit under test) in which an optical system of a measurement target (an optical system under test) is assembled into the holding member. In the eccentricity measurement of the optical unit under test, the eccentricity of a measurement target other than the optical surface may be measured.

A type of optical unit under test is not particularly limited.

For example, the optical unit under test may be a lens unit in which a plurality of optical elements including a lens are assembled in a lens barrel. For example, the lens unit may be a lens unit for an endoscope, a lens unit for a camera, a lens unit for a microscope, or the like.

For example, the optical unit under test may be a tip portion of an insertion portion of an endoscope provided with an objective optical system. In this case, a curved portion and a flexible tube portion may be connected in that order on a base end side of the tip portion.

Hereinafter, an example in which the optical unit under test is a tip portion 40 of the insertion portion of the endoscope will be described. A type of endoscope may be a medical endoscope or an industrial endoscope.

An outer shape of the tip portion 40 is cylindrical. The inside of the tip portion 40, the optical system 41 under test and the endoscope imager 42 are fixed.

An optical surface at the tip of the optical system 41 under test is exposed through the opening formed at the tip of the tip portion 40. A configuration of the optical system 41 under test is not particularly limited. For example, the optical system 41 under test may be an objective optical system. Hereinafter, unless otherwise specified, the optical system 41 under test will be described with an example of the objective optical system.

The optical system 41 under test is held on a lens frame 40a arranged inside of the tip portion 40.

The endoscope imager 42 photoelectrically converts an optical image in the image surface of the optical system 41 under test. For example, as the endoscope imager 42, a CCD, a CMOS sensor, or the like may be used.

The eccentricity measurement device 50 includes a base 1, a moving stage 2 (a moving mechanism), a main body portion 3, a holding table 4, and a measurement control unit 5 (an eccentricity amount calculation unit).

The base 1 supports the whole of the eccentricity measurement device 50. The orientation of the arrangement of the base 1 is not particularly limited. An example in which the base 1 is arranged on a horizontal plane will be described below.

The moving stage 2 moves the main body portion 3 containing the optical measurement system 20 to be described below in at least one direction on the base 1. In the example shown in FIG. 1, the moving stage 2 moves the main body portion 3 in at least one axis direction (a left/right direction of FIG. 1) in the horizontal plane.

For example, the moving stage 2 includes a guide 2a, an optical system transport unit 2b, and an optical system transport unit drive unit 2c.

The guide 2a is fixed on the base 1. The guide 2a guides the optical system transport unit 2b to be movable in one axis direction in the horizontal plane.

The optical system transport unit 2b is guided by the guide 2a and provided so that movement is possible in a one-axis direction. The optical system transport unit 2b is fixed to the main body portion 3 and is able to move together with the main body portion 3. As long as the optical system transport unit 2b can move together with the main body portion 3, a fixed position associated with the main body portion 3 is not particularly limited. In the example shown in FIG. 1, the optical system transport unit 2b is fixed to the bottom of the main body portion 3.

The optical system transport unit drive unit 2c supplies a driving force for moving the optical system transport unit 2b. For example, the optical system transport unit drive unit 2c may include a motor and a transmission mechanism that transmits a driving force of the motor to the optical system transport unit 2b.

The optical system transport unit drive unit 2c is communicatively connected to the measurement control unit 5 to be described below. The optical system transport unit drive unit 2c drives the optical system transport unit 2b in accordance with a control signal from the measurement control unit 5.

Hereinafter, a one-axis direction will be described as a direction along a z-axis between an x-axis and the z-axis orthogonal to each other on the horizontal plane. A vertical direction orthogonal to the x-axis and the z-axis is a direction along a y-axis. A positive direction along the z-axis (hereinafter referred to as a positive z-axis direction) is a direction from the main body portion 3 to the holding table 4 to be described below along the z-axis and is a direction from left to right in FIG. 1. A positive direction along the x-axis (hereinafter referred to as a positive x-axis direction) is a direction from right to left along the x-axis when seen in the positive z-axis direction and is a direction from the front side to the back side of the paper surface in FIG. 1. The positive direction along the y-axis (hereinafter referred to as a positive y-axis direction) is a vertical upward direction and is a direction from the bottom to the top in FIG. 1.

Directions opposite to positive directions along the axes are negative directions and are referred to as a negative z-axis direction, a negative x-axis direction, and a negative y-axis direction.

An xyz coordinate system, which is a Cartesian coordinate system based on the x-, y-, and z-axes, is fixed in the eccentricity measurement device 50. The xyz coordinate system is a coordinate system of the measurement system in the eccentricity measurement device 50. When focusing only on the xy plane, it is referred to as an xy coordinate system.

The origin of the xyz coordinate system is arbitrary. Various types of calculations in eccentricity measurement can be performed according to coordinate values of a local coordinate system obtained by moving the xyz coordinate system in parallel as necessary.

The main body portion 3 is a housing movably supported by the moving stage 2 in at least the positive z-axis direction and the negative z-axis direction.

An opening 3b through which light for measurement is transmitted is formed in the front wall 3a provided at the end of the main body portion 3 in the positive z-axis direction.

Inside of the main body portion 3, an optical measurement system 20, a wedge prism 18 (a reflection magnification measurement unit), an observation imager 44, a measurement imager 17, an adjustment lens drive unit 21, and a wedge prism drive unit 22 (a reflection magnification measurement unit) are arranged.

The optical measurement system 20 includes a light source 10 (a light source unit), a beam splitter 11, a collimating lens 12 (a light source unit), an adjustment lens 13 (a light source unit), a beam splitter 14, an image-formation lens 16 (an optical observation system), and an objective lens 15 (an optical projection system and an optical observation system).

The light source 10, the beam splitter 11, the collimating lens 12, the adjustment lens 13, and the objective lens 15 are arranged in that order on an optical axis $O_M$ of the optical measurement system 20. The optical axis $O_M$ of the optical measurement system 20 is adjusted in parallel to the z-axis.

In the present embodiment, a reference axis $O_m$ that serves as a reference for eccentricity measurement is defined by a movement trajectory of the optical image formed by the optical measurement system 20 in the air. The reference axis $O_m$ is a virtual straight-line containing a movement range of the optical image.

When the optical measurement system 20 has no manufacturing error or assembly error and there is no bending in the moving direction due to the moving stage 2, the optical axis $O_M$ is coaxial with the reference axis $O_m$ in the eccentricity measurement of the present embodiment. For simplicity, in the description of the principle related to the optical measurement system 20, unless otherwise specified, the optical axis $O_M$ and the reference axis $O_m$ are described as being coaxial. However, the reference axis $O_m$ of eccentricity measurement may not be coaxial with the optical axis $O_M$. A method of measuring the reference axis $O_m$ in the eccentricity measurement device 50 will be described below.

The collimating lens 12, the adjustment lens 13, the objective lens 15, and the image-formation lens 16 may each be made of a single lens or a plurality of lenses.

The light source 10 generates light for forming an optical image to be projected onto the optical system 41 under test. A type of light source is not particularly limited. For example, a semiconductor laser may be used as the light source 10. A wavelength of the light source 10 is not particularly limited as long as it is a wavelength that can be imaged by the measurement imager 17 and the observation imager 44 to be described below.

In the example shown in FIG. 1, the light source 10 emits a divergent beam F1 along the optical axis $O_M$.

The beam splitter 11 is arranged on an optical path of the divergent beam F1. The beam splitter 11 reflects a beam F7 returning from a projection surface P' to be described below to the light source 10 in a direction intersecting the optical axis $O_M$.

An observation imager 44 is arranged on the optical path of the beam F7 reflected by the beam splitter 11.

The observation imager 44 photoelectrically converts an image based on the beam F7 and transmits the converted image to the measurement control unit 5 to be described below. The imaging surface of the observation imager 44 is arranged at a position optically conjugate to a focal plane F' to be described below. According to the observation imager 44, an image in the focal plane F' can be captured.

The collimating lens 12 is a light-collecting lens arranged at a position where a front focus matches a light-emitting portion of the light source 10. The collimating lens 12 collects the divergent beam F1 and forms a parallel beam F2 traveling along the optical axis $O_M$.

The adjustment lens 13 is a light-collecting lens in which the distance on the optical axis $O_M$ from the collimating lens 12 is arranged changeably on the optical axis $O_M$. The adjustment lens 13 collects the parallel beam F2 to form a beam F3. An image of the beam F3 is formed on the focal plane P of a rear focus of the adjustment lens 13. Thus, an optical image IP (an optical image for measurement) that is a real image of the light-emitting portion of the light source 10 is formed on the focal plane P, in accordance with the magnification of the optical system formed by the collimating lens 12 and the adjustment lens 13. The beam F3 travels as a divergent beam when it passes through the focal plane P.

When the adjustment lens 13 moves in parallel along the optical axis $O_M$, the focal plane P also moves in parallel in a similar way.

The light source 10, the collimating lens 12, and the adjustment lens 13 are examples of light source units that form the optical image IP for measurement.

The beam splitter 14 has a beam splitter surface 14a that transmits the beam F3 traveling in the positive z-axis direction and reflects the beam in a direction in which the optical axis of the beam traveling in the negative z-axis direction intersects the z-axis. In the example shown in FIG. 1, the beam splitter surface 14a reflects an axial beam traveling along the optical axis $O_M$ in the negative z-axis direction as the optical axis $O_B$ in a direction intersecting the optical axis $O_M$.

On the optical axis $O_B$, the image-formation lens 16 facing the beam splitter 14 and the measurement imager 17 facing the beam splitter 14 in a state in which the image-formation lens 16 is sandwiched are arranged.

The focal plane F on which the front focus of the objective lens 15 is located is arranged at the back side of the focal plane P of the adjustment lens 13.

The objective lens 15 collects the beam F3 and forms a measurement beam F4.

The measurement beam F4 is emitted through the opening 3b toward the optical system 41 under test outside of the main body portion 3 and an image of the measurement beam F4 is formed on the projection surface P' (at a projection position) optically conjugate to the focal plane P.

In this way, the objective lens 15 projects the optical image IP as an optical image IP' onto the projection surface P'.

The objective lens 15 is an example of an optical projection system that projects the optical image IP toward the optical system 41 under test.

The measurement beam F4 is incident on the optical system 41 under test from the front side of the optical system 41 under test and is refracted or reflected by each optical surface of the optical system 41 under test.

For example, the measurement beam F4 is refracted on one or more optical surfaces in the optical system 41 under test and then reflected to the front side of the surface Si under test, which is one of the optical surfaces. Thereby, a reflected beam F5 is formed. In this case, the reflected beam F5 is sequentially refracted on each optical surface in front of the surface Si under test through which the measurement beam F4 has been transmitted and an image of the reflected beam F5 is formed thereon and forms a reflected image $I_R$ on the image surface I.

If an optical system formed by a medium and each optical surface in front of the surface Si under test in the optical system 41 under test is referred to as an incidence-side optical system related to the surface Si under test, the incidence-side optical system and the surface Si under test can be replaced with an apparent surface consisting of a single spherical surface with an apparent radius of curvature.

The "apparent spherical center" of the surface Si under test is a point optically conjugate to the spherical center of the surface Si under test in a state in which the incidence-side optical system related to the surface Si under test in the optical system 41 under test is interposed. The apparent spherical center may be referred to as an apparent curvature center of the surface Si under test.

The light incident on the "apparent spherical center" of the surface Si under test from the front side of the optical system 41 under test is refracted by each optical surface of the incidence-side optical system and reaches the spherical center of the surface Si under test.

A position of the apparent spherical center can be calculated from a radius of curvature of each optical surface, a refractive index of each medium, and a spacing between optical surfaces in the surface Si under test and the incidence-side optical system related to the surface Si under test.

The "apparent surface top" of the surface Si under test is a point optically conjugate to the surface top of the surface Si under test in a state in which the incidence-side optical system in the optical system 41 under test is interposed. The surface top of the surface Si under test is an apex of the surface Si under test in the direction along the optical axis $O_M$.

The "apparent radius of curvature" of the surface Si under test is a distance to the "apparent spherical center" of the surface Si under test based on the "apparent surface top" of the surface Si under test. When the "apparent spherical center" of the surface Si under test is on the positive side of the optical axis $O_M$ with respect to the "apparent surface top" of the surface Si under test, the "apparent radius of curvature" is positive.

Hereinafter, when it is necessary to specify that an apparent surface having an apparent radius of curvature is being considered instead of the surface Si under test, it may be written as an "apparent surface si under test."

When the surface Si under test is a foremost optical surface in the optical system 41 under test, it is not necessary to consider the apparent surface of the surface Si under test, but the apparent surface of the surface Si under test is defined as the surface Si under test itself for the sake of simplifying the description. In this case, the apparent radius of curvature, the apparent spherical center, and the apparent surface top match the radius of curvature of the surface Si under test, the spherical center of the surface Si under test, and the surface top of the surface Si under test, respectively.

In the present embodiment, the objective lens 15 is also used for the purpose of observing a reflected image $I_R$. The objective lens 15 collects, for example, the reflected beam F5 traveling from the focal plane F' of the rear focus of the objective lens 15 to the objective lens 15 within a range of a numerical aperture of the objective lens 15. Thereby, a beam F6 traveling toward the beam splitter 14 is formed. However, in FIG. 1, the reflection direction of the reflected beam F5 forming the reflected image $I_R$ is exaggerated for ease of viewing. In fact, when the reflected beam F5 passes through the focal plane F', it diffuses from a position of the reflected image $I_R$ and is collected by incidence performed in the numerical aperture (NA) range of the objective lens 15 to form the beam F6.

The beam F6 travels along the optical axis $O_M$ toward the beam splitter 14 and is reflected on the beam splitter surface 14a of the beam splitter 14. The beam F6 is collected by the image-formation lens 16.

For example, when the focal plane F' of the objective lens 15 matches the image surface I where the reflected image $I_R$ is formed, a real image of the reflected image $I_R$ is formed on an image surface $I_B$ of the image-formation lens 16 which is a surface optically conjugate to the image surface I via the objective lens 15 and the image-formation lens 16.

The objective lens 15 and the image-formation lens 16 cause the focal plane F' of the objective lens 15 and the imaging surface of the measurement imager 17 to be optically conjugate to each other. The objective lens 15 and the image-formation lens 16 are examples of the optical observation system observed by the measurement imager 17. The focal plane F' is an object surface in the optical observation system and has the meaning of an observed surface for acquiring an image by the measurement imager 17. Hereinafter, when it is emphasized that the focal plane F' is an observed surface of the optical observation system, the focal plane F' may be referred to as the observed surface F'.

In the objective lens 15 and the image-formation lens 16, when the observed surface F' is aligned with the image surface I of the reflected image $I_R$ reflected by the surface Si under test, the reflected image $I_R$ can be observed with the measurement imager 17. At this time, the optical observation system also makes the imaging surface and the projection position of the measurement imager 17 optically conjugate to each other.

The image magnification of the reflected image $I_R$ formed on the image surface $I_B$ via the optical observation system with respect to the reflected image $I_R$ in the observed surface F' is determined in accordance with the optical observation system.

The optical path of the parallel beam F2 between the collimating lens 12 and the adjustment lens 13 is between the light source unit and the projection position and is an example of a parallel optical path that forms a parallel beam on an optical path different from an optical path of an optical observation system for causing the measurement imager and the projection position to be optically conjugate to each other.

In a state in which the position of the adjustment lens 13 in the direction along the optical axis $O_M$ is fixed in the optical measurement system 20, when the main body portion 3 is moved in the direction along the optical axis $O_M$ using the moving stage 2, the optical image IP' and the observed surface F' move integrally without changing a distance in the direction along the optical axis $O_M$. Because the reflected image $I_R$ and the optical image IP' are optically conjugate to each other in a state in which the incidence-side optical system and the surface Si under test are interposed, the position of the image surface I in the direction along the optical axis $O_M$ is a function of the position of the projection surface P' in the direction along the optical axis $O_M$.

Thus, the moving stage 2 is an example of a moving mechanism that holds the light source unit and the optical projection system included in the optical measurement system 20 movably without changing their relative positions and relatively linearly moves the optical image projected from the optical projection system to the holding table in the air.

Thereby, in accordance with the position in the direction along the optical axis $O_M$ of the optical image IP' for the optical system 41 under test, a position in a direction along the optical axis $O_M$ of the image surface I on which the reflected image $I_R$ reflected and produced by the surface Si under test is formed changes.

When the optical image IP' is at a specific position, the reflected image $I_R$ appears on the observed surface F'. Thus, the image surface I and the focal plane F' can be matched by appropriately setting the position of the projection surface P' in the direction along the optical axis $O_M$ by the moving stage 2.

In the present embodiment, it is possible to change a distance between the projection surface P' and the observed surface F' by moving the adjustment lens 13 in the direction along the optical axis $O_M$ and changing the position of the focal plane P of the adjustment lens 13.

For example, if a distance obtained through conversion into an air length from the focal plane F of the objective lens 15 to the focal plane P of the adjustment lens 13 is denoted by p and a distance from the focal plane F' of the objective lens 15 to the projection surface P' is denoted by p', p and p' are related to a focal length $f_T$ of the objective lens 15 according to Newton's image-formation formula. That is, $pp'=-f_T^2$. Here, if p'=L, L is calculated according to the following Eq. (1).

[Math. 1]

$$L = -\frac{f_T^2}{p} \quad (1)$$

The measurement imager 17 for photoelectric conversion of the optical image in the image surface $I_B$ is arranged on the image surface $I_B$ of the image-formation lens 16.

The measurement imager 17 is not particularly limited as long as it is a photoelectric conversion element that is sensitive to the wavelength of the beam F6 and can resolve the reflected image $I_R$ with required resolution. For example, as the measurement imager 17, a CCD, a CMOS sensor, or the like may be used.

An image signal of the image after a photoelectrical conversion process performed by the measurement imager 17 is transmitted to the measurement control unit 5 to be described below.

As the image-formation lens 16 and the measurement imager 17, for example, a digital camera may be used.

In the present embodiment, as will be described below, the projection surface P' which is the projection position is set at a position shifted along the optical axis $O_M$ from both the apparent spherical center and the design value of the surface top of the surface Si under test. Because the projection surface P' and the image surface I are shifted in a direction along the optical axis $O_M$, it is possible to observe the image surface I by setting the set value of the distance to the projection surface P' based on the observed surface F' in the direction along the optical axis $O_M$ to L (where L≠0). Hereinafter, a distance to the projection surface P' based on the observed surface F' in the direction along the optical axis $O_M$ is referred to as an I-O distance. The I-O distance whose set value is set to L may be referred to as an I-O distance L.

Herein, it is assumed that the sign of the set value L of the I-O distance is positive in a direction from the eccentricity measurement device 50 to the optical system 41 under test.

On the other hand, for example, in the conventional autocollimation method, the projection surface P' is set at a position passing through the apparent spherical center of the surface Si under test. In this case, the I-O distance is 0.

The wedge prism 18 has a first surface 18a and a second surface 18b inclined by a wedge angle α with respect to the first surface 18a. An inter-surface distance between the first surface 18a and the second surface 18b gradually changes in an inclination direction of the second surface 18b.

The wedge prism 18 is arranged so that it can advance toward the optical path of the parallel beam F2 and retreat between the collimating lens 12 and the adjustment lens 13. When the wedge prism 18 enters the optical path of the parallel beam F2, the parallel beam F2 is incident on the first surface 18a and is emitted from the second surface 18b. At this time, according to the refraction function of the wedge prism 18, the optical path of the parallel beam F2 is inclined to the side where an inter-surface distance between the first surface 18a and the second surface 18b increases with respect to the optical axis $O_M$.

Thereby, the optical image IP' in the projection surface P' is shifted in a direction orthogonal to the optical axis $O_M$.

A direction in which the wedge prism 18 shifts the optical image IP' is not particularly limited. For example, the wedge prism 18 may shift the optical image IP' in the x-axis direction, the y-axis direction, or a direction different from the x-axis direction and the y-axis direction. A direction in which the wedge prism 18 shifts the optical image IP' may be constant or may be changeable.

A ray deflection angle (ray deviation) of the wedge prism 18 is preferably, for example, about 1 mrad.

The adjustment lens drive unit 21 moves the adjustment lens 13 in a direction along the optical axis $O_M$. The adjustment lens drive unit 21 may include, for example, a motor and a transmission mechanism that transmits the driving force of the motor to the adjustment lens 13 or the holding member of the adjustment lens 13.

The adjustment lens drive unit 21 is communicatively connected to the measurement control unit 5 to be described below and moves the adjustment lens 13 on the basis of a control signal from the measurement control unit 5.

The wedge prism drive unit 22 moves the wedge prism 18 in a direction orthogonal to the optical axis $O_M$ and switches a position between a retreat position where the wedge prism 18 retreats from the optical path of the parallel beam F2 and an entry position where the wedge prism 18 enters the optical path of the parallel beam F2. A direction in which the wedge prism 18 at the entry position shifts the optical image IP' is not particularly limited.

The configuration of the wedge prism drive unit 22 is not particularly limited as long as the position of the wedge prism 18 can be switched between the retreat position and the entry position. For example, the wedge prism drive unit 22 may be a solenoid that moves the wedge prism 18 or the holding member of the wedge prism 18. For example, the wedge prism drive unit 22 may include a motor and a transmission mechanism that transmits the driving force of the motor to the wedge prism 18 or the holding member of the wedge prism 18.

The wedge prism drive unit 22 is communicatively connected to the measurement control unit 5 to be described below and moves the wedge prism 18 on the basis of a control signal from the measurement control unit 5.

The holding table 4 holds an optical unit under test such as the tip portion 40. The holding table 4 includes a base body 4b and a holder 4a provided at the upper end of the base body 4b via an adjustment stage.

The holder 4a is provided so that it can be moved in a direction intersecting at least the z-axis by the adjustment stage. The adjustment stage may be capable of adjusting an inclination with respect to the z-axis.

The holder 4a holds the optical unit under test so that it is detachable therefrom. For example, when the optical unit under test is the tip portion 40 that includes the optical system 41 under test, the holder 4a can hold the tip portion 40 so that the optical axis $O_M$ on the design of the optical system 41 under test is along the z-axis. The holder 4a can hold the tip portion 40 in a direction in which the tip of the tip portion 40 faces the main body portion 3.

The holding table 4 may be arranged on the base 1 or at a position away from the base 1 if the position for the main body portion 3 is fixed at the time of eccentricity measurement. In the example shown in FIG. 1, the holding table 4 is arranged on the base 1.

Figure 2:
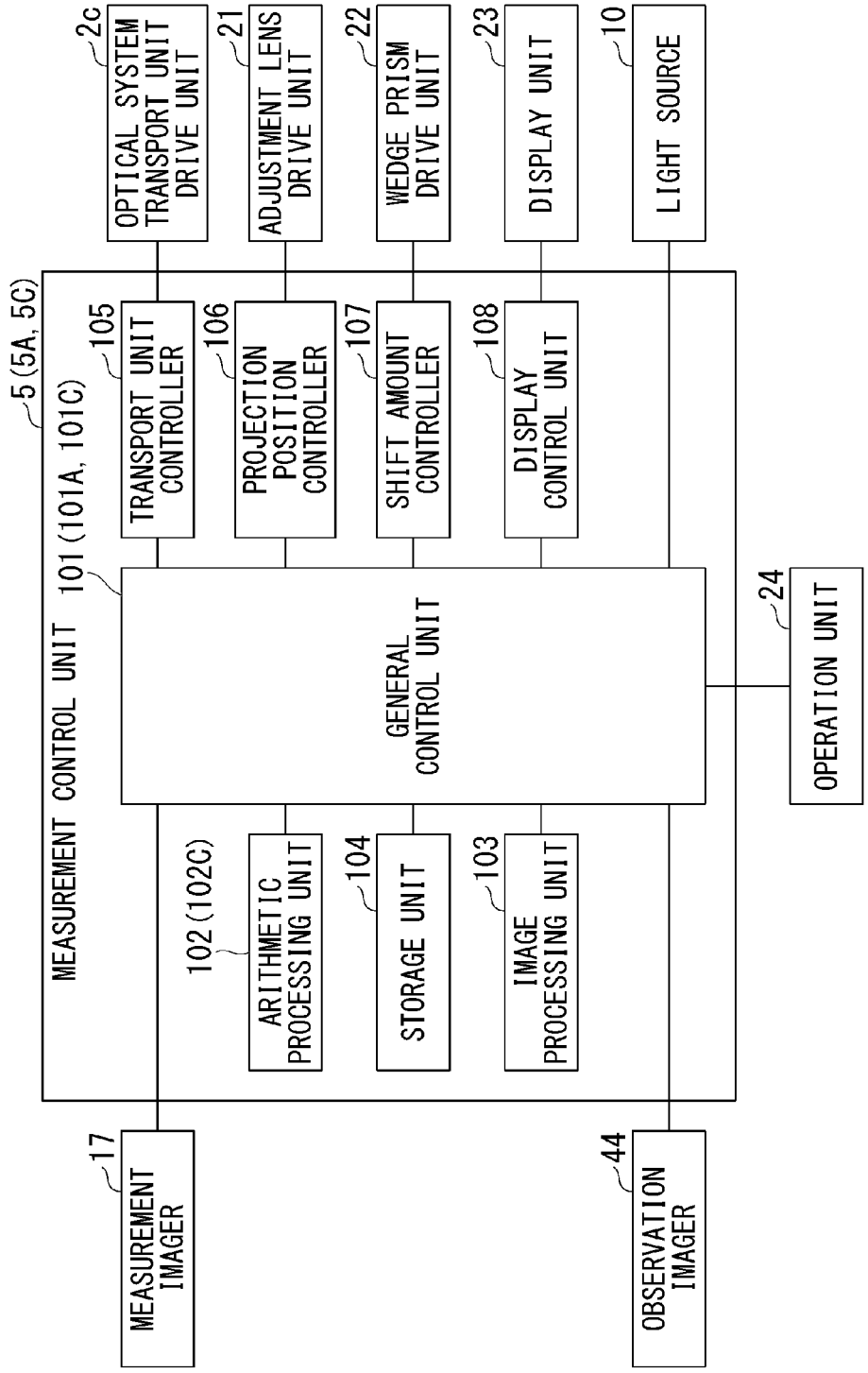
FIG. 2 is a block diagram of a control system in the eccentricity measurement device according to the first embodiment of the present invention.

FIG. 2 is a block diagram of a control system in an eccentricity measurement device according to the first embodiment of the present invention.

As shown in FIG. 2, the measurement control unit 5 includes a general control unit 101, an arithmetic processing unit 102, an image processing unit 103, a storage unit 104, a transport unit controller 105, a projection position controller 106, a shift amount controller 107, and a display control unit 108.

The general control unit 101 is communicatively connected to the operation unit 24. The general control unit 101 controls the entire operation of the eccentricity measurement device 50 in accordance with an operation input from the operation unit 24.

The operation unit 24 includes an appropriate input device for enabling the operator to input an operation, such as, for example, a keyboard, a touch panel, and an operation switch.

The general control unit 101 is electrically connected to the light source 10. The general control unit 101 performs control of on/off of the light source 10 and light intensity control on the basis of the operation input from the operation unit 24.

The general control unit 101 is communicatively connected to the measurement imager 17 and the observation imager 44. The general control unit 101 acquires image signals transmitted by the measurement imager 17 and the observation imager 44.

The general control unit 101 is communicatively connected to each of the arithmetic processing unit 102, the image processing unit 103, the storage unit 104, the transport unit controller 105, the projection position controller 106, the shift amount controller 107, and the display control unit 108.

The arithmetic processing unit 102 performs an arithmetic process on the basis of the control signal from the general control unit 101. The arithmetic process performed by the arithmetic processing unit 102 is not particularly limited as long as it is necessary for measurement in the eccentricity measurement device 50. For example, examples of the arithmetic process performed by the arithmetic processing unit 102 include various types of calculations based on design values of the optical system 41 under test stored in the storage unit 104 in advance, and the calculation of the eccentricity amount based on a measured value of an amount of deviation to be described below.

The image processing unit 103 performs image processing based on the image signal acquired from the measurement imager 17. Examples of image processing performed by the image processing unit 103 include image processing for obtaining the center position of the reflected image $I_R$ on the basis of the image captured by the measurement imager 17, image processing for obtaining dimensions of a magnification measurement unit to be described below from the image when the reflected image $I_R$ has the magnification measurement unit, and the like.

The storage unit 104 stores, for example, data input through the operation unit 24 and the measurement imager 17, data calculated and generated by the arithmetic processing unit 102 and the image processing unit 103, and the like. The storage unit 104 includes, for example, one or more appropriate storage media such as a memory, a hard disk, and a removable storage medium.

The transport unit controller 105 controls a movement amount and a moving direction of the main body portion 3 by the moving stage 2 on the basis of the control signal from the general control unit 101.

The transport unit controller 105 is communicatively connected to the optical system transport unit drive unit 2c. By transmitting a control signal to the optical system transport unit drive unit 2c, the optical system transport unit 2b is driven and the main body portion 3 is moved in the z-axis direction.

The projection position controller 106 is communicatively connected to the adjustment lens drive unit 21. The projection position controller 106 controls the movement amount and the moving direction of the adjustment lens 13 by the adjustment lens drive unit 21 on the basis of the control signal from the general control unit 101. By moving the adjustment lens 13 along the optical axis $O_M$, a position onto which the optical image IP' is projected moves along the optical axis $O_M$.

The control signal transmitted from the general control unit 101 to the projection position controller 106 is mainly transmitted for the purpose of adjusting the I-O distance to be described below to the set value. However, the control signal from the general control unit 101 is not limited to the purpose of setting the I-O distance. The general control unit 101 can transmit a control signal for moving the optical image IP' to an appropriate position to the projection position controller 106 as necessary for measurement.

The shift amount controller 107 is communicatively connected to the wedge prism drive unit 22. The shift amount controller 107 drives the wedge prism drive unit 22 on the basis of the control signal from the general control unit 101 and selectively switches the position of the wedge prism 18 between the retreat position and the entry position.

For example, the display control unit 108 is communicatively connected to the display unit 23 including a display or the like. The display control unit 108 controls a display process of the display unit 23 on the basis of the control signal from the general control unit 101.

The display unit 23 displays various images related to eccentricity measurement such as, for example, images acquired by the general control unit 101 from the measurement imager 17 and the endoscope imager 42, an image generated by the image processing unit 103, and an image acquired by the general control unit 101 from the observation imager 44. Further, various information related to eccentricity measurement such as optical design information of the optical system 41 under test and numerical information calculated by the arithmetic processing unit 102 is displayed on the display unit 23.

Details of the control of each part in the measurement control unit 5 will be described in the description of the operation of the eccentricity measurement device 50.

A device configuration of the measurement control unit 5 includes a computer including a CPU, a memory, an input/output interface, an external storage device, and the like. In the computer included in the measurement control unit 5, an appropriate control program for implementing the control operation of the measurement control unit 5 is loaded and executed. The measurement control unit 5 may include appropriate hardware in addition to the computer.

Next, an eccentricity measurement method according to the present embodiment that can be performed using the eccentricity measurement device 50 will be described together with the operation of the eccentricity measurement device 50.

First, an optical system 41A under test, which is a specific example of the optical system 41 under test to be referred to in the following description, will be described.

Figure 3:
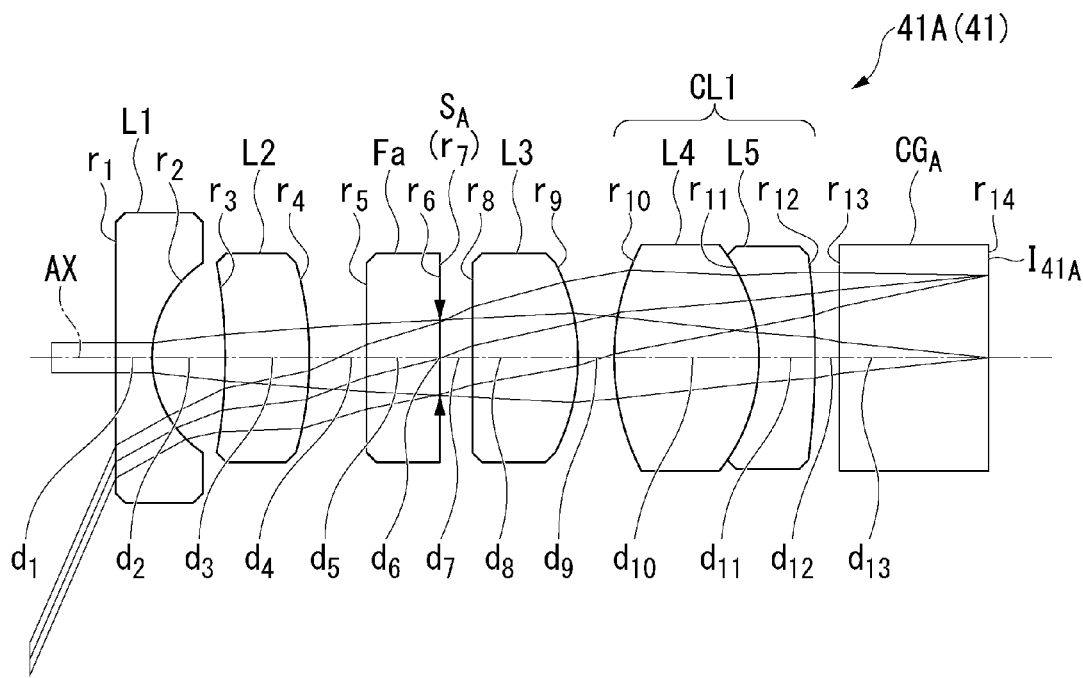
FIG. 3 is a cross-sectional view showing an example of an optical system under test.

FIG. 3 is a cross-sectional view showing an example of the optical system under test.

As shown in FIG. 3, in the optical system 41A under test, in a direction from an object side to an image side, a first lens L1, a second lens L2, an infrared absorption filter Fa, an aperture stop $S_A$, a third lens L3, a fourth lens L4, a fifth lens L5, and a cover glass $CG_A$ are arranged in that order.

$I_{41A}$ denotes an image surface of the optical system 41A under test. An imaging surface of the endoscope imager 42 is arranged in $I_{41A}$.

The first lens L1 is a negative lens of a plano-concave with a plane facing the object side.

The second lens L2 is a positive meniscus lens with a convex surface facing the image side.

The infrared absorption filter Fa is a parallel flat plate in which an infrared cut coating for a YAG laser is applied to the object side and an infrared cut coating for a semiconductor laser (LD) is applied to the image side.

The aperture stop $S_A$ is formed in the plane on the image side of the infrared absorption filter Fa.

The third lens L3 is a positive lens of a plano-convex with a plane facing the object side.

The fourth lens L4 is a positive lens of a biconvex.

The fifth lens L5 is a negative meniscus lens with a convex surface facing the image side.

Here, the fourth lens L4 and the fifth lens L5 are bonded lenses in which the lens surface on the image side of the fourth lens L4 and the lens surface on the object side of the fifth lens L5 are bonded to each other.

The cover glass $CG_A$ is a parallel plate that covers the imaging surface of the endoscope imager 42 from the object side.

The following [Table A] shows numerical data of design values of the optical system 41A under test. In [Table A], the field of r indicates the radius of curvature (mm) of each lens surface, the field of d indicates a surface interval between the lens surfaces (mm), the field of ne indicates a refractive index of an e-line of each lens, the field of V is a position (mm) of an apparent surface top, the field of R indicates an apparent radius (mm) of curvature, the field of SC indicates a position (mm) of an apparent spherical center, Fno indicates an F-number, and the stop is an aperture stop.

A position $V_s$ (see FIG. 4) of an apparent surface top $V_s$ is represented by a distance along the optical axis $O_M$ from the position of the surface top on the design of the first surface. In the coordinate system representing the position $V_s$ of the apparent surface top, the direction from the first surface to the imaging surface is positive.

In FIG. 3, the radius of curvature and the surface interval of the surface number s (where s=1, ... , 14) are described as $r_s$ and $d_s$, respectively. In the optical system 41A under test, the surface numbers of the optical surfaces that are targets of eccentricity measurement by the eccentricity measurement device 50 are 1 to 6 and 8 to 14. That is, surfaces Si under test in the optical system 41A under test are at most 13 surfaces of surface numbers 1 to 6 and 8 to 14.

TABLE A

| Surface number | r | d | ne | V | R | SC |
|---|---|---|---|---|---|---|
| 1 | ∞ | 0.2115 | 1.88815 | 0.000 | ∞ | ∞ |
| 2 | 0.6603 | 0.4242 | 1.00000 | 0.112 | 0.350 | 0.462 |
| 3 | −3.0889 | 0.4871 | 1.97189 | 0.382 | 0.761 | 1.143 |
| 4 | −1.9529 | 0.3281 | 1.00000 | 0.460 | −2.405 | −1.945 |
| 5 | ∞ | 0.4230 | 1.49557 | 0.530 | 0.523 | 1.054 |
| 6 | ∞ | 0.0000 | 1.00000 | 0.579 | 0.475 | 1.054 |
| 7 (stop) | ∞ | 0.1872 | | | | |
| 8 | ∞ | 0.6251 | 1.69979 | 0.606 | 0.447 | 1.054 |

TABLE A-continued

| Surface number | r | d | ne | V | R | SC |
|---|---|---|---|---|---|---|
| 9 | −1.1895 | 0.2131 | 1.00000 | 0.652 | −0.097 | 0.555 |
| 10 | 1.4519 | 0.8357 | 1.65425 | 0.678 | 0.359 | 1.037 |
| 11 | −1.0589 | 0.3277 | 1.97189 | 0.784 | −0.123 | 0.662 |
| 12 | −4.3264 | 0.1405 | 1.00000 | 0.854 | −0.305 | 0.549 |
| 13 | ∞ | 0.8559 | 1.51825 | 0.942 | −0.443 | 0.500 |
| 14 | ∞ | 0.0000 | 1.00000 | 315.550 | −315.050 | 0.500 |
| Imaging surface | ∞ | | | | | |
| Fno | 2.95 | | | | | |
| Half angle of view | 66.2° | | | | | |
| Image height | 0.475 mm | | | | | |

As in the optical system 41A under test in this example, in the objective optical system of the endoscope, because the first lens L1 has strong concave power, the apparent spherical centers of the optical surfaces on the image side of the first lens L1 are more likely to be close to each other.

In the following [Table 1], positions (mm) of the apparent spherical centers of optical surfaces (surface numbers 1 to 6 and 8 to 14. Hereinafter, the same is true) (as indicated by "SC (mm)" in [Table 1]) of the optical system 41A under test are sorted and shown in an order from a maximum value of the positive direction to the negative direction.

TABLE 1

| Sequence | Surface number | SC (mm) | Proximity interval (mm) |
|---|---|---|---|
| 1 | 1 | ∞ | ∞ |
| 2 | 3 | 1.143 | 0.089 |
| 3 | 5 | 1.054 | 0.000 |
| 4 | 6 | 1.054 | 0.000 |
| 5 | 8 | 1.054 | 0.000 |
| 6 | 10 | 1.037 | 0.017 |
| 7 | 11 | 0.662 | 0.107 |
| 8 | 9 | 0.555 | 0.006 |
| 9 | 12 | 0.549 | 0.006 |
| 10 | 13 | 0.500 | 0.000 |
| 11 | 14 | 0.500 | 0.000 |
| 12 | 2 | 0.492 | 0.038 |
| 13 | 4 | −1.945 | −2.407 |

In the field of "proximity interval" in [Table 1], a distance in the direction along the optical axis $O_M$ between the closer apparent spherical centers among apparent spherical centers whose positions in the direction along the optical axis $O_M$ are adjacent to each other is shown. For example, the apparent spherical center of the third surface is adjacent to the apparent spherical centers of the first and fifth surfaces, but the apparent spherical center of the third surface is closer to the apparent spherical center of the fifth surface than the apparent spherical center of the first surface. Thus, in the field of "proximity interval", 0.089 mm, which is the distance between the apparent spherical center of the fifth surface and the apparent spherical center of the third surface, is written.

As can be seen from [Table 1], the apparent spherical centers of the fifth, sixth, and eighth surfaces match each other. The apparent spherical center of the tenth surface is adjacent to the apparent spherical centers of the fifth, sixth, and eighth surfaces at intervals of 0.017 mm. The apparent spherical centers of the eleventh and ninth surfaces are adjacent to each other at intervals of 0.107 mm. The apparent spherical centers of the ninth and twelfth surfaces are adjacent to each other at intervals of 0.006 mm. The apparent spherical center of the twelfth surface is adjacent to the apparent spherical centers of the thirteenth and fourteenth surfaces at intervals of 0.049 mm. The thirteenth and fourteenth surfaces have apparent spherical centers that match each other. The apparent spherical center of the second surface is adjacent to the apparent spherical centers of the thirteenth and fourteenth surfaces at intervals of 0.038 mm. The apparent spherical center of the fourth surface is adjacent to the apparent spherical center of the second surface at an interval of 2.407 mm.

Figure 4:
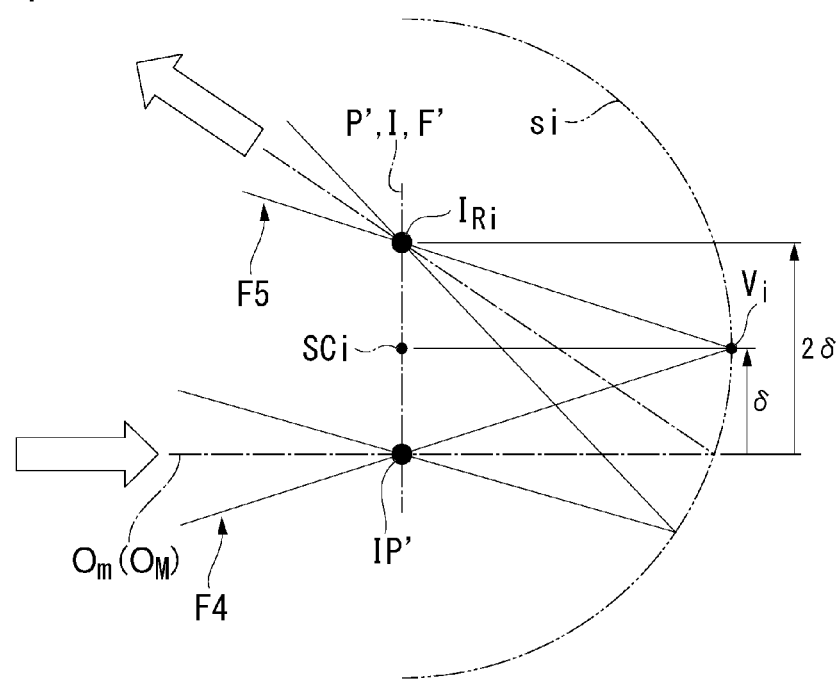
FIG. 4 is a schematic diagram for describing the principle of eccentricity measurement in a conventional autocollimation method.
Figure 5:
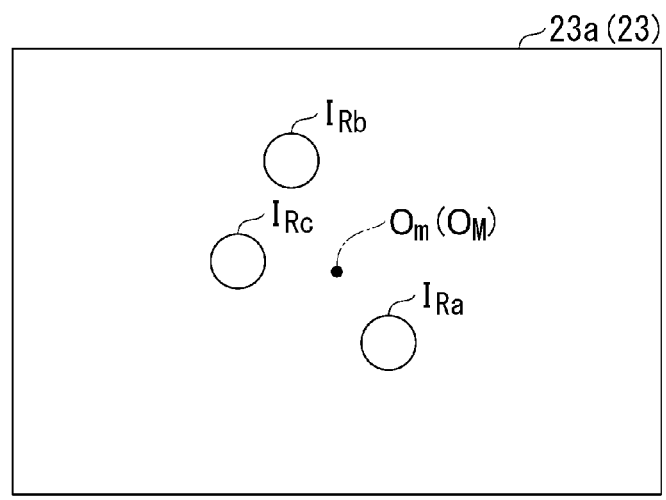
FIG. 5 is a schematic diagram showing an example of a reflected image observed in the conventional autocollimation method.

FIG. 4 is a schematic diagram for describing the principle of eccentricity measurement in a conventional autocollimation method. FIG. 5 is a schematic diagram showing an example of a reflected image observed in the conventional autocollimation method.

In the conventional autocollimation method, the projection surface P' is set at a position passing through the apparent spherical center SCi of the surface Si under test. However, in FIG. 4, for ease of viewing, the apparent surface si under test is indicated by a virtual line instead of the incidence-side optical system and the surface Si under test.

Because the projection plane P' matches the image surface I, the reflected image $I_{Ri}$ can be observed by setting the I-O distance to 0. In this case, when the apparent spherical center of the optical surface other than the surface Si under test is close to the position of the apparent spherical center SCi of the surface Si under test in the direction along the optical axis $O_M$, the reflected image reflected on the optical surface other than the surface Si under test or the blurred image thereof is observed on the observed surface F'. Because the focal plane F' of the objective lens 15 is a surface optically conjugate to the image surface $I_B$ of the measurement imager 17 via the optical observation system, images other than the reflected image reflected on the surface Si under test are also captured by the measurement imager 17. Thus, eccentricity measurement becomes difficult because it is not possible to identify which image corresponds to the reflected image reflected by the surface Si under test.

In the example shown in FIG. 4, because the projection surface P' matches the image surface I, the optical image IP' and the reflected image $I_{Ri}$ formed by reflection on the apparent surface si under test are formed on the same plane orthogonal to the optical axis $O_M$ passing through the apparent spherical center SCi. When the I-O distance is set to 0, the optical image IP' matches the observed surface F'. When the main body portion 3 is moved in the direction along the optical axis $O_M$ using the moving stage 2, the optical image IP' and the observed surface F' move integrally in the direction along the optical axis $O_M$, and the reflected image $I_{Ri}$ can be observed when the optical image IP' is located at a specific position.

When the lateral magnification of the reflected image $I_{Ri}$ for the optical image IP' is referred to as reflection magnification, the reflection magnification becomes ±1 when the I-O distance is 0. Here, the reflection magnification of −1 corresponds to a case where the projection surface P is aligned with the apparent spherical center SCi (see FIG. 4) and the reflection magnification of +1 corresponds to a case where the projection surface P' is aligned with the apparent surface top Vi.

When there is eccentricity in the spherical center of the surface Si under test and the incidence-side optical system with respect to the optical axis $O_M$, the apparent spherical center SCi, which is a point conjugate to the spherical center of the surface Si under test, is also eccentric with respect to the optical axis $O_M$. When the apparent spherical center SCi deviates from the optical axis $O_M$ by $\delta$ in the direction orthogonal to the optical axis $O_M$, the reflected image $I_{Ri}$ is formed on the image surface I at a position shifted from the optical axis $O_M$ by $2\delta$. In this case, if the position of the optical axis $O_M$ on the imaging surface of the measurement imager 17 and the position of the reflected image $I_{Ri}$ can be identified, an eccentricity amount $\delta$ of the apparent spherical center SCi is obtained by dividing a distance therebetween by 2.

However, if there are a plurality of optical surfaces under test having positions of the apparent spherical centers SCi close to each other in the direction along the optical axis $O_M$ within the optical system 41 under test, reflected images $I_{Ra}$, $I_{Rb}$, and $I_{Rc}$ reflected on different optical surfaces are observed at positions corresponding to eccentricity amounts of the apparent spherical centers SCi in the display screen 23a of the display unit 23, for example, as shown in FIG. 5.

However, in the autocollimation method, because the reflection magnification of the optical surface is −1 or 1, it is difficult to identify the reflected image reflected on the surface Si under test from the image of the display screen 23a using a difference in reflection magnification as a clue.

Figure 6:
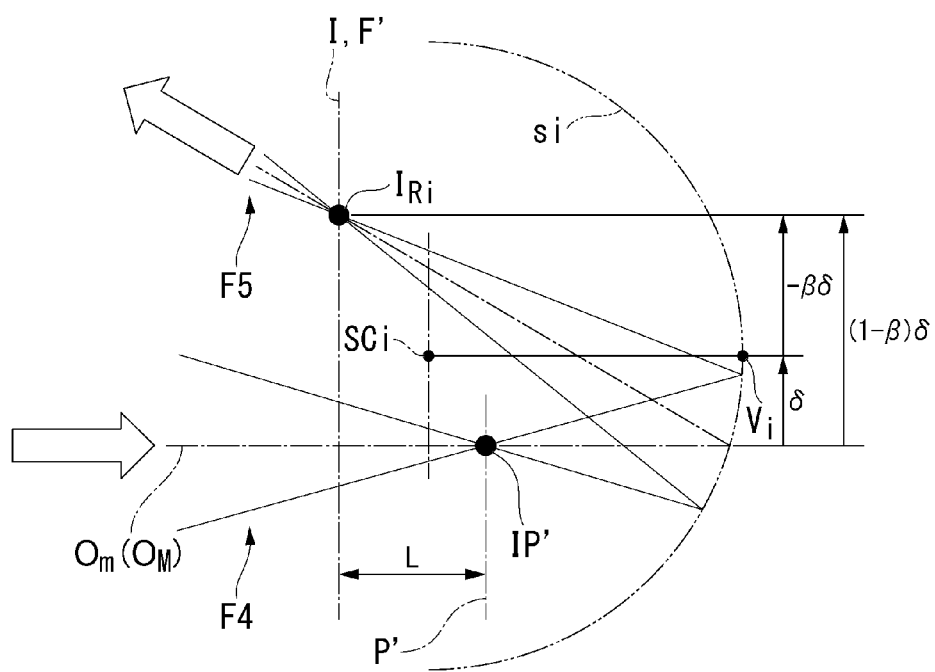
FIG. 6 is a schematic diagram for describing the principle of eccentricity measurement of an eccentricity measurement method according to the first embodiment of the present invention.
Figure 7:
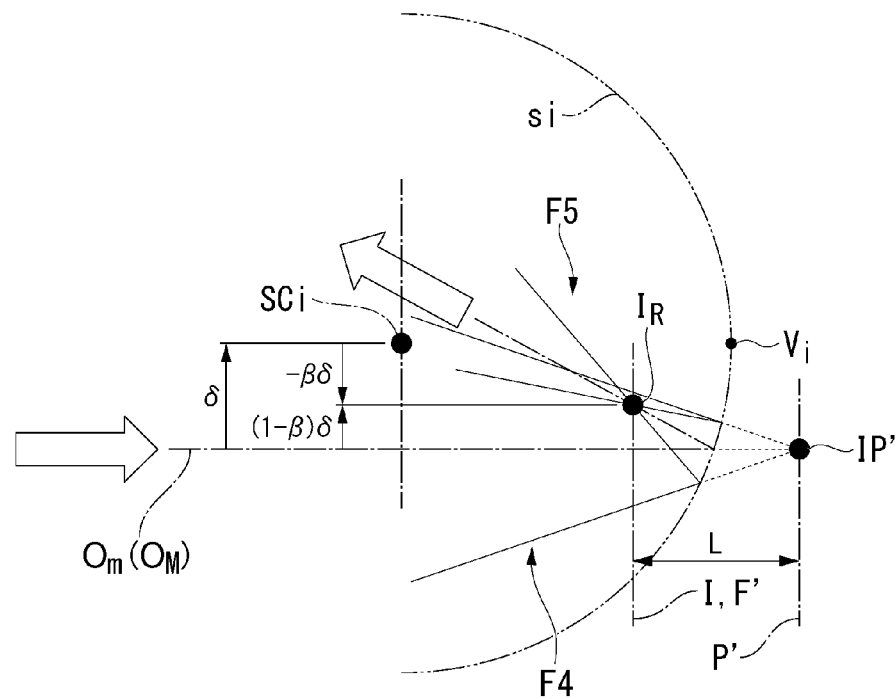
FIG. 7 is a schematic diagram for describing the principle of eccentricity measurement of the eccentricity measurement method according to the first embodiment of the present invention.

FIGS. 6 and 7 are schematic diagrams for describing the principle of eccentricity measurement of the eccentricity measurement method according to the first embodiment of the present invention.

In FIGS. 6 and 7 and FIGS. 8 and 9 to be described below, as in FIG. 4, instead of the incidence-side optical system and the surface Si under test, the apparent surface si under test corresponding to the surface Si under test is indicated by a virtual line.

In the eccentricity measurement method of the present embodiment, the state of the eccentricity measurement device 50 is set using the I-O distance as L (L≠0) by positioning the adjustment lens 13, the main body portion 3 is moved using the moving stage 2, and the position of the projection surface P' in the direction along the optical axis $O_M$ is moved. Thereby, the optical image IP' and the observed surface F' move integrally in the direction along the optical axis $O_M$.

FIG. 6 shows a state in which the I-O distance L is set to a positive value and the reflected image is observed. That is, when the optical image IP' is on the right side of FIG. 6 with respect to the observed surface F', L is positive.

In FIG. 6, an example in which the projection surface P' is arranged between the apparent spherical center SCi and the apparent surface top Vi is shown.

The position of the projection surface P' (not shown) is positioned at a position where the reflected image $I_R$ is formed on the observed surface F'.

The reflection magnification $\beta$ of the apparent surface si under test is represented by the following Eq. (2) from the calculation using the image-formation formula related to the apparent surface si under test.

[Math. 2]

$$\beta = \frac{L \pm \sqrt{L^2 + R^2}}{R} \quad (2)$$

Here, R denotes the apparent radius of curvature of the surface Si under test.

As shown in Eq. (2), when L is not 0, the reflection magnification $\beta$ has a positive value or a negative value regardless of the magnitude of L and the positive or negative value of L. For example, in the case of R>0, if plus sign of the double sign in Eq. (2) is selected, $\beta$ is a positive value, and if minus sign in the double sign of Eq. (2) is selected, $\beta$ is a negative value. In the case of R<0, if minus sign of the double sign in Eq. (2) is selected, $\beta$ is a positive value, and if plus sign of the double sign in Eq. (2) is selected, $\beta$ is a negative value.

In the example shown in FIG. 6 (R<0), $\beta$ is a negative value.

Herein, a reflected image $I_{Ri}$ in which the reflection magnification $\beta$ is a positive value is referred to as a "positively reflected image." Likewise, a reflected image $I_{Ri}$ in which the reflection magnification $\beta$ is a negative value is referred to as a "negatively reflected image."

When the optical image IP' moves in a direction orthogonal to the optical axis $O_M$, the positively reflected image moves in the same direction as the optical image IP' in accordance with the magnitude of $\beta$.

When the optical image IP' moves in a direction orthogonal to the optical axis $O_M$, the negatively reflected image moves in a direction opposite to that of the optical image IP' in accordance with the magnitude of $\beta$.

When the apparent spherical center SCi deviates from the optical axis $O_M$ by $\delta$ in the direction orthogonal to the optical axis $O_M$, the reflected image $I_{Ri}$ is formed at a position shifted from the optical axis $O_M$ by $(1-\beta)\delta$ on the observed surface F'. In this case, it is possible to calculate an eccentricity amount $\delta$ of the apparent spherical center SCi using a deviation amount $(=(1-\beta)\delta)$ in the direction orthogonal to the optical axis $O_M$ calculated on the basis of the position of the optical axis $O_M$ on the imaging surface of the measurement imager 17 and the position of the reflected image $I_{Ri}$ and the reflection magnification $\beta$ of the apparent surface si under test calculated from the design value of the optical system 41 under test.

An example in which the projection surface P' is arranged in the vicinity of the apparent surface top Vi is shown in FIG. 7.

FIG. 7 shows a state in which the I-O distance L is set to a positive value and the reflected image is observed. That is, when the optical image IP' is on the right side of FIG. 7 with respect to the observed surface F', L is positive.

The position of the projection surface P' (not shown) is positioned at a position where the reflected image $I_R$ is formed on the observed surface F'.

The reflection magnification $\beta$ of the apparent surface si under test is represented by the above Eq. (2). In the example shown in FIG. 7 (R<0), $\beta$ is a positive value. Thus, the reflected image $I_{Ri}$ of FIG. 7 is a positively reflected image.

When the apparent spherical center SCi deviates from the optical axis $O_M$ by a in a direction orthogonal to the optical axis $O_M$, the reflected image $I_{Ri}$ is formed at a position shifted by a deviation amount $(1-\beta)\delta$ from the optical axis $O_M$ on the observed surface F'.

Thus, as in the example shown in FIG. 6, the eccentricity amount $\delta$ of the apparent spherical center SCi of the surface Si under test can be calculated.

Next, an eccentricity measurement method when the apparent radius of curvature of the surface Si under test is infinite will be described.

Figure 8:
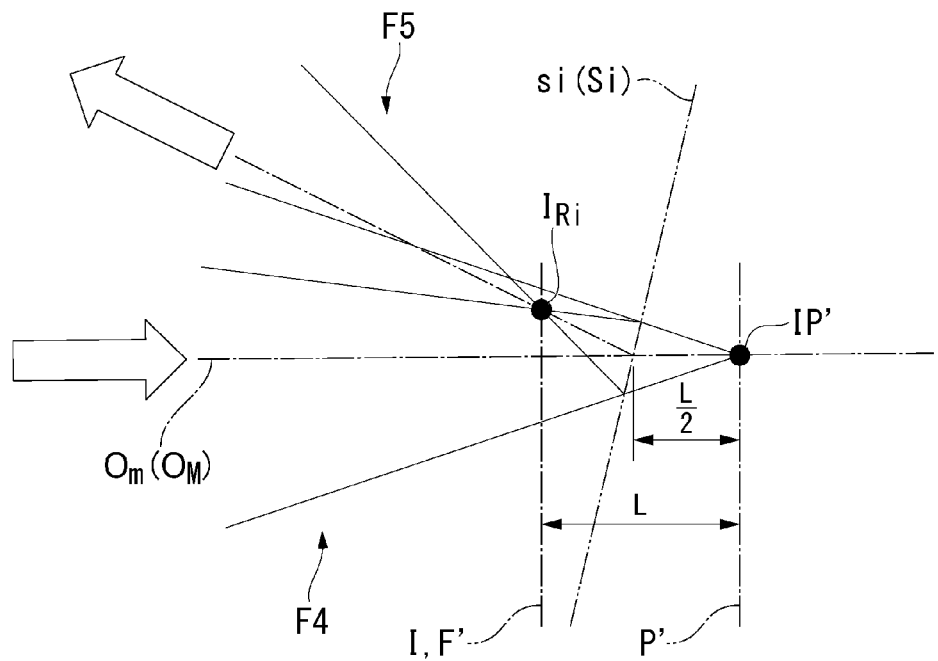
FIG. 8 is a schematic diagram for describing the principle of eccentricity measurement when an apparent radius of curvature is infinite in the eccentricity measurement method according to the first embodiment of the present invention.
Figure 9:
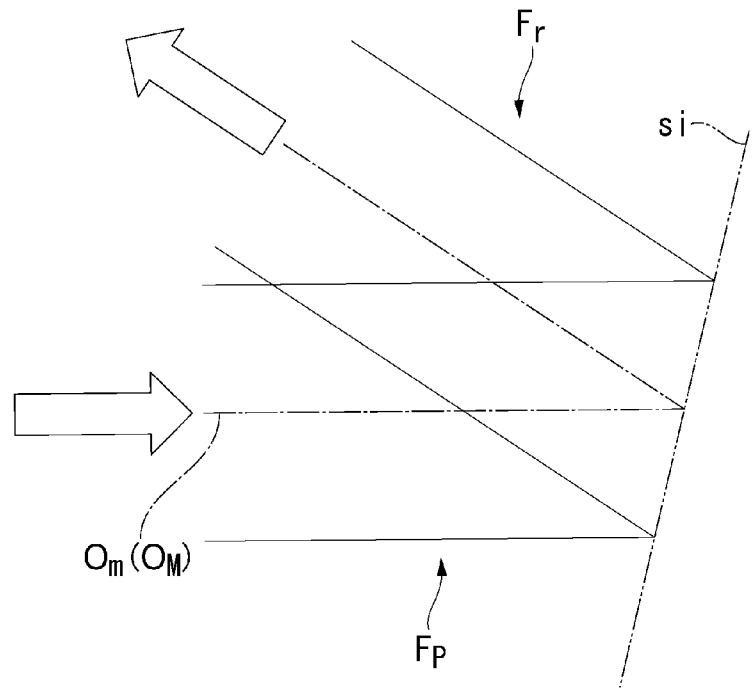
FIG. 9 is a schematic diagram for describing an eccentricity measurement method when the apparent radius of curvature in the conventional autocollimation method is infinite.

FIG. 8 is a schematic diagram for describing the principle of eccentricity measurement when an apparent radius of curvature is infinite in the eccentricity measurement method according to the first embodiment of the present invention. FIG. 9 is a schematic diagram for describing an eccentricity measurement method when the apparent radius of curvature in the conventional autocollimation method is infinite.

In the optical system 41 under test, the apparent radius $R_i$ of curvature of the surface Si under test may be infinite. For example, in the optical system 41 under test, if the foremost first surface is planar, the apparent radius $R_1$ of curvature becomes infinite. For example, in the optical system 41 under test, if the first surface and the second surface adjacent to the rear side of the first surface are planar, apparent radii $R_1$ and $R_2$ of curvature become infinite. In particular, in the objective lens of an endoscope, the first surface is often planar.

As shown in FIG. 8, according to the eccentricity measurement method of the present embodiment, it is possible to form a positively reflected image having a reflection magnification β of 1 as the reflected image $I_{Ri}$ by projecting the optical image IP' onto a rearward position at a distance of L/2 from the apparent surface top of the surface Si under test. Thus, eccentricity measurement can be performed as in the case where the above-described positively reflected image is used.

Also, the apparent spherical center is located at an infinite distance along the optical axis $O_M$ on a surface with an apparent radius of curvature which is infinite and, if there is eccentricity in the surface Si under test or the incidence-side optical system, it is difficult to define an eccentricity amount of the apparent spherical center as a shift amount. In this case, a deviation amount of the reflected image for the optical axis $O_M$ is treated as the eccentricity amount δ of the apparent spherical center. Because the reflection magnification β is 1, if Eqs. (12) and (13) to be described below are applied as they are, the denominators thereof become 0 and the shift amount diverges at the apparent spherical center. However, for the surface Si under test located at an infinite distance along the line, the denominators of Eqs. (12) and (13) to be described below are set to 1 to define the shift amount of the apparent spherical center. The coefficients $a_{ij}$ (i=1, ..., N and j=1, ..., N) of a linear combination of Eqs. (14) and (15) to be described below are also calculated according to the definition.

The eccentricity measurement method of the present embodiment is preferable in that measurement is possible in a similar way even if the apparent radius of curvature of the surface Si under test is infinite or not infinite.

On the other hand, as shown in FIG. 9, in the conventional autocollimation method, it is necessary to project a parallel beam Fp and make an image of the reflected beam Fr in an optical observation system so that a reflected image of the apparent surface si under test having an infinite apparent radius R of curvature is observed. That is, depending on whether the apparent radius R of curvature is infinite or not infinite, it is necessary to change the optical projection system and the optical observation system.

Thus, there is a possibility that the measurement device becomes complex and the measurement error will increase with changes in the optical projection system and the optical observation system.

In this way, when eccentricity amounts δ of apparent spherical centers SCi of all surfaces Si under test are calculated, the eccentricity amount of the spherical center of each surface Si under test is calculated using a matrix in which the eccentricity amount δ of the apparent spherical center SCi of each surface Si under test is associated with the eccentricity amount of the actual spherical center of the surface Si under test and each calculated eccentricity amount δ as will be described below.

As described above, in the eccentricity measurement method of the present embodiment, the position of the projection surface P' in the direction along the optical axis $O_M$ is shifted from both the apparent spherical center SCi of the surface Si under test and the apparent surface top Vi to form the reflected image $I_{Ri}$.

In this case, if the I-O distance L is set to a value other than 0 and the position of the projection surface P' is appropriately determined so that the reflected image $I_{Ri}$ is formed at the position of the observed surface F', the reflected image $I_{Ri}$ having reflection magnification, which is not ±1, is formed, and the reflected image $I_{Ri}$ can be observed by the optical observation system.

In this case, the reflection magnification β of the apparent surface si under test has a value other than ±1 in accordance with the position of the projection surface P' and the reflected image $I_{Ri}$ becomes a positively reflected image or a negatively reflected image.

In the above [Table A], focusing on the design values of the surface numbers having positions of the apparent spherical centers close to each other, it can be seen that the apparent radii of curvature are different from each other even if the positions of the apparent spherical centers are close to each other.

Thus, even if a plurality of reflected images $I_{Ri}$ are observed, because the reflection magnifications of the apparent surfaces si under test forming reflected images $I_{Ri}$ are different, there is a possibility that the reflected image $I_{Ri}$ reflected on the surface Si under test can be identified.

As in the conventional autocollimation method, because a magnitude of reflection magnification is 1 in the eccentricity measurement method using the reflected image obtained with the T-O distance of 0, it may be referred to as an equal magnification method below. On the other hand, as in the eccentricity measurement method of the present embodiment, an eccentricity measurement method using a reflected image by setting an I-O distance that is not 0 may be referred to as an unequal magnification method.

Next, an example of a method of discriminating a reflected image in the eccentricity measurement method of the present embodiment will be described.

Figure 10:
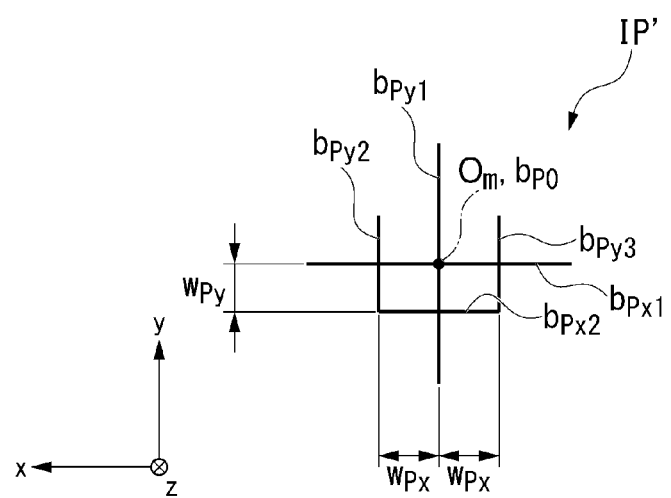
FIG. 10 is a schematic diagram showing an example of an index used for the eccentricity measurement method according to the first embodiment of the present invention.
Figure 11:
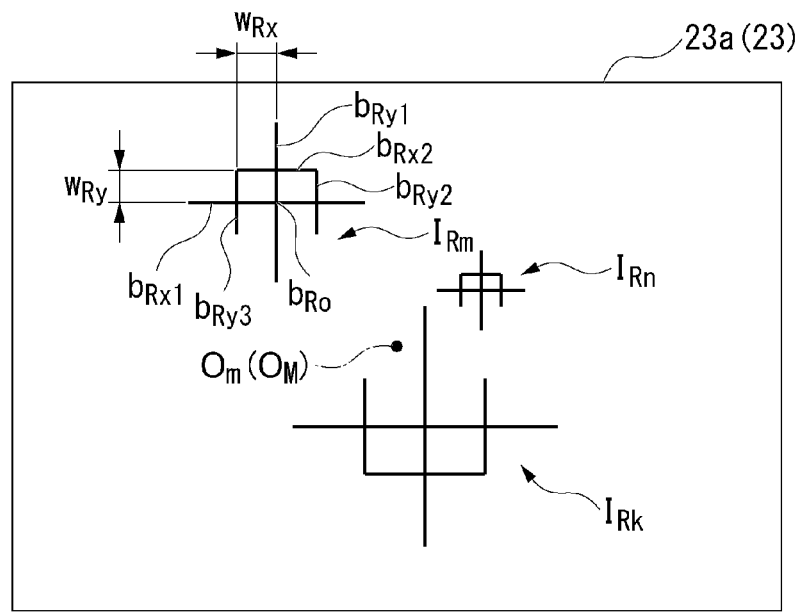
FIG. 11 is a schematic diagram showing a first example of a method of discriminating a reflected image in the eccentricity measurement method according to the first embodiment of the present invention.

FIG. 10 is a schematic diagram showing an example of an index used for the eccentricity measurement method according to the first embodiment of the present invention. FIG. 11 is a schematic diagram showing a first example of a method of discriminating a reflected image in the eccentricity measurement method according to the first embodiment of the present invention.

In the discrimination method of the first example, an index having a pattern in which magnification measurement is possible instead of a point image is projected as the optical image IP'.

The optical image IP' shown in FIG. 10 has a first horizontal line part $b_{Px1}$, a first vertical line part $b_{Py1}$, a second horizontal line part $b_{Px2}$, a second vertical line part $b_{Py2}$, and a third vertical line part $b_{Py3}$.

The first horizontal line part $b_{Px1}$ and the first vertical line part $b_{Py1}$ are equal-length line segments that bisect each other by the optical axis $O_M$. The first horizontal line part $b_{Px1}$ extends in the x-axis direction. The first vertical line part $b_{Py1}$ extends in the y-axis direction. An intersection $b_{PO}$ between the first horizontal line part $b_{Px1}$ and the first vertical line part $b_{Py1}$ represents a position of the optical axis $O_M$.

The second horizontal line part $b_{Px2}$ is a line segment that is located at a distance of $w_{Py}$ from the first horizontal line part $b_{Px1}$ in the negative y-axis direction and extends in parallel to the first horizontal line part $b_{Px1}$. The second horizontal line part $b_{Px2}$ has a length of $w_{Px}$ from the first vertical line part $b_{Py1}$ in each of the positive and negative x-axis directions.

The second vertical line part $b_{Py2}$ is a line segment extending in the positive y-axis direction from the end of the second horizontal line part $b_{Px2}$ in the positive x-axis direction and intersecting the first horizontal line part $b_{Px1}$. A distance between the second vertical line part $b_{Py2}$ and the first vertical line part $b_{Py1}$ is $w_{Px}$.

The third vertical line part $b_{Py3}$ is a line segment extending in the positive y-axis direction from the end of the second horizontal line part $b_{Px2}$ in the negative x-axis direction and intersecting the first horizontal line part $b_{Px1}$. A distance between the third vertical line part $b_{Py3}$ and the first vertical line part $b_{Py1}$ is $w_{Px}$.

In the unequal magnification method using the optical image IP', the main body portion 3 is moved in a direction along the optical axis $O_M$ using the moving stage 2 so that the image surface I matches the focal plane F' and the projection surface P' is moved in the direction along the optical axis $O_M$ and images $I_{Rk}$, $I_{Rm}$, $I_{Rn}$, and the like of the reflected image are displayed on the display screen 23a, for example, as shown in FIG. 11. The top, bottom, left and right sides of the display screen 23a match the top, bottom, left, and right sides of the observed surface F' seen from the positive z-axis direction (hereinafter, the same is also true for the display screen 23a in other drawings).

Because each image displayed on the display screen 23a has a pattern similar to the pattern of the optical image IP', the image is an image formed by reflecting the measurement beam and is reflected on the observed surface F' because the reflected image of another optical surface is also formed near the observed surface F' when the position of the projection surface P' is determined to observe the reflected image of the surface Si under test to be observed. Because the position of each reflected image in the direction along the optical axis $O_M$ is slightly different, each image may be reflected as a blurred image on the display screen 23a.

For example, because reflected images represented by images $I_{Rm}$ and $I_{Rn}$ are inverted images opposite to the pattern of the optical image IP', the reflected images represented by the images $I_{Rm}$ and $I_{Rn}$ are negatively reflected images. Because the reflected image represented by the image $I_{Rk}$ is an upright image of the optical image IP', the reflected image represented by the image $I_{Rk}$ is a positively reflected image.

For example, the image $I_{Rm}$ has a first horizontal line part $b_{Rx1}$, a first vertical line part $b_{Ry1}$, a second horizontal line part $b_{Rx2}$, a second vertical line part $b_{Ry2}$, and a third vertical line part $b_{Ry3}$ in correspondence with a first horizontal line part $b_{Px1}$, a first vertical line part $b_{Py1}$, a second horizontal line part $b_{Px2}$, a second vertical line part $b_{Py2}$, and a third vertical line part $b_{Py3}$ of the optical image IP', respectively.

The length of each part of the image $I_{Rm}$ varies from the dimension of the corresponding part in the optical image IP' in accordance with the reflection magnification at the time of the conversion into the actual dimensions at the observed surface F'.

For example, when the reflection magnification of the reflected image corresponding to the image $I_{Rm}$ is $\beta_m$, a distance $w_{Rx}$ between the first vertical line part $b_{Ry1}$ and the second vertical line part $b_{Ry2}$ is a value obtained by multiplying $w_{Px}$ by $|\beta_m|$. Likewise, a distance $w_{Ry}$ between the first horizontal line part $b_{Rx1}$ and the second horizontal line part $b_{Rx2}$ is a value obtained by multiplying $w_{Py}$ by $|\beta_m|$.

For example, by measuring either $w_{Rx}$ or $w_{Ry}$ from the image $I_{Rm}$ and converting it into the actual dimension on the observed surface F', the lateral magnification for the optical image IP' is obtained as $-w_{Rx}/w_{Px}$ ($=-w_{Ry}/w_{Py}$) in consideration of the sign from the inverted image. This lateral magnification is the reflection magnification $\beta$ of the reflected image $I_{Ri}$ when the reflected image corresponding to the image $I_{Rm}$ is a reflected image $I_{Ri}$ formed on the surface Si under test.

In the eccentricity measurement device 50, the image transmitted from the measurement imager 17 is processed by the image processing unit 103 in image processing, either $w_{Rx}$ or $w_{Ry}$ is measured and the lateral magnification is calculated by the arithmetic processing unit 102.

The lateral magnifications of the reflected images for the optical image IP' corresponding to the images $I_{Rk}$ and $I_{Rn}$ are also calculated in a similar way.

The general control unit 101 calculates the reflection magnification of the apparent surface si under test corresponding to each surface Si under test in the optical system 41 under test when the I-O distance is L and stores the calculated reflection magnification in the storage unit 104.

The general control unit 101 identifies that the image in which the lateral magnification closest to the reflection magnification of the apparent surface si under test corresponding to the surface Si under test to be measured is obtained is the reflected image $I_{Ri}$ reflected on the surface Si under test.

The discrimination method of the first example includes: measuring lateral magnification of the observed image for the optical image indicated by an observed image formed by reflection of the optical image on the basis of the image of the observed surface acquired by the measurement imager as the measurement image; and identifying the observed image from which the lateral magnification closest to a design value of reflection magnification of an apparent surface of the surface under test is measured as the reflected image.

The reflected images corresponding to the images $I_{Rk}$, $I_{Rm}$, and $I_{Rn}$ are examples of an observed image formed by the reflection of the optical image IP'.

In particular, a magnification measurement unit configured to expand and contract the optical image in accordance with the reflection magnification of the apparent surface is provided and the discrimination method of the first example includes measuring the lateral magnification by measuring dimensions of the magnification measurement unit in the observed image in the measurement image when the lateral magnification is measured.

The first horizontal line part $b_{Px1}$, the first vertical line part $b_{Py1}$, the second horizontal line part $b_{Px2}$, the second vertical line part $b_{Py2}$, and the third vertical line part $b_{Py3}$ in the optical image IP' are examples of the magnification measurement unit.

Although the identification method of the first example can be performed automatically by the measurement control unit 5 of the eccentricity measurement device 50, the lateral magnification can be measured by a measurer on, for example, the display screen 23a, and can be determined by the measurer.

Next, the discrimination method of the second example will be described.

Figure 12:
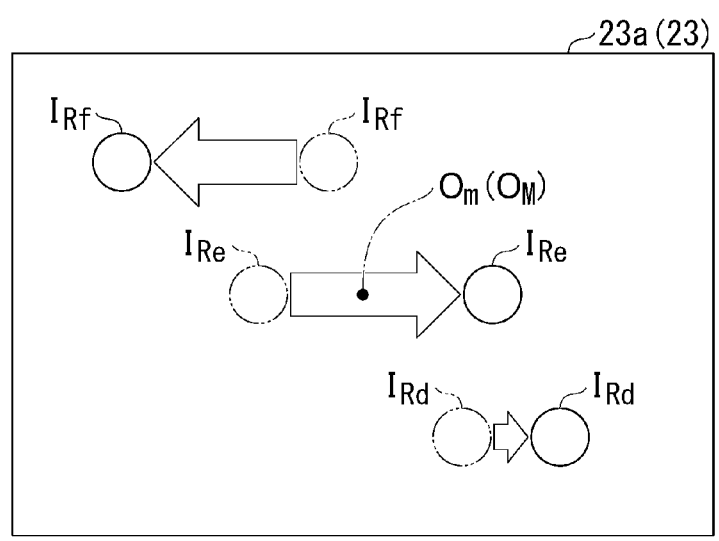
FIG. 12 is a schematic diagram showing a second example of the method of discriminating a reflected image in the eccentricity measurement method according to the first embodiment of the present invention.

FIG. 12 is a schematic diagram showing a second example of the method of discriminating a reflected image in the eccentricity measurement method according to the first embodiment of the present invention.

In the discrimination method of the second example, the optical image IP' is not particularly limited. The optical image IP' may have an index as in the first example or may be a point image. In FIG. 12, an image corresponding to a case where the optical image IP' is a point image is schematically depicted.

In the discrimination method of the second example, when a plurality of reflected images are observed on the display screen 23*a*, the optical image IP' is moved in a direction orthogonal to the optical axis $O_M$ to acquire a reflected image identification image. Subsequently, the reflected image $I_{Ri}$ is identified by comparing the measurement image acquired before movement and the image for identifying the reflected image after movement.

In the eccentricity measurement device 50, the optical image IP' is moved by moving the wedge prism 18 to an insertion position. For example, in FIG. 12, an example in which the optical image IP' is moved in the negative x-axis direction (a direction from left to right in FIG. 12) is shown.

In FIG. 12, images $I_{Rd}$, $I_{Re}$, and $I_{Rf}$ indicated by two-dot chain lines displayed on the display screen 23*a* are measurement images.

When the wedge prism 18 is moved to the insertion position, the images $I_{Rd}$, $I_{Re}$, and $I_{Rf}$ move to positions indicated by, for example, solid lines. This image is acquired by the measurement imager 17 to obtain a reflected image identification image. However, white arrows in FIG. 12 are added for description and do not appear in the actual image.

When the measurement image is compared with the reflected image identification image, the images $I_{Rd}$ and $I_{Re}$ move in a direction identical to the moving direction of the optical image IP'. Thus, it can be seen that the images $I_{Rd}$ and $I_{Re}$ are images of positively reflected images. Further, movement amounts of the images $I_{Rd}$ and $I_{Re}$ are different from each other in accordance with the lateral magnification of the apparent surface si under test, which forms the corresponding reflected image.

The image $I_{Rf}$ is moving in a direction opposite to a moving direction of the optical image IP'. Thus, it can be seen that the image $I_{Rf}$ is an image of a negatively reflected image.

The lateral magnification of the apparent surface si under test corresponding to the surface Si under test to be measured can be calculated in advance from the design data of the optical system 41 under test as in the discrimination method of the first example. Thus, from the moving direction and the movement amount of the image, for example, the image $I_{Re}$ can be identified as a reflected image $I_{Ri}$ reflected by the surface Si under test. This identification may be performed visually by the measurer or the measurement control unit 5 of the eccentricity measurement device 50 may be performed automatically.

Here, a relationship between a shift amount of the optical image IP' by the wedge prism 18 of the eccentricity measurement device 50 and the displacement of the reflected image $I_{Ri}$ will be described.

Displacement D of the reflected image $I_{Ri}$ in a plane orthogonal to the optical axis $O_M$ is represented by the following Eq. (3).

[Math. 3]

$$D = -\frac{\beta \theta f_k f_p}{p} \quad (3)$$

Here, $f_p$ denotes a focal length of the adjustment lens 13, $f_k$ denotes a focal length of the image-formation lens 16, $\theta$ denotes a ray deflection angle of the wedge prism 18, p denotes a distance between the focal plane P of the adjustment lens 13 and the focal plane F of the objective lens 15 (see FIG. 1), and $\beta$ denotes reflection magnification of the apparent surface si under test that forms the reflected image $I_{Ri}$.

When Eq. (3) is solved for $\beta$ and p is erased using the above Eq. (1), the following Eq. (4) is obtained.

[Math. 4]

$$\beta = -\frac{Dp}{\theta f_k f_p} = \frac{Df_T^2}{L\theta f_k f_p} \quad (4)$$

Thus, the displacement D of each reflected image can be measured, the corresponding reflection magnification $\beta$ can be obtained from Eq. (4), and the reflected image closest to the design value of the reflection magnification $\beta$ in the apparent surface si under test calculated in advance can be identified as the reflected image $I_{Ri}$. This identification can be automatically performed by the measurement control unit 5 of the eccentricity measurement device 50.

As in the first example, the discrimination method of the second example includes: measuring lateral magnification of the observed image for the optical image indicated by an observed image formed by reflection of the optical image on the basis of the image of the observed surface acquired by the measurement imager as the measurement image; and identifying the observed image from which the lateral magnification closest to a design value of reflection magnification of an apparent surface of the surface under test is measured as the reflected image.

The images $I_{Rd}$, $I_{Re}$, and $I_{Rf}$ are examples of observed images formed by the reflection of the optical image IP'.

In particular, the discrimination method of the second example includes: acquiring the measurement image in a state in which the optical image is arranged on the reference axis; acquiring a reflected image identification image by shifting the optical image in a direction orthogonal to the reference axis; measuring displacement in the observed surface of the observed image corresponding to an amount of shift of the optical image by comparing the measurement image with the reflected image identification image; and measuring the lateral magnification indicated by the observed image from the amount of shift and the displacement.

Because the eccentricity measurement device 50 of the present embodiment can execute the discrimination method of the first example described above according to the control process of the measurement control unit 5, the measurement control unit 5 is an example of a reflection magnification measurement unit configured to measure the lateral magnification of the observed image for the optical image indicated by the observed image formed by the reflection of the optical image on the basis of the image at the observation position acquired by the measurement imager.

The eccentricity measurement device 50 of the present embodiment includes a wedge prism 18, a wedge prism drive unit 22, and a measurement control unit 5, and the measurement control unit 5 can execute the discrimination method of the second example described above in a control process of the measurement control unit 5.

Thus, the wedge prism 18, the wedge prism drive unit 22, and the measurement control unit 5 are examples of the reflection magnification measurement unit. In particular, the wedge prism drive unit 22 and the measurement control unit 5 are examples of a reflection magnification measurement control unit configured to cause the measurement imager to acquire an image at the observation position in a state in which the optical image is moved at the projection position by inserting the wedge prism into the parallel optical path and measure the lateral magnification indicated by the observed image on the basis of the image at the observation position.

In the present embodiment, as a reflected image discrimination method, a method of confirming the direction and size of the reflected image by projecting an index as in the first example and a method of unloading/loading the wedge prism as in the second example can be used. In any discrimination method, measurement can be performed without changing the position and orientation of each optical element in the optical measurement system 20 of the eccentricity measurement device 50. For example, the wedge prism 18 is inserted into the parallel optical path only when the reflection magnification is measured if the reflected image is discriminated. When the wedge prism 18 performs eccentricity measurement, because the wedge prism 18 is located outside of the optical path of the optical measurement system 20, the optical path of the optical measurement system 20 does not have any influence during eccentricity measurement. Furthermore, when the wedge prism 18 moves, the position and orientation of each optical element do not have any influence in the optical measurement system 20. The same is also true for the case of the first example.

Thus, in the present embodiment, the reflection magnification can be measured without changing the position and orientation of each optical element in the optical measurement system 20.

On the other hand, for example, as a method of measuring the reflection magnification, for example, a method in which the adjustment lens 13 is shifted in the direction orthogonal to the optical axis $O_M$ in the optical measurement system 20 to shift the optical image IP′ laterally is also conceivable. However, in this case, because it is difficult to completely return the adjustment lens 13 to its original position during eccentricity measurement, the position of the reference point in the observed surface F′ changes. Thereby, an error occurs in the eccentricity measurement.

In the eccentricity measurement method of the present embodiment, because a set value L other than 0 is used as the I-O distance, the reflection magnification of the surface Si under test has various values other than ±1. Thereby, it is possible to easily discriminate from which optical surface the reflected image has been reflected.

The magnitude of the set value L is set so that it does not become excessively large or excessively small with respect to the apparent radius of curvature of the surface Si under test in the optical system 41 under test.

In the optical system 41A under test shown in FIG. 3, as shown in [Table A], the magnitudes (absolute values) of the apparent radii R of curvature of many optical surfaces are smaller than 0.5 mm.

In the following [Table 2], when the set value L is set to 0.447 mm, design values of the projection position (mm) of the optical image IP′ (written as "projection position (mm)" in [Table 2]) and the reflection magnification β for each surface Si under test are shown. Here, the coordinate system of the position is similar to the coordinate system of the apparent spherical center position in [Table 1]. Each projection position is a projection position when the main body portion 3 is moved by the moving stage 2 with the I-O distance fixed to the set value L. Thus, the position of the adjustment lens 13 in the optical measurement system 20 is fixed.

As a guideline for a value that does not become excessively large or excessively small with respect to the apparent radius of curvature of the surface Si under test, for example, the median values of the apparent radii of curvature of the optical surfaces among the optical surfaces of the optical system 41A under test are listed in a state in which a case where the apparent radius of curvature is infinite is excluded.

0.447 mm roughly corresponds to the median value of the apparent radius of curvature in the optical system 41A under test.

TABLE 2

| Surface number | Negatively reflected image | | Positively reflected image | |
|---|---|---|---|---|
| | Projection position (mm) | Reflection magnification β | Projection position (mm) | Reflection magnification β |
| 1 | — | — | 0.224 | 1.000 |
| 2 | 0.794 | −0.345 | 0.227 | 2.901 |
| 3 | 1.427 | −0.572 | 0.545 | 1.747 |
| 4 | −1.742 | −1.203 | 0.704 | 0.831 |
| 5 | 1.360 | −0.461 | 0.671 | 2.169 |
| 6 | 1.366 | −0.432 | 0.714 | 2.315 |
| 8 | 1.370 | −0.414 | 0.737 | 2.413 |
| 9 | 0.598 | −9.336 | 1.056 | 0.107 |
| 10 | 1.367 | −0.352 | 0.794 | 2.841 |
| 11 | 0.715 | −7.431 | 1.178 | 0.135 |
| 12 | 0.655 | −3.241 | 1.196 | 0.309 |
| 13 | 0.630 | −2.430 | 1.259 | 0.411 |
| 14 | 0.723 | −1.001 | 315.774 | 0.999 |

Projection positions in [Table 2] are sorted from the maximum value in the positive direction to the negative direction and shown in the following [Table 3]. In the "type of reflected image" in [Table 3], "positive" represents a positively reflected image and "negative" represents a negatively reflected image. In the field of "proximity interval," the distance in the direction along the optical axis $O_M$ between the closer reflected images among the reflected images in which the positions in the direction along the optical axis $O_M$ are adjacent to each other is indicated.

TABLE 3

| Sequence | Surface number | Type of reflected image | Reflection magnification β | Projection position (mm) | Proximity interval (mm) |
|---|---|---|---|---|---|
| 1 | 1 | Negative | — | — | — |
| 2 | 14 | Positive | 0.999 | 315.774 | 314.346 |
| 3 | 3 | Negative | −0.572 | 1.427 | 0.058 |
| 4 | 8 | Negative | −0.414 | 1.370 | 0.002 |
| 5 | 10 | Negative | −0.352 | 1.367 | 0.001 |
| 6 | 6 | Negative | −0.432 | 1.366 | 0.001 |
| 7 | 5 | Negative | −0.461 | 1.360 | 0.006 |
| 8 | 13 | Positive | 0.411 | 1.259 | 0.063 |
| 9 | 12 | Positive | 0.309 | 1.196 | 0.017 |
| 10 | 11 | Positive | 0.135 | 1.178 | 0.017 |
| 11 | 9 | Positive | 0.107 | 1.056 | 0.123 |
| 12 | 2 | Negative | −0.345 | 0.794 | 0.000 |
| 13 | 10 | Positive | 2.841 | 0.794 | 0.000 |
| 14 | 8 | Positive | 2.413 | 0.737 | 0.014 |
| 15 | 14 | Negative | −1.001 | 0.723 | 0.008 |
| 16 | 11 | Negative | −7.431 | 0.715 | 0.001 |
| 17 | 6 | Positive | 2.315 | 0.714 | 0.001 |
| 18 | 4 | Positive | 0.831 | 0.704 | 0.010 |
| 19 | 5 | Positive | 2.169 | 0.671 | 0.017 |
| 20 | 12 | Negative | −3.241 | 0.655 | 0.017 |

TABLE 3-continued

| Sequence | Surface number | Type of reflected image | Reflection magnification β | Projection position (mm) | Proximity interval (mm) |
|---|---|---|---|---|---|
| 21 | 13 | Negative | −2.430 | 0.630 | 0.025 |
| 22 | 9 | Negative | −9.336 | 0.598 | 0.031 |
| 23 | 3 | Positive | 1.747 | 0.545 | 0.054 |
| 24 | 2 | Positive | 2.901 | 0.227 | 0.003 |
| 25 | 1 | Positive | 1.000 | 0.224 | 0.003 |
| 26 | 4 | Negative | −1.203 | −1.742 | 1.966 |

From [Table 3], it can be seen that close reflected images can also be distinguished using the difference in reflection magnification.

For example, the proximity distance between the positively reflected image formed on the first surface and the positively reflected image formed on the second surface is significantly close to 0.003 mm, but the reflection magnifications β thereof are 1.000 and 2.901, respectively, and are completely different from each other.

For example, as shown in [Table 1], because the proximity distance of the apparent spherical centers between the ninth and twelfth surfaces is significantly close to 0.006 mm, each reflected image cannot be distinguished in the conventional autocollimation method. However, as shown in [Table 3], in the measurement with L set to 0.447 mm, a distance from the positively reflected image formed on the eleventh surface closest to the positively reflected image formed on the ninth surface is 0.123 mm. For example, if the depth of field of the optical observation system is about 0.03 mm, a reflected image other than the positively reflected image formed on the ninth surface including the positively reflected image formed on the twelfth surface is not reflected on the display screen 23a. In this case, an image of a single reflected image is observed on the display screen 23a.

A set range of the I-O distance L has a certain degree of freedom. However, a position of the reflected image $I_{Rm}$ to appear on the observed surface F' in the direction along the optical axis $O_M$ of the optical image IP' and reflection magnification β thereof change with the magnitude of the I-O distance L. Depending on the magnitude of the error in the value of the I-O distance L, there is a possibility that a measurement error of the eccentricity amount of the apparent spherical center of the surface Si under test will increase or the work of identifying the reflected image will be blocked.

For example, the optical measurement system 20 has a manufacturing error and the adjustment lens drive unit 21 also has a movement error. Thus, there is a possibility that the I-O distance of the eccentricity measurement device 50 adjusted by moving the adjustment lens 13 will be shifted from the set value L calculated from Eq. (1).

In the present embodiment, the I-O distance L can be measured as follows by actually measuring displacement $D_P$ of the positively reflected image and displacement $D_N$ of the negatively reflected image on the surface under test using an optical reference element. Thereby, the value of the I-O distance L set by moving the adjustment lens 13 can be measured.

As the optical reference element, an appropriate optical element including a surface under test having a known radius of curvature that is not infinite can be used. The radius of curvature of the optical reference element is more preferably 50% or more and 200% or less of the set value L.

Both the displacement $D_P$ of the positively reflected image and the displacement $D_N$ of the negatively reflected image are represented by Eq. (3). In the measurement of positively and negatively reflected images, $f_k$, $f_p$, θ, and p are identical. Thus, if the reflection magnification β of the surface under test forming the positively reflected image is denoted by $β_P$ and the reflection magnification β of the surface under test forming the negatively reflected image is denoted by $β_N$, the following Eq. (5) is satisfied.

[Math. 5]

$$\frac{D_P}{D_N} = \frac{β_P}{β_N} \quad (5)$$

Here, the right side of Eq. (5) is set as C. From Eq. (2), because one of $\{L+\sqrt{(L^2+R^2)}\}/R$ is $β_P$ and the other is $β_N$, $β_P$ and $β_N$ are deleted from Eq. (5) by substituting into Eq. (5), and solving for L, the following Eq. (a) is obtained, regardless of the positive or negative sign of R.

R in Eq. (a) is the radius of curvature of the surface under test in the optical reference element used for measurement.

[Math. 6]

$$L = \frac{-R^2(C+1)}{2\sqrt{-CR^2}} \quad (a)$$

$$C = \frac{D_P}{D_N} \quad (b)$$

If the displacements $D_P$ and $D_N$ are actually measured using an optical reference element having a known radius of curvature of the surface under test and substituted into Eqs. (a) and (b), a value of the actually set I-O distance is obtained in the eccentricity measurement device 50. Hereinafter, the measured value of L obtained from Eq. (a) on the basis of the measured value of the variable C may be referred to as a measured value Lm so that it is distinguished from the set value L of the I-O distance.

As shown in Eq. (5), the variable C is a ratio of the positive reflection magnification to the negative reflection magnification of the reference surface. This is an example in which the displacements $D_P$ and $D_N$ are used to measure the variable C. The variable C can be measured using an appropriate amount proportional to the positive and negative reflection magnifications of the reference surface.

For example, when an index having a magnification measurement unit as shown in FIG. 10 is used as the optical image IP', the reflection magnification $w_{Rx}/w_{Px}$ ($=w_{Ry}/w_{Py}$) in the positively reflected image calculated from the magnification measurement unit may be used instead of $D_P$ and the reflection magnification $-w_{Rx}/w_{Px}$ ($=-w_{Ry}/w_{Py}$) in the negatively reflected image calculated from the magnification measurement unit may be used instead of $D_N$.

The I-O distance can be measured as necessary. The I-O distance may be measured, for example, when the set value L of the I-O distance has been changed. The I-O distance may be measured when positions of the optical elements included in the optical measurement system 20, for example, the adjustment lens 13, the objective lens 15, and the image-formation lens 16, are adjusted or the optical elements are replaced. The I-O distance may be measured, for example, before eccentricity measurement of the optical system 41A under test starts.

In the present embodiment, because the optical reference element is also used for measuring the reference point to be described below, a detailed I-O distance measurement method will be described together with a reference point measurement method to be described below.

On the basis of the actual measured values of the displacement $D_P$ of the positively reflected image and the displacement $D_N$ of the negatively reflected image, the manufacturing error of the optical element of the optical measurement system 20 and the movement error of the adjustment lens 13 are reflected in the measured value Lm obtained from Eq. (a). Thus, it is closer to the actual value than the value of the set value L of the I-O distance calculated from Eq. (1) on the basis of the design value of the optical element of the optical measurement system 20.

By using the measured value Lm based on this measurement for eccentricity measurement, the measurement workability of eccentricity measurement and measurement accuracy can be improved.

That is, if the value of the set I-O distance is accurately known, the reflected image in the direction along the optical axis $O_M$ can be more easily found.

When the measured value Lm of the set I-O distance is obtained, the reflection magnification β of the apparent surface si under test can be calculated more accurately by substituting the measured value Lm into L in Eq. (2). Thus, the measurement accuracy of the eccentricity amount δ of the apparent spherical center of the surface Si under test is improved.

Next, details of the eccentricity measurement method of the present embodiment will be described.

Figure 13:
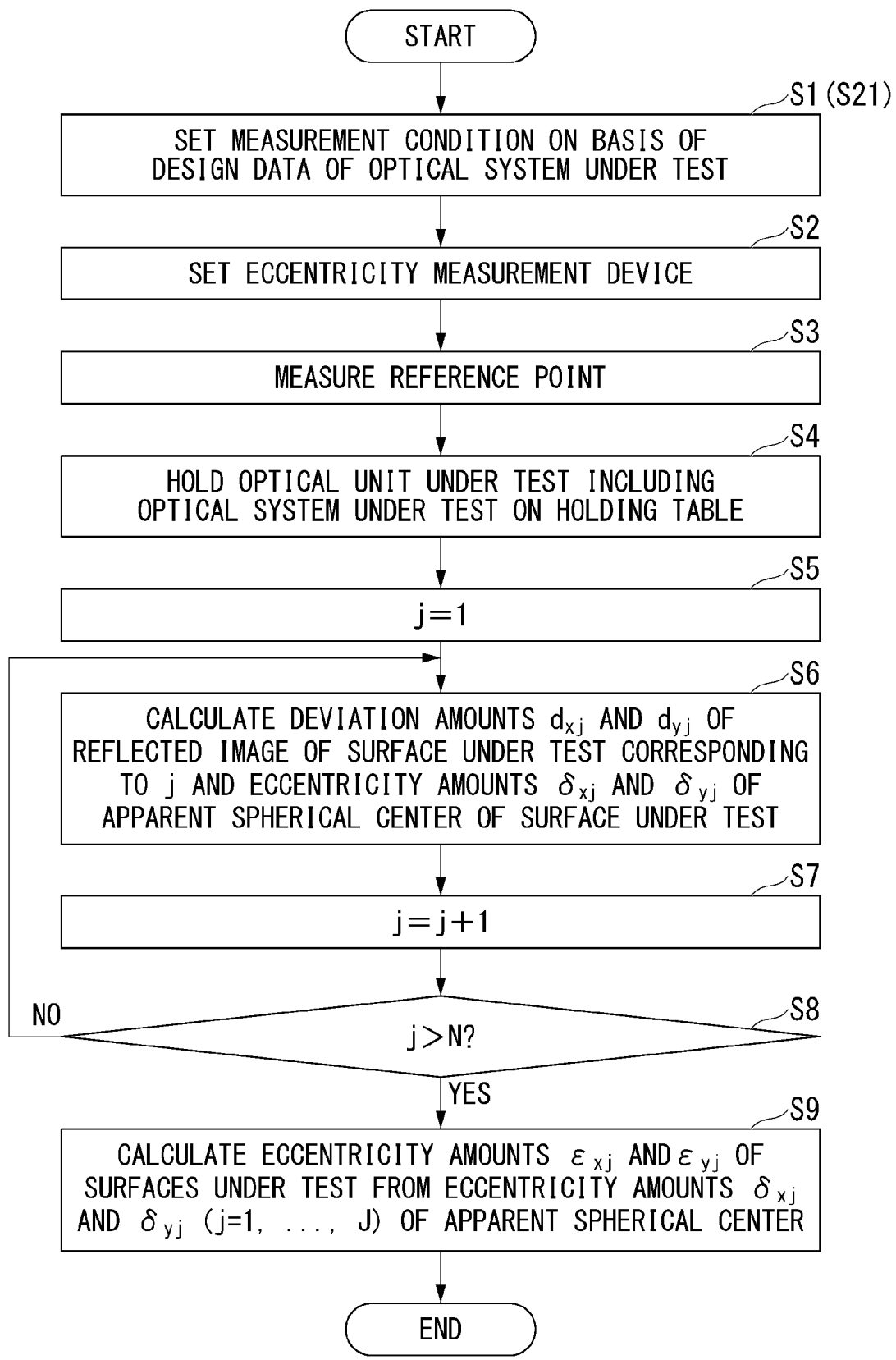
FIG. 13 is a flowchart showing an example of the eccentricity measurement method according to the first embodiment of the present invention.

FIG. 13 is a flowchart showing an example of the eccentricity measurement method according to the first embodiment of the present invention.

In the eccentricity measurement method of the present embodiment, steps S1 to S9 are executed on the basis of the flow shown in FIG. 13.

In step S1, measurement conditions for eccentricity measurement are set on the basis of the design data of the optical system 41A under test.

Examples of the design data include design values such as the number of surfaces Si under test for which eccentricity measurement is performed, the radius r of curvature of each surface Si under test, a surface interval d, and a refractive index ne written in [Table A]. The design data is stored in the storage unit 104 of the measurement control unit 5.

The design data may include various data that can be calculated using the design value. In this case, the general control unit 101 of the measurement control unit 5 transmits the stored design value to the arithmetic processing unit 102 and causes the arithmetic processing unit 102 to calculate a numerical value necessary for eccentricity measurement. The calculated numerical value is stored in the storage unit 104.

Examples of the calculated value using the design value include a position of the apparent surface top V, an apparent radius R of curvature, and a position of an apparent spherical center SC in [Table A].

However, the design data may be stored in the storage unit 104 as a calculated value calculated in advance by another computer or the like. In this case, the arithmetic process of the measurement control unit 5 can be omitted.

Examples of the measurement conditions to be set include the set value L of the I-O distance, the selection of the objective lens 15, the selection of the optical reference element, and the selection of the type of reflected image for each surface Si under test used for eccentricity measurement. However, it is only necessary to select the type of reflected image before the surface Si under test to be measured is measured and the type of reflected image may not be selected in this step.

The value of the set value L may be selected by the measurer or the measurement control unit 5 may be selected on the basis of the apparent radius Ri of curvature of each surface Si under test. For example, the value of the set value L is selected as 0.447 mm.

After the value of the set value L is selected, the measurement control unit 5 may cause the arithmetic processing unit 102 to calculate a numerical value capable of being calculated using the set value L and the design data among the numerical values used for eccentricity measurement. For example, as shown in [Table 2], the projection position of the optical image IP' and the reflection magnification β are calculated by the arithmetic processing unit 102 for each surface Si under test and the calculation result may be stored in the storage unit 104.

After the set value L of the I-O distance is selected, the measurer selects the objective lens 15.

In the eccentricity measurement device 50, because there is a mechanical restriction on the movement range of the adjustment lens 13, a lens having a focal length for setting the I-O distance to the set value L within the movement range of the adjustment lens 13 is selected as the objective lens 15. At that time, a lens that does not interfere with eccentricity measurement in terms of a working distance, observation magnification, numerical aperture, and the like is selected.

For example, when the value of L is 0.447 mm, lenses having a focal length of 3.6 mm, an NA of 0.3, and a working distance of 18 mm may be selected as the objective lens 15. In this case, it is necessary to position the adjustment lens 13 so that the optical image IP created by the adjustment lens 13 is at the position of $p=-3.6^2/(0.447)=-29$ (mm).

In the present embodiment, the optical reference element is particularly used for measuring the I-O distance (hereinafter referred to as I-O distance measurement) and measuring the reference point $(X_0, Y_0)$ on the measurement imager 17 (hereinafter referred to as reference point measurement).

The optical reference element is an appropriate type of optical element having a reference surface consisting of a spherical surface having a known radius of curvature. The reference surface is convex when the set value L of the I-O distance is positive and the reference surface is concave when the set value L of the I-O distance is negative. The reference surface preferably has a tolerance of 1 μm or less of the radius of curvature and is polished with high accuracy.

Because the optical reference element only needs to have one reference surface, the optical reference element may be, for example, a single lens. When the reference surface is convex, a biconvex lens, a meniscus lens, a plano-convex lens, a hemispherical lens, a ball lens, and the like may be used. When the reference surface is concave, a biconcave lens, a meniscus lens, a plano-concave lens, and the like may be used.

Because the reference surface is used as a reflective surface, the material is not particularly limited as long as the surface accuracy is suitable and the reflectivity is sufficient to observe the reflected image. For example, the material of the optical reference element may be a material, which does not transmit light, such as a metal or ceramic.

The radius of curvature of the reference surface of the optical reference element is more preferably close to the set value L of the I-O distance. As will be described below, the measurement accuracy of the reference point is improved as the radius of curvature of the surface under test is close to the I-O distance L.

However, providing an optical reference element having a radius of curvature identical to the set value L of the I-O distance suitable for various optical systems 41A under test requires a great deal of effort and cost. Thus, several types of optical reference elements having a radius of curvature of the reference surface may be provided and those close to the set value L may be selected.

Hereinafter, an example in which a ball lens has a diameter of 0.900 mm and is polished with high accuracy will be described as an optical reference element. Because the radius of curvature of this ball lens is 0.450 mm, it is close to the set I-O distance L.

The optical reference element has a plurality of lenses and the reference surface may be located behind the first surface. In this case, a lens surface having an apparent radius of curvature close to the I-O distance L is used as the reference surface.

For example, in the optical system 41 under test, when it is known that a surface under test having an apparent radius of curvature close to the I-O distance L is formed with high accuracy, the optical system 41 under test itself may be used as an optical reference element. In this case, after step S3 to be described below ends, because eccentricity measurement of the optical system 41 under test can be performed immediately without replacing the optical reference element with the optical system 41 under test, efficient measurement can be performed.

A method of selecting a reflected image in the eccentricity measurement method of the present embodiment will be described.

In the eccentricity measurement of the present embodiment, it is only necessary to observe one of the positively reflected image and the negatively reflected image for each surface Si under test.

When the type of reflected image is selected, the projection position of the optical image IP' for forming a reflected image for each surface Si under test and the reflection magnification of the reflected image are determined.

For example, the type of reflected image formed when each surface Si under test is measured can be appropriately selected from the viewpoint of improving measurement workability and reducing measurement error and the like. For example, the type of reflected image may be selected from the viewpoint of setting a suitable projection position or reflection magnification in measurement.

The selection of the type of reflected image is preparatory work for determining a projection position for forming a reflected image for each surface Si under test and determining a movement position of the main body portion 3 corresponding to each projection position.

When the measurement conditions necessary for eccentricity measurement are set, step S1 in FIG. 13 ends.

As shown in FIG. 13, after step S1 ends, step S2 is executed.

In step S2, the eccentricity measurement device 50 is set.

The setting includes, for example, a process of performing the replacement or attachment for an objective lens 15 suitable for observing the image of the optical system 41A under test and positioning the adjustment lens 13 in the direction along the optical axis $O_M$. The position of the adjustment lens 13 is set so that a distance p' between the focal plane F' and the projection surface P' of the objective lens 15 in the direction along the optical axis $O_M$ matches an absolute value of the I-O distance L obtained in step S1.

After the setting ends, step S3 is executed.

Steps S1 and S2 are examples of a first step of holding an optical unit under test having a surface under test, projecting an optical image for measurement onto the optical unit under test, relatively linearly moving the projected optical image to the optical unit under test, and providing an eccentricity measurement device having a measurement imager configured to acquire an image of an observed surface orthogonal to a reference axis defined by a relative movement trajectory of the projected optical image in air for the optical unit under test. The optical image IP is an optical image for measurement and the optical image IP' is an example of a projected optical image. The image surface $I_B$ and the focal plane F' of the measurement imager 17 are conjugate to each other.

In step S3, the reference point in the eccentricity measurement is measured. In this step, an example in which the I-O distance is measured will be described.

The optical axis $O_M$ on the design of the optical measurement system 20 has been described as an ideal axis of the optical measurement system 20 when there is no error in the eccentricity of each optical system of the optical measurement system 20. However, if there is an error in the eccentricity of each optical system of the optical measurement system 20, the optical image IP' is laterally shifted within a plane orthogonal to the optical axis $O_M$ of the eccentricity measurement device 50. Although the center position on the measurement imager 17 that photoelectrically converts the optical image in the image surface $I_B$ is ideally conjugate to the intersection of the optical axis $O_M$ on the focal plane F' (the observed surface F') on design, the center position on the measurement imager 17 that photoelectrically converts the optical image in the image surface $I_B$ is conjugate to a point that laterally deviates from the intersection of the optical axis $O_M$ on the focal plane F' (the observed surface F') if there is an error in the eccentricity of each optical system in the optical measurement system 20.

For example, there is a possibility that the eccentricity error of the objective lens 15 and the adjustment lens 13 will change every time the eccentricity measurement device 50 is set. Thus, there is a possibility that a position of the conjugate point at the center of the measurement imager 17 that photoelectrically converts the optical image IP' and the optical image in the image surface $I_B$ will change in a plane orthogonal to the optical axis $O_M$ every time the eccentricity measurement device 50 is set.

Although the moving direction along the z-axis of the moving stage 2 is ideally the same as a direction of the optical axis $O_M$ on design, there is a possibility that the moving direction will not be completely the same as the direction of the optical axis $O_M$ due to the assembly error of the optical measurement system 20 and the moving stage 2 or the manufacturing error of the moving stage 2, i.e., the moving direction will be slightly shifted.

That is, there is a possibility that the optical axis $O_M$ in the eccentricity measurement device 50 and the reference axis $O_m$ defined by the movement trajectory of the optical image IP' will not be coaxial and there is a possibility that the position on the measurement imager 17 corresponding to the position of the reference axis $O_m$ will not be the center position on the measurement imager 17.

In the present embodiment, the deviation amount is calculated from the image acquired by the measurement imager 17 from the reference axis $O_m$ of the reflected image. Thus, it is necessary for the position of the reference point on the measurement imager 17 corresponding to the position of the reference axis $O_m$ to be accurately known.

Furthermore, as described above, when the value of the I-O distance L changes, the position of the reflected image and the reflection magnification change. By actually measuring the set I-O distance L and reflecting the measured I-O distance L in the calculation of the deviation amount, the measurement accuracy of the deviation amount can be improved.

In the present embodiment, the actually measured value of the I-O distance L is also used to calculate the position of the reference point.

Figure 14:
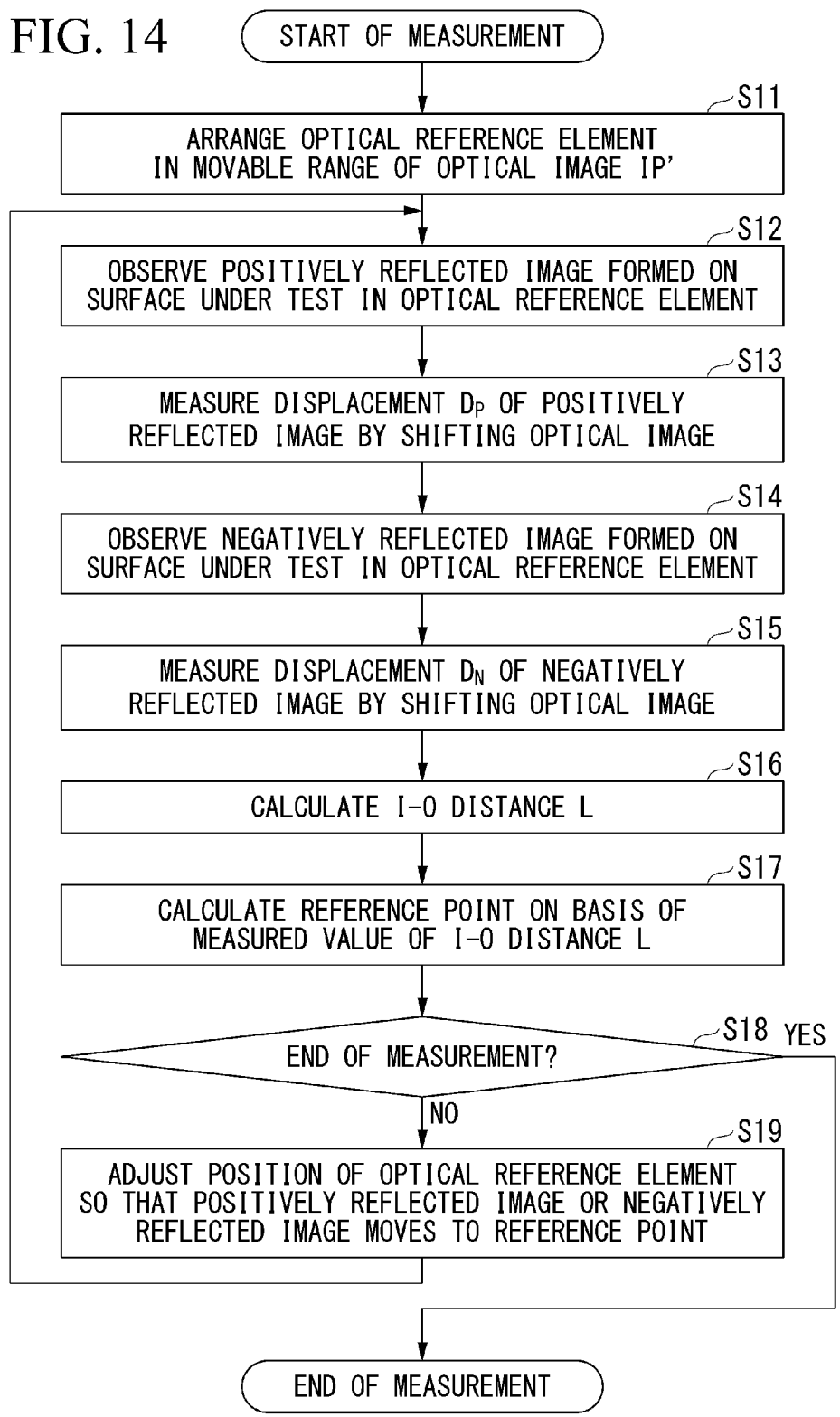
FIG. 14 is a flowchart showing an example of a reference point measurement method in the eccentricity measurement method according to the first embodiment of the present invention.
Figure 15:
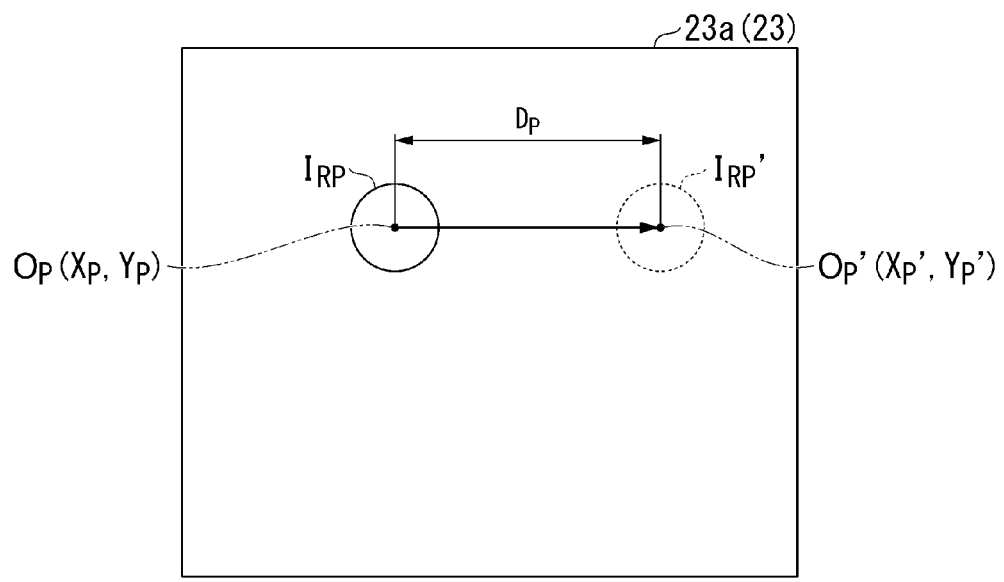
FIG. 15 is a schematic diagram showing a method of measuring an I-O distance L in the eccentricity measurement method according to the first embodiment of the present invention.
Figure 16:
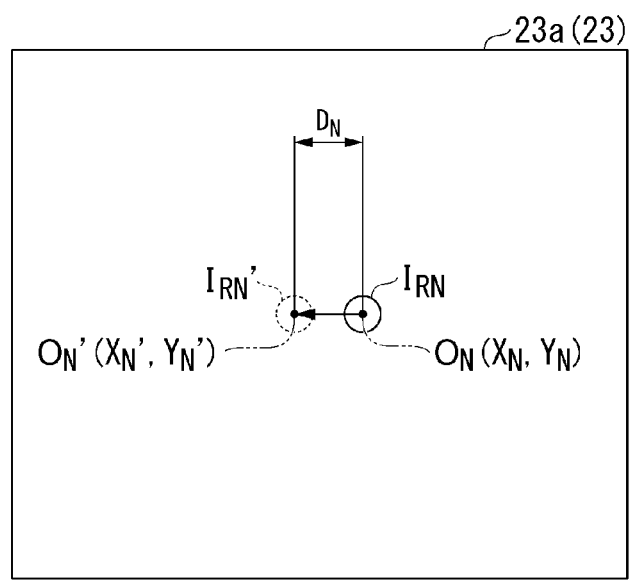
FIG. 16 is a schematic diagram showing a method of measuring the I-O distance L in the eccentricity measurement method according to the first embodiment of the present invention.

FIG. 14 is a flowchart showing an example of a reference point measurement method in the eccentricity measurement method according to the first embodiment of the present invention. FIGS. 15 and 16 are schematic diagrams showing a method of measuring an I-O distance L in the eccentricity measurement method according to the first embodiment of the present invention.

In step S3, steps S11 to S19 are executed according to the flow shown in FIG. 14. Steps S12 to S16 are steps related to T-O distance measurement. Step S17 is a step related to reference point measurement.

In step S11, as shown by a two-dot chain line in FIG. 1, the optical reference element 43 is arranged instead of the optical system 41A under test in a range where the optical image IP' can be moved by the movement of the moving stage 2. The optical reference element 43 is held on the holding table 4 by the holder 4a.

Although the optical reference element 43 shown in FIG. 1 is held by the holder 4a of the holding table 4, the optical reference element 43 may be held by a member other than the holding table 4 if the position for the base 1 is fixed during the measurement.

As the optical reference element 43, for example, a ball lens having a diameter of 0.900 mm can be used. Because the set I-O distance L is a positive value of 0.447 mm, the first surface, which is a convex spherical surface on the front side of the optical reference element 43, is the surface 43a under test in this measurement. The radius of curvature of the surface 43a under test is 0.450 mm.

The spherical center of the surface 43a under test is arranged, for example, near the designed optical axis $O_M$, preferably on the optical axis $O_M$. As for the holding position of the optical reference element 43 in the direction along the z-axis, each projection position where the positively reflected image and the negatively reflected image by the surface 43a under test are observed is more preferably in a range that overlaps the projection position used for measuring the optical system 41A under test.

In the following [Table 4], a projection position of the optical image IP' for forming a positively reflected image and a negatively reflected image when the I-O distance L is 0.447 mm, reflection magnification β, and a value of (1−β) are shown. Here, the projection position is a projection position when the I-O distance is fixed at 0.447 mm and the main body portion 3 is moved using the moving stage 2. Thus, the position of the adjustment lens 13 in the optical measurement system 20 is fixed. The coordinate system of the projection position is positive in the direction from the eccentricity measurement device 50 to the optical reference element 43 using the surface top of the first surface of the optical reference element 43 as the origin (the same is also true hereinafter).

TABLE 4

| Type of reflected image | Projection position (mm) | Reflection magnification β | 1-β |
|---|---|---|---|
| Positive | 0.131 | 2.403 | −1.403 |
| Negative | 0.766 | −0.416 | 1.426 |

As shown in [Table 4], the reflection magnification is 2.403 mm for the positively reflected image and −0.416 mm for the negatively reflected image. (1−β) denoting the sensitivity of the deviation in the direction orthogonal to the optical axis $O_M$ of the reflected image with respect to the eccentricity of the surface 43a under test is −1.403 for the positively reflected image and 1.416 for the negatively reflected image.

Thus, by selecting the radius of curvature of the surface 43a under test as a value close to the I-O distance L, the magnitude (|1−β|) of the sensitivity of the reflected image is substantially equal.

In step S12, a positively reflected image formed on the surface 43a under test is observed.

First, in a state in which the light source 10 is turned on, the moving stage 2 is driven in a direction along the z-axis and the optical image IP' is moved on the surface 43a under test. Although it may be visually confirmed whether or not the optical image IP' has been projected onto the surface 43a under test, it is more preferable to provide a mechanism for more simple confirmation in the eccentricity measurement device 50.

In the present embodiment, as shown in FIG. 1, an observation imager 44 is arranged to observe an image of a position optically conjugate to the projection surface P'. The optical image IP' and an image near the optical image IP' can be observed in a wide field of view by the observation imager 44. Thus, it is possible to confirm whether or not the optical image IP' has been projected onto the surface 43a under test through a video captured by the observation imager 44.

Subsequently, the moving stage 2 is driven along the z-axis and the main body portion 3 is moved 0.131 mm toward the optical reference element 43 so that the positively reflected image is observed.

If the value of the I-O distance L on the eccentricity measurement device 50 set in step S2 matches the set value of the I-O distance L determined in step S1, a positively reflected image is formed on the observed surface F'. In this case, because an image is formed on the imaging surface of the measurement imager 17 conjugate to the observed surface F' through the optical observation system, the measurer can observe the positively reflected image on the display screen 23a of the display unit 23.

However, when the I-O distance L on the eccentricity measurement device 50 is shifted from the set value, the reflected image cannot be observed. In this case, the optical measurement system 20 finds a positively reflected image formed on the surface 43a under test by appropriately moving the fixed main body portion 3 along the z-axis.

FIG. 15 shows a state in which a positively reflected image $I_{Rp}$ (see the solid line) is observed.

A center $O_B$ of the display screen 23a is represented by an xy coordinate system fixed in the measurement imager 17, for example, (Xc, Yc). Here, an X-axis and a Y-axis are parallel to the x-axis and the y-axis of the eccentricity measurement device 50, respectively.

The general control unit 101 calculates position coordinates $(X_P, Y_P)$ of a center $O_P$ of the positively reflected image $I_{R_P}$ by causing the image, which is transmitted from the measurement imager 17, to be processed by the image processing unit 103.

Accordingly, step S12 ends.

Subsequently, step S13 is executed.

In step S13, the optical image IP' is shifted in a direction orthogonal to the optical axis $O_M$ and the displacement $D_P$ of the positively reflected image $I_{RP}$ is measured.

The measurer performs an operation input for inserting the wedge prism 18 into the optical path of the parallel beam F2 via the operation unit 24. When the operation input is detected, the general control unit 101 of the measurement control unit 5 transmits a control signal to the shift amount controller 107 and drives the wedge prism drive unit 22. Thereby, the wedge prism 18 advances into the optical path of the parallel beam F2.

Thereby, for example, the optical image IP' is shifted in the direction along the x-axis. As a result, the positively reflected image $I_{RP}$ is shifted to the position of the positively reflected image $I_{RP}'$ indicated by a dashed line in FIG. 15. The general control unit 101 calculates the position coordinates $(X_P', Y_P')$ of the center $O_P'$ of the positively reflected image $I_{RP}'$.

The general control unit 101 transmits $O_P(X_P, Y_P)$ and $O_P'(X_P', Y_P')$ to the arithmetic processing unit 102 and causes the arithmetic processing unit 102 to calculate the displacement $D_P$ of the positively reflected image $I_{RP}'$. The calculated value is stored in the storage unit 104.

Accordingly, step S13 ends.

Subsequently, step S14 is executed.

In step S14, a negatively reflected image formed on the surface 43a under test is observed.

As in step S12, after the main body portion 3 moves to a position where the optical image IP' is projected onto the surface 43a under test, the main body portion 3 is moved 0.766 mm toward the optical reference element 43 so that the negatively reflected image is observed.

When the reflected image cannot be observed, a negatively reflected image formed on the surface 43a under test is found by appropriately moving the main body portion 3 along the z-axis from a moving destination as in step S52.

FIG. 16 shows a state in which a negatively reflected image $I_{RN}$ (see the solid line) is observed.

The general control unit 101 calculates position coordinates $(X_N, Y_N)$ of a center $O_N$ of the negatively reflected image $I_{RN}$ as in step S12.

Accordingly, step S14 ends.

Subsequently, step S15 is executed.

In step S15, the optical image IP' is shifted in a direction orthogonal to the optical axis $O_M$ as in step S13 and the displacement $D_N$ of the negatively reflected image $I_{RN}$ is measured.

The general control unit 101 causes the position coordinates $(X_N', Y_N')$ of the center $O_N'$ of the negatively reflected image $I_{RN}'$ to be calculated and transmits $O_N(X_N, Y_N)$ and $O_N'(X_N', Y_N')$ calculated in step S54 to the arithmetic processing unit 102 and causes the arithmetic processing unit 102 to calculate the displacement $D_N$ of the negatively reflected image $I_{RN}'$. The calculated value is stored in the storage unit 104.

Accordingly, step S15 ends.

Subsequently, step S16 is executed.

In step S16, the I-O distance L is calculated on the basis of the displacements $D_P$ and $D_N$ and the radius R of curvature of the surface 43a under test in the optical reference element 43.

The general control unit 101 transmits the values of the displacements $D_P$ and $D_N$, and the radius R of curvature to the arithmetic processing unit 102 and causes the arithmetic processing unit 102 to calculate the I-O distance L.

The arithmetic processing unit 102 calculates the value of the I-O distance L on the basis of the above Eqs. (a) and (b). Thereby, the measured value Lm of the I-O distance L is obtained. The value of Lm is transmitted to the general control unit 101 and stored in the storage unit 104.

Hereinafter, a case where the value of the I-O distance L measured as described above is 0.510 mm will be described.

Accordingly, step S16 ends and the I-O distance measurement ends.

Although an example in which the negatively reflected image is observed and the displacement $D_N$ is measured after the positively reflected image is observed and the displacement $D_P$ is measured has been described in the above steps S11 to S16, the positively reflected image may be observed and the displacement $D_P$ may be measured after the negatively reflected image is observed and the displacement $D_N$ is measured. That is, steps S12 and S13 may be executed after steps S14 and S15.

Subsequently, step S17 is executed.

In step S17, a reference point is calculated on the basis of the measured value of the I-O distance L calculated in step S56.

Herein, the reference point is a point to be used as the origin in the measurement of the deviation amount of the reflected image. Because the deviation amount of the reflected image is calculated from the image on the measurement imager 17, the reference point preferably matches the center $O_B$ of the measurement imager 17. However, because there are a manufacturing error and an assembly error in the eccentricity measurement device 50 and the optical measurement system 20, the center $O_B$ is often shifted from the reference point to a degree that is unacceptable for eccentricity measurement. When the holding table 4 has a rotation holding mechanism that can accurately rotate an object under test around the reference axis of measurement, it is only necessary to use the rotation center of the reflected image as the reference point.

However, for example, in the object under test such as the tip portion of the endoscope, a curved portion and a flexible tube portion are connected to the rear end of the tip portion and are long and the curved portion and the flexible tube portion must also be rotated together with the tip portion so that the tip portion is rotated. Thus, it is difficult to provide a rotation holding mechanism for the object under test such as the tip portion of the endoscope.

In the present embodiment, the movement trajectory of the optical image IP' is set as the reference axis $O_m$ for eccentricity measurement. In this case, the reference point is an intersection between the observed surface F', which is the object surface of the optical observation system optically conjugate to the imaging surface of the measurement imager 17, and the movement trajectory of the optical image IP'.

Before the specific example of step S17 is described, the principle of reference point measurement in the present embodiment will be described.

Figure 17:
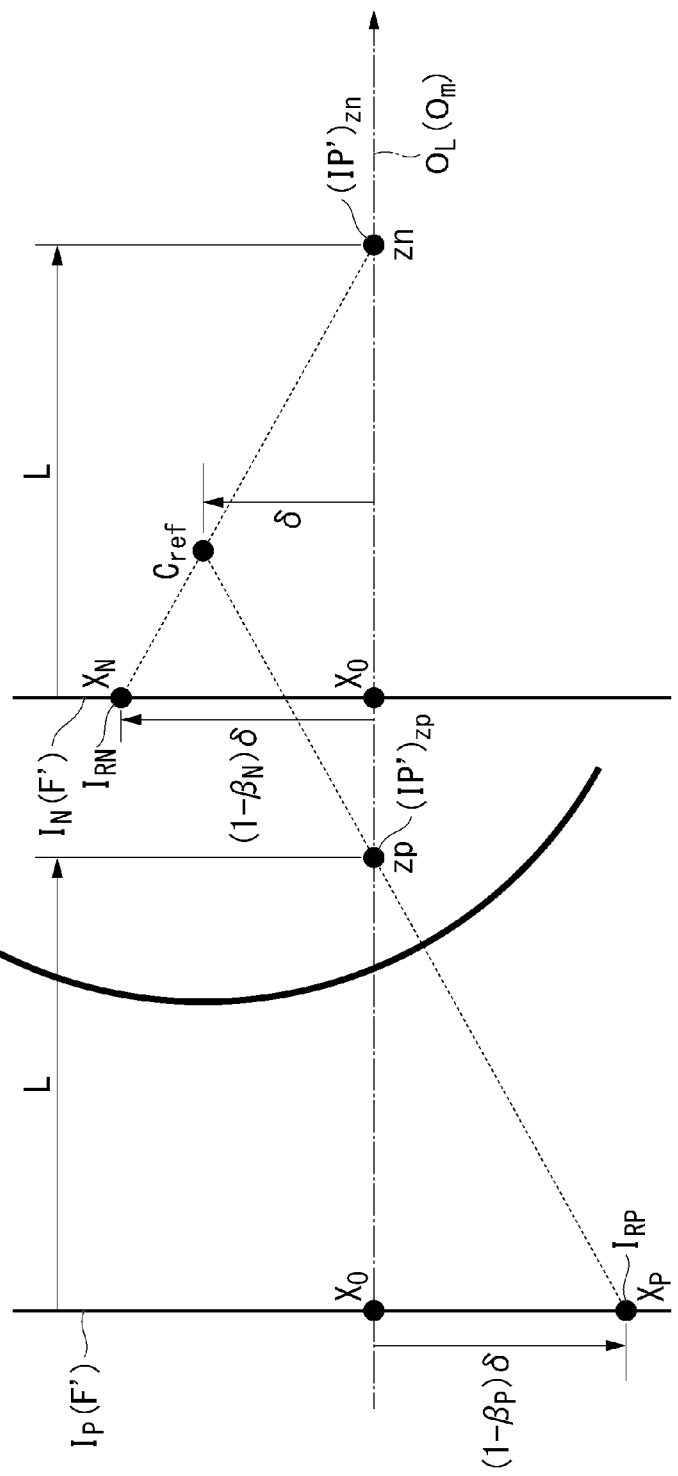
FIG. 17 is a schematic diagram for describing the principle of reference point measurement in the eccentricity measurement method according to the first embodiment of the present invention.
Figure 18:
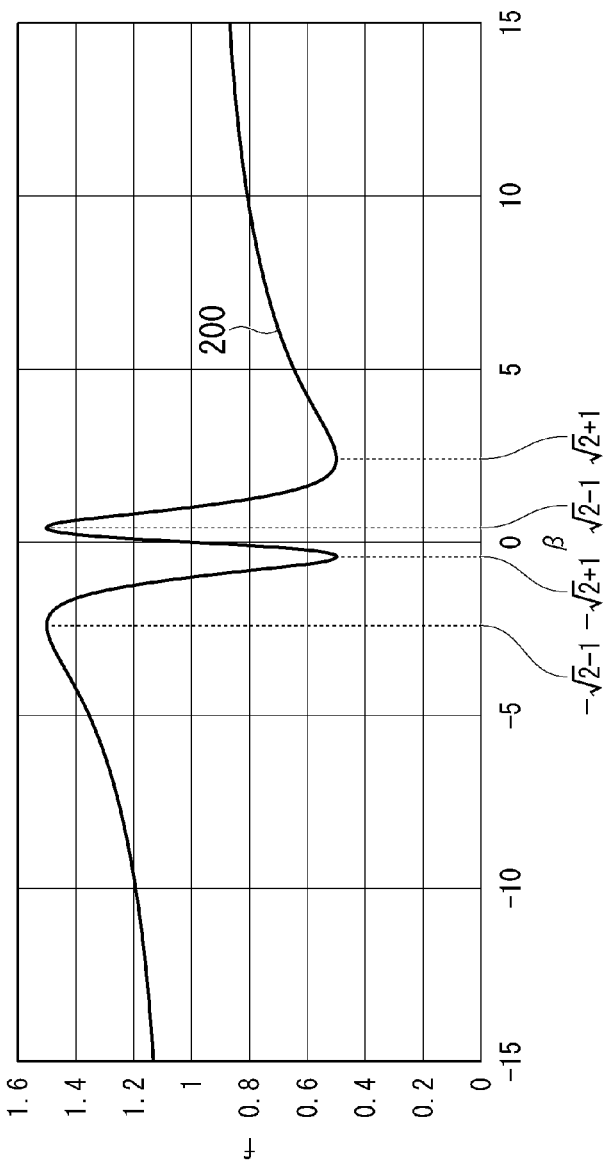
FIG. 18 is a graph showing a change in uncertainty of the reference point measurement corresponding to reflection magnification.

FIG. 17 is a schematic diagram for describing the principle of reference point measurement in the eccentricity measurement method according to the first embodiment of the present invention. FIG. 18 is a graph showing a change in uncertainty of the reference point measurement corresponding to reflection magnification.

In FIG. 17, positional relationships between a spherical center $C_{ref}$ of the surface 43a under test, an optical image IP', and a positively reflected image $I_{RP}$ and a negatively reflected image $I_{RN}$ when the positively reflected image and the negatively reflected image are measured using the surface 43a in the optical reference element 43 are schematically shown. In this regard, for simplicity, it is assumed that an eccentricity amount δ of the spherical center $C_{ref}$ of the surface 43a under test occurs only in the direction along the x-axis.

When the optical image IP' is projected onto a point zp in the direction along the z-axis (denoted by (IP')$_{zp}$ in FIG. 17), the positively reflected image $I_{RP}$ is formed on the image surface $I_P$ at a distance of L from the point zp in the negative z-axis direction. Likewise, when the optical image IP' is projected onto a point zn (denoted by (IP')$_{zn}$ in FIG. 17), the negatively reflected image $I_{RN}$ is formed on an image surface $I_N$ at a distance of L from the point zn in the negative z-axis direction. The optical image IP' from the eccentricity measurement device 50 is moving on a straight-line $O_L$ through the points zp and zn. An amount of deviation from the straight-line $O_L$ on the image surface $I_P$ of the positively reflected image $I_{RP}$ is $(1-\beta_P)\delta$. An amount of deviation from the straight-line $O_L$ on the image surface $I_N$ of the negatively reflected image $I_{RN}$ is $(1-\beta_N)\delta$. Here, $\beta_P$ and $\beta_N$ are the reflection magnification of the positively reflected image and the reflection magnification of the negatively reflected image, respectively.

When the observed surface F' in the optical observation system is moved to match the image surfaces $I_P$ and $I_N$, the reflected image on each of the image surfaces $I_P$ and $I_N$ is observed on the image surface $I_B$ of the optical observation system, respectively. Because the observed surface F' moves with the optical measurement system 20 and the optical image IP', the reference point $X_0$ that is the intersection of the observed surface F' and the straight-line $O_L$ becomes the same position on the observed surface F' without depending on the position in the direction along the z-axis of the optical image IP'.

Thus, the position $X_P$ on the observed surface F' of the positively reflected image $I_{RP}$ when the observed surface F' has matched the image surface IP and the position $X_N$ on the observed surface F' of the negatively reflected image $I_{RN}$ when the observed surface F' has matched the image surface $I_N$ have relationships between the reference point $X_0$ and the following Eqs. (6) and (7).

[Math. 7]
$$X_P - X_0 = (1 - \beta_P)\delta \quad (6)$$
$$X_N - X_0 = (1 - \beta_N)\delta \quad (7)$$

At the time of erasing δ from Eqs. (6) and (7) and solving for $X_0$, the following Eq. (c) is obtained.

[Math. 8]
$$X_0 = \frac{X_P(1-\beta_N) - X_N(1-\beta_P)}{\beta_P - \beta_N} \quad (c)$$

Likewise, the following Eq. (d) is obtained as the reference point $Y_0$ in the direction along the y-axis.

[Math. 9]
$$Y_0 = \frac{Y_P(1-\beta_N) - Y_N(1-\beta_P)}{\beta_P - \beta_N} \quad (d)$$

Although $(X_P, Y_P)$, $(X_N, Y_N)$, and $(X_0, Y_0)$ as positions on the observed surface F' has been described above, $(X_P, Y_P)$, $(X_N, Y_N)$, and $(X_0, Y_0)$ can be measured from position information on the image surface $I_B$ because they have a one-to-one relationship with the position coordinates on the image surface $I_B$ of the optical observation system.

Here, conditions for improving the measurement accuracy of the reference point $(X_0, Y_0)$ will be described.

Because Eqs. (c) and (d) include the measured values $(X_P, Y_P)$ and $(X_N, Y_N)$ of position information between the positively reflected image $I_{RP}$ in the image surface IP and the negatively reflected image $I_{RN}$ in the image surface $I_N$, uncertainty u associated with the measurement error is included.

From a propagation side of the uncertainty, composite standard uncertainty $u_c$ is represented by the following Eq. (8).

[Math. 10]
$$u_c^2 = \left\{ \left(\frac{1-\beta_N}{\beta_P-\beta_N}\right)^2 + \left(\frac{1-\beta_P}{\beta_P-\beta_N}\right)^2 \right\} u^2 \quad (8)$$

In Eq. (8), the expression in the curly braces that is a coefficient of $u^2$ is set as f. Here, if $\beta_P > 0$ and $\beta_P \beta_N = -1$ are used and the replacement with $\beta_P = \beta$ is performed, f is represented by a function of β as shown in the following Eq. (9) in the range of $\beta > 0$. Because the value of f does not change even if the denominator $(\beta_P - \beta_N)\beta$ in the small brackets of Eq. (8) is set as $(\beta_N - \beta_P)^2$, Eq. (9) is also similarly established for $\beta < 0$.

[Math. 11]
$$f = \frac{1}{(\beta^2+1)^2}(\beta^4 - 2\beta^3 + 2\beta^2 + 2\beta + 1) \quad (9)$$

Figure 21:
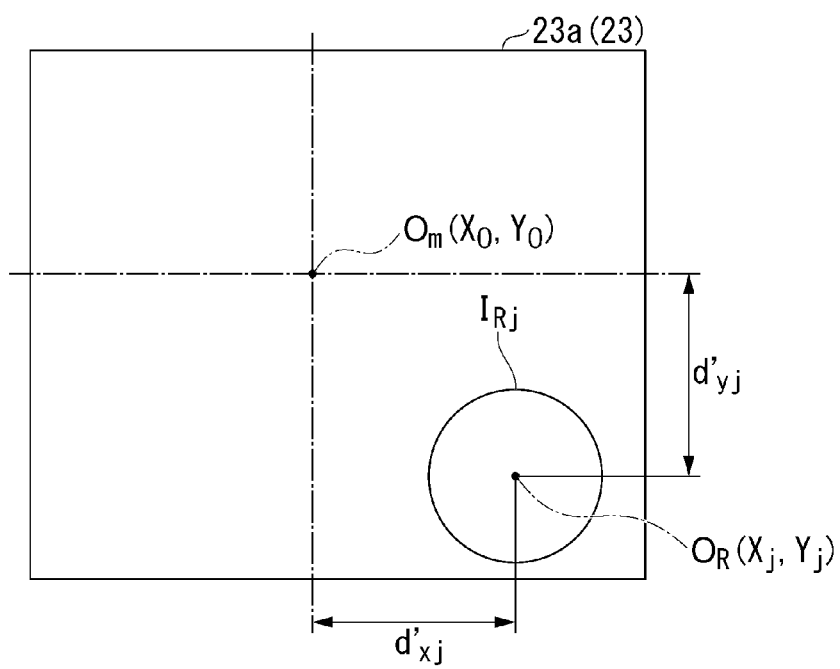
FIG. 21 is a schematic diagram showing an example of measurement of the amount of deviation of a reflected image in the eccentricity measurement method according to the first embodiment of the present invention.

A curve 200 shown in FIG. 18 is a graph of f (here, β≠0). In FIG. 21, the horizontal axis represents β and the vertical axis represents f.

To minimize the composite standard uncertainty $u_c$ due to the measurement error, it is only necessary to select β that takes a minimum value of the curve 200. When f is differentiated by β to obtain the minimum value of the curve 200, it can be seen that f takes a minimum value of 0.5 at $\beta = 1 \pm \sqrt{2}$. When $\beta = -1 \pm \sqrt{2}$, f takes a maximum value of 1.5. In $\beta = \pm 1$, f is 1. When β approaches ±δ, f is asymptotically close to 1.

Therefore, by performing the reference point measurement under the conditions of $\beta_P = 1 + \sqrt{2}$ and $\beta_N = 1 - \sqrt{2}$, it can be seen that $u_c$ is about $1/\sqrt{2}$ to $1/\sqrt{3}$ times smaller than under other conditions.

Substituting β for giving the minimum value of f into Eq. (2), a relationship L=R is obtained.

That is, it can be seen that the uncertainty of the reference point due to the measurement error can be minimized by matching the value of the I-O distance L with the radius R of curvature of the optical reference element 43. At this time, because $1-\beta_P = \sqrt{2}$ and $1-\beta_N = \sqrt{2}$, the sensitivity of the positively reflected image and the sensitivity of the negatively reflected image related to the eccentricity amount δ of the surface 43a under test are equal to each other.

Consequently, the optical reference element 43 preferably has a radius of curvature identical to the I-O distance L to be set so that the reference point is measured with high accuracy. Alternatively, the radius of curvature of the optical reference element 43 is more preferably 50% or more and 200% or less of the set value L.

The description returns to the specific example of step S17.

Figure 19:
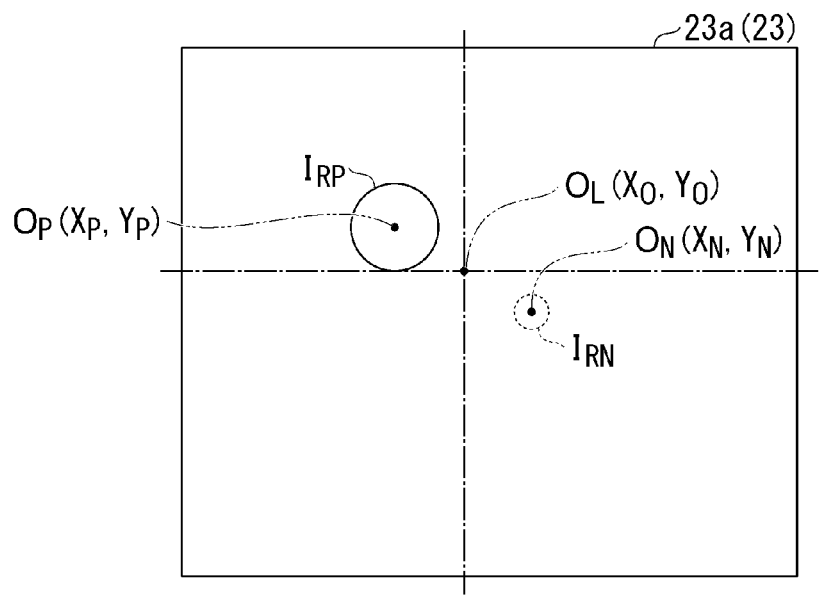
FIG. 19 is a schematic diagram showing an example of a reference point obtained in the eccentricity measurement method according to the first embodiment of the present invention.

FIG. 19 is a schematic diagram showing an example of a reference point obtained in the eccentricity measurement method according to the first embodiment of the present invention.

The following [Table 5] shows a projection position of the optical image IP', the reflection magnifications β of the positively reflected image and the negatively reflected image, and the calculated value of (1−β) when the measured value Lm of the I-O distance L is 0.510 mm.

TABLE 5

| Type of reflected image | Projection position (mm) | Reflection magnification β | 1-β |
|---|---|---|---|
| Positive | 0.140 | 2.645 | −1.645 |
| Negative | 0.820 | −0.378 | 1.378 |

As shown in [Table 5], the projection position is 0.140 mm for a positively reflected image and 0.820 mm for a negatively reflected image. The magnification β of the reflected image is 2.645 for the positively reflected image and −0.378 for the negatively reflected image. (1−β) is −1.645 for the positively reflected image and 1.378 for the negatively reflected image.

First, the positively reflected image is observed as in step S12. However, after the optical image IP' is aligned with the surface 43a under test, a drive amount of the moving stage 2 is set to 0.140 mm on the basis of [Table 5].

The measurer adjusts the drive amount of the moving stage 2 as necessary and finds a positively reflected image. In FIG. 19, a positively reflected image $I_{RP}$ displayed on the display screen 23a is indicated by a solid line. As in step S12, the position coordinates $(X_P, Y_P)$ of the positively reflected image $I_{RP}$ are calculated.

Subsequently, as in step S14, the negatively reflected image $I_{RN}$ is observed. In this regard, after the optical image IP' is aligned with the surface 43a under test, the drive amount of the moving stage 2 is set to 0.820 mm on the basis of [Table 5].

The measurer adjusts the drive amount of the moving stage 2 as necessary and finds a negatively reflected image. In FIG. 19, the negatively reflected image $I_{RN}$ displayed on the display screen 23a is indicated by a dashed line. As in step S14, the position coordinates $(X_N, Y_N)$ of the negatively reflected image $I_{RN}$ are calculated.

Subsequently, the coordinates of the reference point $(X_0, Y_0)$ are calculated by substituting $β_P$ and $β_N$ calculated on the basis of the measured value Lm of the I-O distance L and the position coordinates $(X_P, Y_P)$ and $(X_N, Y_N)$ into Eq. (c) and Eq. (d). This calculation is performed by the arithmetic processing unit 102 on the basis of the control signal of the general control unit 101. The calculated $(X_0, Y_0)$ is stored in the storage unit 104. $(X_0, Y_0)$ is calculated using the more accurate $β_P$ and $β_N$ by employing a value whose I-O distance L is close to the actual value rather than the design value.

Even if the optical reference element 43 is eccentric with respect to the straight-line $O_L$, $(X_0, Y_0)$ is calculated as an accurate value.

Accordingly, step S17 ends.

Although an example in which a negatively reflected image is observed after a positively reflected image is observed in step S17 has been described, the positively reflected image may be observed after the negatively reflected image is observed.

After step S17, step S18 is executed.

In step S18, it is determined whether or not to end the measurement.

The reference point measurement in step S17 is performed in a state in which the surface 43a under test deviates from the straight-line $O_L$ which is the reference axis. If there is an error in the measurement of the measured value Lm of the radius R of curvature and the I-O distance of the surface 43a under test, because the error of the reflection magnification changes, it becomes a factor in the measurement error of the reference point.

In order to further reduce the influence of measurement errors of R and Lm, more accurate I-O distance measurement and reference point measurement can be performed by measuring the reference point in the absence of eccentricity of the surface 43a under test.

For example, the magnitude of the eccentricity amount of the optical reference element 43 can be determined on the basis of a deviation amount of the reflected image from the reference point as shown in FIG. 19.

The measurer determines whether or not to end the measurement on the basis of the magnitude of the deviation amount of the reflected image and the like. Also, this determination may be made automatically on the basis of a tolerance value predetermined by the measurement control unit 5 calculating the deviation amount.

When the measurement ends, the general control unit 101 causes the arithmetic processing unit 102 to calculate the movement position of the main body portion 3 for forming the reflected image selected for each surface Si under test and reflection magnification of the selected reflected image on the basis of the measured value Lm of the I-O distance L calculated in step S16 executed at the last time and causes the storage unit 104 to store calculation results.

Accordingly, step S3 in FIG. 13 ends.

When it is determined that the measurement does not end, step S19 is executed.

In step S19, the position in the direction orthogonal to the z-axis of the optical reference element 43 is adjusted so that the center of the positively reflected image $I_{RP}$ or the negatively reflected image $I_{RN}$ moves to the reference point $(X_0, Y_0)$ measured in step S17.

Figure 20:
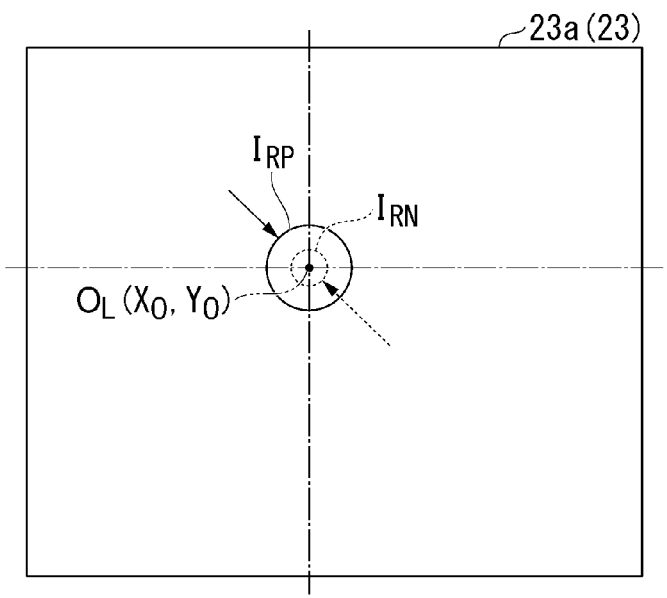
FIG. 20 is a schematic diagram showing an example of a display screen after the movement of an optical reference element in the eccentricity measurement method according to the first embodiment of the present invention.

FIG. 20 is a schematic diagram showing an example of a display screen after the movement of the optical reference element in the eccentricity measurement method according to the first embodiment of the present invention.

The position adjustment in this step corresponds to a process of making an adjustment so that the eccentricity amount δ related to the straight-line $O_L$ at the time of measurement in step S17 is 0 and positioning the spherical center $C_{ref}$ of the surface 43a under test on the straight-line $O_L$.

Which of the positively reflected image $I_{RP}$ and the negatively reflected image $I_{RN}$ is observed for the position adjustment is not particularly limited. For example, at the end of step S17, the observed reflected image may be used. In this case, because the moving stage 2 does not need to be driven again, rapid measurement can be performed.

In FIG. 20, the overlap of reflected images observed at the positions of the reflected images after the adjustment of the position of the optical reference element 43 is shown. When one reflected image is aligned with a reference point ($X_0$, $Y_0$), the other reflected image is also located at the reference point ($X_0$, $Y_0$).

Accordingly, step S19 ends.

After step S19, steps S12 to S17 are executed. Thereby, even if a slight error remains in the I-O distance L measured in step S16 in a state in which the eccentricity of the surface 43a under test is suppressed, the reference point can be measured with high accuracy.

Also, after step S19, by re-measuring the I-O distance L in steps S12 to S17, it is possible to measure the I-O distance L with high accuracy, even if there is an aberration such as distortion in the objective lens 15. However, when an aberration such as distortion in the objective lens 15 can be ignored, remeasurement of the I-O distance L may not be necessarily performed.

When step S3 ends, the reference point ($X_0$, $Y_0$) calculated at the end in step S17 can be used as the origin for measuring the amount of deviation of the reflected image, unless the setting of the optical measurement system 20 is changed subsequently. This corresponds to the fact that the reference axis $O_m$ of eccentricity measurement is defined by a straight-line $O_L$ which is the trajectory of the optical image IP' on the basis of actual measurement using the optical reference element 43.

Thus, in the present embodiment, it is not necessary to rotate the object under test to obtain the deviation center of the reflected image and determine the origin of eccentricity measurement. As a result, even if the object under test cannot be rotated and held, eccentricity measurement can be performed with high accuracy and quickly.

Step S3 is an example of a second step of identifying a position of a reference point corresponding to an intersection between the observed surface and the reference axis in the image acquired by the measurement imager.

As shown in FIG. 13, step S4 is executed after step S3.

In step S4, the optical unit under test including the optical system under test is held on the holding table.

For example, as shown in FIG. 1, instead of the optical reference element 43, the tip portion 40 including the optical system 41A under test is held by the holder 4a of the holding table 4. At this time, the tip portion 40 is more preferably arranged so that the designed optical axis of the optical system 41A under test is coaxial with the reference axis $O_m$ obtained in step S3. However, the designed optical axis of the optical system 41A under test and the reference axis $O_m$ may not be coaxial. In this case, because the eccentricity amount of each surface Si under test from the reference axis $O_m$ is only shifted as a whole, the relative eccentricity amount of each surface Si under test in the optical system 41A under test can be accurately measured.

Step S4 is an example of a third step of arranging the optical unit under test on the reference axis.

In the above description, instead of the optical reference element 43, the optical unit under test is arranged on the reference axis by causing the holder 4a of the holding table 4 to hold the tip portion 40 including the optical system 41A under test. However, the eccentricity measurement device 50 may be configured so that the replacement of the optical reference element 43 and the tip portion 40 including the optical system 41A under test can be omitted.

For example, the holding table 4 can simultaneously hold the optical reference element 43 and the optical system 41A under test separately in, for example, the x-axis direction.

Further, the moving stage 2 allows the main body portion 3 to be moved in parallel in the x-axis direction as well. In this case, the above-described step S3 is executed in a state in which the main body portion 3 has moved to a position facing the optical reference element 43. Subsequently, in step S4, the main body portion 3 is moved in parallel to the x-axis direction using the moving stage 2 to a position onto which the optical image IP' can be projected toward the optical system 41A under test.

In this way, because the optical reference element 43 and the tip portion 40 do not need to be replaced in step S4, the next step S5 can be executed quickly.

After the holding of the tip portion 40 ends, step S5 is executed.

In step S5, a counter j for identifying the surface Si under test to be measured as a measured value is set to 1.

The counter j and the surface number of each surface Si under test are associated by the general control unit 101 before this step is executed. The general control unit 101 numbers the surfaces Si under test from 1 to N in the order of measurement. Here, N is the number of surfaces Si under test to be measured. This association may be performed in step S1 after the selection of the type of reflected image ends.

The measurement order of the surfaces Si under test is not particularly limited. For example, the measurement order of the surfaces Si under test may be in the order of the surface numbers of the surface Si under test or in the order of proximity to the objective lens 15. For example, the measurement order of surfaces Si under test may be an order in which the projection positions for measuring the surfaces Si under test are arranged from a position closest to the objective lens 15 to a position farthest from the objective lens 15.

After step S5, step S6 is performed.

FIG. 21 is a schematic diagram showing an example of measurement of the amount of deviation of a reflected image in the eccentricity measurement method according to the first embodiment of the present invention.

In step S6, the deviation amount ($d_{xj}$, $d_{yj}$) of the reflected image of the surface Si under test corresponding to the counter j is measured.

The general control unit 101 reads the position of the optical image IP' in which the selected reflected image can be observed on the surface Si under test corresponding to the counter j from the storage unit 104 and transmits the read position to the transport unit controller 105. The transport unit controller 105 drives the moving stage 2 to move the main body portion 3.

Subsequently, the measurer looks at the display screen 23a and determines whether or not a reflected image of the surface Si under test corresponding to the counter j has been observed.

When the reflected image is not observed or is blurred, the operation unit 24 is operated to finely adjust the position of the moving stage 2 and observe an appropriate reflected image.

When a plurality of reflected images are observed, the measurer or the measurement control unit 5 performs the discrimination of the reflected image in an appropriate discriminating method. For example, any of the above-described reflected image discrimination methods may be implemented. Thereby, an appropriately reflected image is identified.

When there are a plurality of reflected images, for example, the measurer may be able to select a reflected image for calculating an amount of deviation in advance through a graphical user interface (GUI) or the like in the operation unit 24. Alternatively, after the measurement control unit 5 calculates deviation amounts of the plurality of reflected images, an appropriate deviation amount of the reflected image may be selected by the measurer's operation input.

FIG. 21 shows a display screen 23a in which a reflected image $I_{Rj}$ corresponding to j is displayed.

Subsequently, the measurer performs an operation input for calculating a position coordinates (Xj, Yj) of the reflected image $I_{Rj}$ and an amount of deviation (d'$_{xj}$, d'$_{yj}$) from the reference point through the operation unit 24.

The general control unit 101 causes the image processing unit 103 to calculate the position coordinates of the center $O_R$ of the reflected image $I_{Rj}$. The arithmetic processing unit 102 calculates an actual dimension value (d'$_{xj}$, d'$_{yj}$) of the amount of deviation from the reference point of the reflected image on the image surface $I_B$, which is the imaging surface of the measurement imager 17, from the position coordinates of the center $O_R$ and the reference point ($X_0$, $Y_0$). In this regard, the subscripts x and y indicate amounts corresponding to the x-axis direction and the y-axis direction in the x-y coordinate system at the observed surface F' optically conjugate to the image surface $I_B$. The subscript j represents a value of the counter j (the same is also true hereinafter).

Further, the arithmetic processing unit 102 calculates the amount of deviation ($d_{xj}$, $d_{yj}$) from the reference axis $O_m$ in the observed surface F' of the reflected image $I_{Rj}$ and the eccentricity amount ($\delta_{xj}$, $\delta_{yj}$) of the apparent spherical center of the surface Si under test on the basis of the following Eqs. (10) to (13).

[Math. 12]

$$d_{xj} = \frac{d'_{xj}}{(f_k/f_T)} \quad (10)$$

$$d_{yj} = \frac{d'_{yj}}{(f_k/f_T)} \quad (11)$$

$$\delta_{xj} = \frac{d_{xj}}{1-\beta_j} \quad (12)$$

$$\delta_{yj} = \frac{d_{yj}}{1-\beta_j} \quad (13)$$

Here, $f_T$ denotes a focal length of the objective lens 15, $f_k$ denotes a focal length of the image-formation lens 16, and fj denotes reflection magnification for the optical image IP' of the reflected image $I_{Rj}$ reflected on the apparent surface si under test corresponding to j. A value obtained by substituting the measured value Lm of the I-O distance L into L in Eq. (2) at the end of step S3 is used for the reflection magnification $\beta_j$.

The calculated deviation amounts $d_{xj}$ and $d_{yj}$ and the calculated eccentricity amounts $\delta_{xj}$ and $\delta_{yj}$ of the apparent spherical center of the surface Si under test are stored in the storage unit 104.

Accordingly, step S6 ends.

Step S6 is an example of the step including: a fourth step of projecting the optical image onto a projection position on the reference axis and forming a reflected image of the optical image reflected on the surface under test at an observation position set so that a distance from the projection position along the reference axis is a set value L; a fifth step of capturing an image of the observed surface at the observation position using the measurement imager, and acquiring a measurement image; a sixth step of identifying an image of the reflected image at the observation position in the measurement image; a seventh step of measuring an amount of positional deviation from the reference point of the identified image of the reflected image; and an eighth step of calculating an amount of eccentricity of an apparent spherical center of the surface under test for the reference axis on the basis of the amount of positional deviation.

After step S6, step S7 is executed.

In step S7, the counter j is updated.

After step S7, step S8 is executed.

In step S8, it is determined whether or not the value of the counter j is greater than the number N of surfaces Si under test. In the case of execution by the measurement control unit 5, the general control unit 101 compares the value of N stored in the storage unit 104 with the value of j.

When j is greater than N, step S9 is executed.

When j is not greater than N, step S6 is executed.

In step S9, the eccentricity amount j (j=1, ..., N) of the apparent spherical center of each surface Si under test measured up to this step is used to calculate the eccentricity amount $\varepsilon_i$ (i=1, ..., N) of each surface Si under test.

In this regard, hereinafter, the variable subscript j represents the order from the front side of the optical system 41A under test when surfaces Si under test are arranged in order from the surface Si under test closest to the front side, i.e., the objective lens 15.

The eccentricity amount $\delta_{xn}$ of the apparent spherical center of an $n^{th}$ surface Si$_n$ under test from the front side is represented by a linear combination of eccentricity amounts $\varepsilon_{xj}$ of first to $n^{th}$ surfaces Si$_j$ (j=1, ..., n) under test. Likewise, the eccentricity amount $\delta_{yn}$ of the apparent spherical center of the surface Si$_n$ under test is represented by a linear combination of eccentricity amounts $\varepsilon_{yn}$ of surfaces Si$_j$ (j=1, ..., n) under test. In this regard, the eccentricity amount ($\delta_{xj}$, $\delta_{yj}$) of each apparent spherical center represents a shift amount for the reference axis $O_m$ and the eccentricity amounts $\varepsilon_{xj}$ and $\varepsilon_{yj}$ represent tilt eccentricity amounts of the surface Si under test for the reference axis $O_m$. The tilt eccentricity amount of the surface Si$_j$ under test is obtained by dividing the amount of shift in the spherical center of the surface Si$_j$ under test by the radius $R_j$ of curvature of the surface Si$_j$ under test.

Thus, the eccentricity amounts $\delta_{xj}$ and $\delta_{yj}$ of an apparent spherical center on each surface Si$_j$ under test are represented by the following Eqs. (14) and (15) using a matrix including coefficients of a linear combination. The coefficient $a_{ij}$ (i=1, ..., N and j=1, ..., N) of the linear combination is obtained in advance on the basis of the design data of the optical system 41A under test and stored in the storage unit 104.

When this matrix is referred to as an eccentricity matrix, because the optical system 41A under test is an axisymmetric optical system, an eccentricity matrix of Eq. (14) and an eccentricity matrix of Eq. (15) are equal to each other.

[Math. 13]

$$\begin{pmatrix} \delta_{x1} \\ \delta_{x2} \\ \delta_{x3} \\ \vdots \\ \delta_{xN} \end{pmatrix} = \begin{pmatrix} \alpha_{11} & 0 & 0 & 0 & 0 \\ a_{21} & a_{22} & 0 & 0 & 0 \\ a_{31} & a_{32} & a_{33} & \cdots & 0 \\ & & \vdots & & 0 \\ a_{N1} & \alpha_{N2} & a_{N3} & & a_{NN} \end{pmatrix} \begin{pmatrix} \varepsilon_{x1} \\ \varepsilon_{x2} \\ \varepsilon_{x3} \\ \vdots \\ \varepsilon_{xN} \end{pmatrix} \quad (14)$$

-continued $$\begin{pmatrix} \delta_{y1} \\ \delta_{y2} \\ \delta_{y3} \\ \vdots \\ \delta_{yN} \end{pmatrix} = \begin{pmatrix} a_{11} & 0 & 0 & 0 & 0 \\ a_{21} & a_{22} & 0 & 0 & 0 \\ a_{31} & a_{32} & a_{33} & \ldots & 0 \\ & & \vdots & & 0 \\ a_{N1} & a_{N2} & a_{N3} & & a_{NN} \end{pmatrix} \begin{pmatrix} \varepsilon_{y1} \\ \varepsilon_{y2} \\ \varepsilon_{y3} \\ \vdots \\ \varepsilon_{yN} \end{pmatrix} \quad (15)$$

The general control unit 101 causes the arithmetic processing unit 102 to perform operations that calculate the eccentricity amounts $\varepsilon_{xj}$ and $\varepsilon_{yj}$ from Eqs. (14) and (15). Thereby, the eccentricity amounts $\varepsilon_{xj}$ and $\varepsilon_{yj}$ of each surface Si under test are obtained, respectively.

The obtained eccentricity amounts $\varepsilon_{xj}$ and $\varepsilon_{yj}$ are stored in the storage unit 104 and displayed on the display unit 23 as necessary.

As can be seen from Eqs. (12) and (13), the eccentricity amount ($\delta_{xj}$, $\delta_{yj}$) of the apparent spherical center includes the reflection magnification $\beta_j$ in the apparent surface si under test. Thus, an error of the reflection magnification $\beta_j$ affects an error of eccentricity amounts $\varepsilon_{xj}$ and $\varepsilon_{yj}$.

In the present embodiment, because a value calculated on the basis of the measured value Lm of the I-O distance L is used as the reflection magnification $\beta_j$, the setting error of the I-O distance L in the eccentricity measurement device 50 is corrected to perform measurement. Thus, the eccentricity amount of the surface Si under test can be measured with high accuracy as compared with the calculation using the set value of the I-O distance L.

Step S9 is an example of a ninth step of calculating an eccentricity amount of each of the surfaces under test for the reference axis on the basis of a value of the calculated eccentricity amount of the apparent spherical center after step S6 is performed for N surfaces Si under test.

The general control unit 101 in the present embodiment is an example of an eccentricity amount calculation unit configured to measure an amount of positional deviation from a reference point corresponding to an intersection between the observed surface and the reference axis on the basis of the image acquired by the measurement imager at the observation position and calculate an amount of eccentricity of an apparent spherical center of the surface under test for the reference axis on the basis of the amount of positional deviation.

As described above, according to the eccentricity measurement device 50 of the present embodiment, the eccentricity measurement method of the present embodiment can be executed.

In the present embodiment, the optical image IP' is linearly moved to the optical system 41A under test and an image of the observed surface F' orthogonal to the reference axis $O_m$ defined by the movement trajectory of the optical image IP' in the air is acquired by the measurement imager 17. In step S3, because the coordinates of the reference point in the measurement imager 17 are measured, the amount of deviation from the reference point of the reflected image $I_R$ can be measured on the image acquired by the measurement imager 17. Thus, eccentricity measurement can be performed accurately without rotating the optical system 41A under test.

In particular, according to the present embodiment, eccentricity measurement can also be performed more quickly and easily in a method in which the optical system 41A under test is not rotated than a method using an image rotator.

Furthermore, in the present embodiment, the reflected image $I_R$ generated at a position which is the I-O distance away from the optical image IP' in the direction along the optical axis $O_M$ is observed in an unequal magnification method in which the set value of the I-O distance is not 0. Thus, even if a plurality of reflected images appear on the image, the reflected image to be measured can be easily discriminated on the basis of a reflection magnification difference.

Although a case where the reflected image $I_R$ generated at a position which is the I-O distance away from the optical image IP' in the direction along the optical axis $O_M$ is observed has been appropriately described in the above description of the unequal magnification method, there is a difference from a case where the reflected image $I_R$ generated at a position which is the I-O distance away from the optical image IP' in the direction along reference axis $O_m$ is substantially observed because the optical image IP' and the observed surface F' integrally move along the optical axis $O_M$ and an angle formed between the optical axis $O_M$ and the reference axis $O_m$ is designed to be, for example, 1 degree or less.

In the present embodiment, after a target I-O distance L is set by the eccentricity measurement device 50, it is possible to measure the I-O distance L using the optical reference element 43 having a known radius of curvature and obtain the reference point of the eccentricity measurement on the basis of the measured value Lm of the I-O distance L. Thus, the eccentricity amount can be obtained with higher accuracy.

In the present embodiment, the eccentricity amount can also be obtained with higher accuracy in that the measured value Lm of the I-O distance L is also used to calculate the magnification error $\beta_i$.

As described above, according to the eccentricity measurement method and eccentricity measurement device of the present embodiment, the eccentricity amount of the surface under test can be accurately measured without rotating the optical unit under test.

In particular, in the present embodiment, because L≠0, eccentricity measurement can be performed with high accuracy and quickly even if the positions of the apparent spherical centers of optical surfaces of the optical unit under test are close to each other.

Second Embodiment

Next, an eccentricity measurement device and an eccentricity measurement method according to a second embodiment of the present invention will be described.

As shown in FIG. 1, an eccentricity measurement device 50A according to the second embodiment has a measurement control unit 5A instead of the measurement control unit 5 of the eccentricity measurement device 50 according to the first embodiment. As shown in FIG. 2, the measurement control unit 5A includes a general control unit 101A instead of the general control unit 101 of the measurement control unit 5 in the first embodiment.

Hereinafter, differences from the first embodiment will be mainly described.

As the optical unit under test in the eccentricity measurement device 50A, an optical unit similar to that in the first embodiment may be used. However, an example in which an optical system 41B under test is provided instead of the optical system 41A under test so as to make it easy to understand the characteristic functions of the present embodiment hereinafter will be described.

First, a configuration of the optical system 41B under test will be described.

Figure 22:
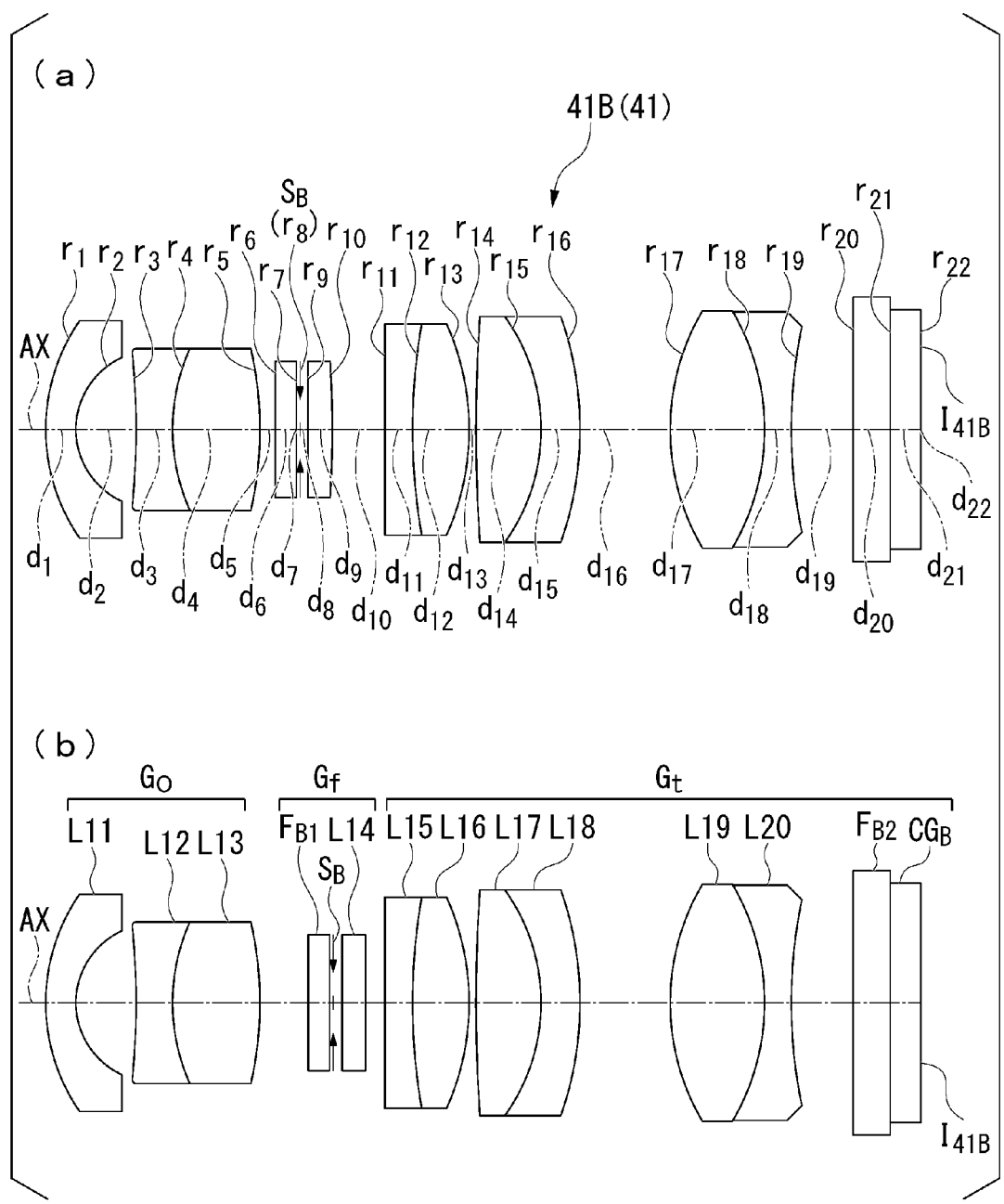
FIG. 22 is a cross-sectional view showing an example of an optical system under test.

FIG. 22 is a cross-sectional view showing an example of the optical system under test. In FIG. 22, (a) is a cross-sectional view of a lens in a far-point observation state, and (b) is a cross-sectional view of a lens in a near-point observation state.

As shown in (b) of FIG. 22, the optical system 41B under test has a front group $G_o$ of negative refractive power, an intermediate group $G_f$ of positive refractive power, and a rear group $G_t$ of positive refractive power in order from the object side in this example.

The front group $G_o$ includes a negative meniscus lens L11 facing a convex surface on the object side, a biconcave negative lens L12, and a biconvex positive lens L13. The negative lens L12 and the positive lens L13 are cemented to each other.

The intermediate group $G_f$ includes a filter $F_{B1}$, an aperture stop $S_B$, and a plano-convex lens L14 facing the plane toward the object side.

The rear group $G_t$ includes a plano-concave negative lens L15, a biconvex lens L16, a biconvex lens L17, a negative meniscus lens L18 facing the convex surface on the image side, a biconvex lens L19, a biconcave negative lens L20, a cover glass $F_{B2}$, and a cover glass $CG_B$. The plano-concave lens L15 and the biconvex lens L16 are cemented to each other. The biconvex positive lens L17 and the negative meniscus lens L18 are cemented to each other. The biconvex lens L19 and the biconcave lens L20 are cemented to each other.

The cover glass $F_{B2}$ and the cover glass $CG_B$ are cemented to each other. $I_{41B}$ denotes the image surface of the optical system 41B under test. An imaging surface of an endoscope imager 42 is arranged in $I_{41B}$.

In the following [Table B], numerical data of the design values of the optical system 41B under test is shown. In [Table B], the field of r, the field of d, and the field of ne are defined as in [Table A]. The field of vd is an Abbe number of each lens. In (a) of FIG. 22, the radius of curvature and the surface interval of the surface number s (where s=1, . . . , 22) are written as $r_s$ and $d_s$, respectively. The first and second surfaces are aspherical, but aspherical data is omitted.

TABLE B

| Surface number | r | d | ne | vd |
|---|---|---|---|---|
| 1 | 2.9142 | 0.4000 | 1.81078 | 40.86 |
| 2 | 1.0606 | 0.8400 | 1.00000 | — |
| 3 | −18.3770 | 0.5000 | 2.01169 | 28.27 |

TABLE B-continued

| | | | | |
|---|---|---|---|---|
| 4 | 2.6340 | 1.2000 | 1.85504 | 23.76 |
| 5 | −8.5320 | Variable | 1.00000 | — |
| 6 | ∞ | 0.3000 | 1.523 | 65.13 |
| 7 | ∞ | 0.0300 | 1.00000 | — |
| 8 (stop) | ∞ | 0.1100 | 1.00000 | — |
| 9 | ∞ | 0.3500 | 1.65425 | 58.55 |
| 10 | −35.6450 | Variable | 1.00000 | — |
| 11 | ∞ | 0.4000 | 2.01169 | 28.27 |
| 12 | 9.9720 | 0.7800 | 1.80642 | 34.97 |
| 13 | −3.3750 | 0.0800 | 1.00000 | |
| 14 | 24.6880 | 0.9000 | 1.73234 | 54.68 |
| 15 | −2.7820 | 0.5300 | 1.93429 | 18.90 |
| 16 | −5.6250 | 1.2453 | 1.00000 | — |
| 17 | 3.3750 | 1.3000 | 1.73234 | 54.68 |
| 18 | −3.3750 | 0.3500 | 2.01169 | 28.27 |
| 19 | 8.0420 | 0.8560 | 1.00000 | |
| 20 | ∞ | 0.5000 | 1.51825 | 64.14 |
| 21 | ∞ | 0.4000 | 1.50700 | 63.26 |
| 22 | ∞ | 0.0000 | 1.00000 | — |
| Imaging | ∞ | | | |

| Various types of data | | |
|---|---|---|
| Surface interval | Far-point object (Distance of 60 mm from object) | Near-point object (Distance of 31 mm from object) |
| d5 | 0.2100 | 0.6800 |
| d10 | 0.7200 | 0.2500 |

Hereinafter, in the optical system 41B under test, the surfaces Si under test that is a target of eccentricity measurement by the eccentricity measurement device 50A will be described as 20 surfaces of surface numbers 1 to 7 and 9 to 21 other than an $8^{th}$ surface and a $22^{nd}$ surface. The surfaces Si under test are assigned numbers of the surfaces under test from 1 to 20 in the order of surface numbers.

In the following [Table 6], calculated values of a position $V_j$ (mm) of the apparent surface top, an apparent radius $R_j$ (mm) of curvature, and a position $SC_j$ (mm) of an apparent spherical center at each surface Si under test are shown with the number of the surface under test denoted by j (i=1, . . . , 20). The definition and coordinate system of the position $V_j$ of the apparent surface top are similar to those in the above [Table A].

In this regard, the fifth and tenth surfaces were 0.6800 mm and 0.2500 mm, respectively, in correspondence with a distance of 31 mm from an object, which is the near-point object.

TABLE 6

| Number of surface under test | Surface number | r (mm) | d (mm) | ne | V (mm) | R (mm) | SC (mm) |
|---|---|---|---|---|---|---|---|
| 1 | 1 | 2.9142 | 0.4000 | 1.81078 | 0.000 | 2.914 | 2.914 |
| 2 | 2 | 1.0606 | 0.8400 | 1.00000 | 0.235 | 0.805 | 1.040 |
| 3 | 3 | −18.3770 | 0.5000 | 2.01169 | 0.920 | 2.078 | 2.998 |
| 4 | 4 | 2.6340 | 1.2000 | 1.85504 | 1.052 | 0.434 | 1.486 |
| 5 | 5 | −8.5320 | 0.6800 | 1.00000 | 1.300 | 2.736 | 4.036 |
| 6 | 6 | ∞ | 0.3000 | 1.52300 | 1.478 | 1.149 | 2.627 |
| 7 | 7 | ∞ | 0.1400 | 1.00000 | 1.521 | 1.106 | 2.627 |
| 8 | 9 | ∞ | 0.3500 | 1.65425 | 1.549 | 1.077 | 2.627 |
| 9 | 10 | −35.6450 | 0.2500 | 1.00000 | 1.590 | 1.403 | 2.993 |
| 10 | 11 | ∞ | 0.4000 | 2.01169 | 1.634 | 1.112 | 2.746 |
| 11 | 12 | 9.9720 | 0.7800 | 1.80642 | 1.667 | 0.458 | 2.125 |
| 12 | 13 | −3.3750 | 0.0800 | 1.00000 | 1.732 | −0.369 | 1.362 |
| 13 | 14 | 24.6880 | 0.9000 | 1.73234 | 1.743 | −3.433 | −1.690 |

TABLE 6-continued

| Number of surface under test | Surface number | r (mm) | d (mm) | ne | V (mm) | R (mm) | SC (mm) |
|---|---|---|---|---|---|---|---|
| 14 | 15 | −2.7820 | 0.5300 | 1.93429 | 1.821 | −0.215 | 1.606 |
| 15 | 16 | −5.6250 | 1.2453 | 1.00000 | 1.865 | −0.418 | 1.447 |
| 16 | 17 | 3.3750 | 1.3000 | 1.73234 | 2.141 | 38.370 | 40.511 |
| 17 | 18 | −3.3750 | 0.3500 | 2.01169 | 2.505 | −0.589 | 1.916 |
| 18 | 19 | 8.0420 | 0.8560 | 1.00000 | 2.661 | −1.746 | 0.915 |
| 19 | 20 | ∞ | 0.5000 | 1.51825 | 4.914 | −3.695 | 1.220 |
| 20 | 21 | ∞ | 0.4000 | 1.50700 | 10.485 | −9.265 | 1.220 |

The eccentricity measurement method of the present embodiment relates to a method of selecting a type of reflected image in an unequal magnification method. In the present embodiment, the distribution range is selected so that the distribution range in the direction along the reference axis $O_m$ of the projection position for forming a reflected image used for measurement is minimized.

The function when such selection is performed will be described in contrast to a comparative example using the equal magnification method.

The following [Table 7] shows a corresponding relationship between the number of the surface under test and the projection position when eccentricity measurement of the optical system 41B under test is performed in an equal magnification method. In this regard, the numbers of the surfaces under test are sorted so that the corresponding projection positions are provided from a position farthest from the objective lens 15 to a position closet to the objective lens 15.

In the equal magnification method, the projection position is also the observation position at which the reflected image is observed.

TABLE 7

| Number of surface under test | Projection position (mm) |
|---|---|
| 16 | 40.511 |
| 5 | 4.036 |
| 3 | 2.998 |
| 9 | 2.993 |
| 1 | 2.914 |
| 10 | 2.746 |
| 6 | 2.627 |
| 7 | 2.627 |
| 8 | 2.627 |
| 11 | 2.125 |
| 17 | 1.916 |
| 14 | 1.606 |
| 4 | 1.486 |
| 15 | 1.447 |
| 12 | 1.362 |
| 19 | 1.220 |
| 20 | 1.220 |
| 2 | 1.040 |
| 18 | 0.915 |
| 13 | −1.690 |

As shown in [Table 7], in the equal magnification method, when all reflected images by the surface Si under test are measured, it is necessary to move the projection position of the optical image by 42.201 mm from a position of −1.690 mm corresponding to No. 13 of the surface under test ($a_{14}$th surface) to a position of 40.511 mm corresponding to No. 16 of the surface under test (a $17^{th}$ surface).

Because the optical system transport unit 2b of the moving stage 2 can move only within the accuracy range of straightness, pitching, yawing, or the like of the guide 2a, the movement trajectory of the optical image IP' in the air is not completely straight.

When the straightness of the movement trajectory of the optical image IP' in the air becomes low while the main body portion 3 is moved by 42.201 mm by the moving stage 2, this becomes a cause of an error in the eccentricity amount of the surface Si under test because an error in the position coordinates of the reference point of eccentricity measurement is caused.

On the other hand, when eccentricity measurement is performed in the unequal magnification method with the I-O distance L as 1 mm, all projection positions according to the type of reflected image are listed as values shown in the following [Table 8]. Here, as in [Table 7], the projection positions corresponding to the numbers of the surfaces under test are sorted from a position farthest from the objective lens 15 to a position closet to the objective lens 15. In [Table 8], the sequence is displayed from 40 to 1 in descending order.

TABLE 8

| Sequence | Number of surface under test | Type of reflected image | Projection position (mm) |
|---|---|---|---|
| 40 | 16 | Negative | 41.018 |
| 39 | 20 | Positive | 11.012 |
| 38 | 19 | Positive | 5.481 |
| 37 | 5 | Negative | 4.625 |
| 36 | 9 | Negative | 3.653 |
| 35 | 3 | Negative | 3.612 |
| 34 | 1 | Negative | 3.498 |
| 33 | 10 | Negative | 3.438 |
| 32 | 8 | Negative | 3.323 |
| 31 | 7 | Negative | 3.319 |
| 30 | 6 | Negative | 3.314 |
| 29 | 18 | Positive | 3.294 |
| 28 | 17 | Positive | 3.291 |
| 27 | 11 | Negative | 2.946 |
| 26 | 14 | Positive | 2.725 |
| 25 | 15 | Positive | 2.698 |
| 24 | 16 | Positive | 2.634 |
| 23 | 12 | Positive | 2.580 |
| 22 | 4 | Negative | 2.314 |
| 21 | 13 | Positive | 2.314 |
| 20 | 17 | Negative | 2.130 |
| 19 | 10 | Positive | 1.942 |
| 18 | 9 | Positive | 1.930 |
| 17 | 8 | Positive | 1.853 |
| 16 | 11 | Positive | 1.846 |
| 15 | 7 | Positive | 1.828 |
| 14 | 6 | Positive | 1.791 |
| 13 | 2 | Negative | 1.779 |
| 12 | 5 | Positive | 1.712 |
| 11 | 14 | Negative | 1.702 |
| 10 | 20 | Negative | 1.693 |
| 9 | 19 | Negative | 1.653 |
| 8 | 15 | Negative | 1.614 |

TABLE 8-continued

| Sequence | Number of surface under test | Type of reflected image | Projection position (mm) |
|---|---|---|---|
| 7 | 12 | Negative | 1.514 |
| 6 | 3 | Positive | 1.306 |
| 5 | 18 | Negative | 1.282 |
| 4 | 4 | Positive | 1.224 |
| 3 | 2 | Positive | 0.496 |
| 2 | 1 | Positive | 0.417 |
| 1 | 13 | Negative | −1.262 |

As shown in [Table 8], in the case of the optical system 41B under test, the projection position when the I-O distance L is set to 1 mm is distributed in a range of 42.280 mm from a position of −1.262 mm corresponding to No. 13 of the surface under test ($a_{14}$th surface) forming a negatively reflected image to a position of 41.018 mm corresponding to No. 16 of the surface under test ($a_{17}$th surface) forming a negatively reflected image.

In the unequal magnification method, because it is only necessary to measure either a positively reflected image or a negatively reflected image for each surface Si under test, it is possible to further narrow the distribution range of the projection position necessary for measurement by selecting the type of reflected image for each surface Si under test.

The following [Table 9] shows an example in which the type of reflected image is selected.

TABLE 9

| Number of surface under test | Type of reflected image | Projection position (mm) |
|---|---|---|
| 1 | Positive | 0.417 |
| 2 | Positive | 0.496 |
| 3 | Positive | 1.306 |
| 4 | Positive | 1.224 |
| 5 | Positive | 1.712 |
| 6 | Positive | 1.791 |
| 7 | Positive | 1.828 |
| 8 | Positive | 1.853 |
| 9 | Positive | 1.930 |
| 10 | Positive | 1.942 |
| 11 | Positive | 1.846 |
| 12 | Negative | 1.514 |
| 13 | Positive | 2.314 |
| 14 | Negative | 1.702 |
| 15 | Negative | 1.614 |
| 16 | Positive | 2.634 |
| 17 | Negative | 2.130 |
| 18 | Negative | 1.282 |
| 19 | Negative | 1.653 |
| 20 | Negative | 1.693 |

According to the selection example in [Table 9], the projection position is distributed in a range of 2.218 mm from a position of 0.417 mm corresponding to No. 1 of the surface under test (a first surface) forming a positively reflected image to a position of 2.634 mm corresponding to No. 16 of the surface under test ($a_{17}$th surface) forming a positively reflected image. Thus, the distribution range of the projection position is a significantly short distance of about 5% of the distribution range of the projection position in the equal magnification method.

The straightness of the guidance mechanism of the guide 2a of the moving stage 2 becomes less accurate as the distance along the guide 2a increases. Thus, the shorter the moving distance of the optical system transport unit 2b, the better the straightness of the movement trajectory of the optical image IP' in the air.

In the present embodiment, because the distribution range of the projection position is minimized, the accuracy of eccentricity measurement can be improved.

For example, when the guide 2a is used in a local range, the tilt posture per unit length can be regarded to change monotonically due to the error of the guide 2a. In this case, the movement trajectory in the air of the optical image IP' by driving the moving stage 2 is a change in a quadratic curve. If the moving distance is Z, the straightness of the movement trajectory can be estimated to be about $\alpha Z^2/8$. However, a is the amount of change in the tilt posture per unit length.

Assuming that the accuracy required for eccentricity measurement is 20 nm and 10 nm that is half the 20 nm can be accepted as the straightness of the movement trajectory, it is necessary to satisfy $\alpha Z^2/8 \leq 10$ nm.

For example, when the guide 2a can be regarded as a monotonic change in the tilt posture of 1 second per 1 mm, sufficient eccentricity measurement accuracy can be obtained if $Z \leq 4.1$ (mm) or less because $\alpha=1$ (sec/mm) $=4.85 \times 10^{-6}$ (rad/mm).

In this point as well, it can be seen that eccentricity measurement can be performed with high accuracy when the distribution range of the projection position that defines the movement amount of the optical image IP' is 2.218 mm.

Next, an example of the eccentricity measurement method of the present embodiment will be described in detail.

As shown in FIG. 13, the eccentricity measurement method of the present embodiment has step S21 instead of step S1. Hereinafter, differences from the first embodiment will be mainly described.

Step S21 is similar to step S1 except for the method of selecting the type of reflected image. However, as in the first embodiment, the type of reflected image may be selected before measuring the surface Si under test to be measured or may not be selected in this step.

Figure 23:
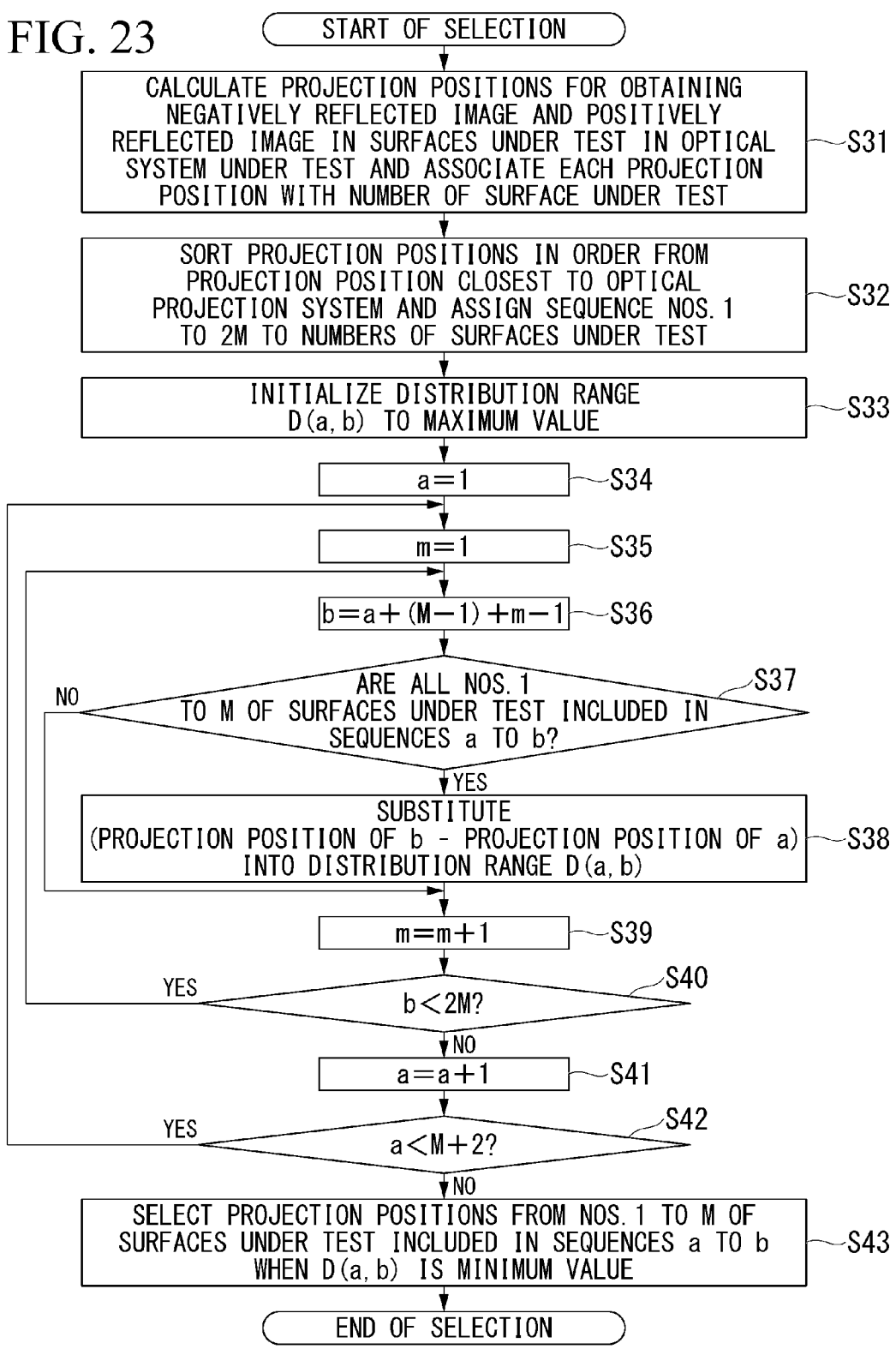
FIG. 23 is a flowchart showing an example of a method of selecting a type of reflected image in an eccentricity measurement method according to a second embodiment of the present invention.

FIG. 23 is a flowchart showing an example of a method of selecting a type of reflected image in an eccentricity measurement method according to the second embodiment of the present invention.

In the method for selecting the reflected image in step S21, steps S31 to S43 are executed on the basis of the flow shown in FIG. 23.

In step S31, projection positions for obtaining a negatively reflected image and a positively reflected image are calculated in surfaces Si under test in the optical system 41B under test and each projection position is associated with the number of the surface under test.

For example, in the eccentricity measurement device 50A, the general control unit 101A of the measurement control unit 5A associates the surface number of the surface Si under test to be measured with the number of the surface under test as shown in [Table 6]. Further, the general control unit 101A causes the arithmetic processing unit 102 to calculate a projection position for forming a positively reflected image and a negatively reflected image by the reflection of each surface Si under test. In the case of the optical system 41B under test, because there is no surface Si under test in which the apparent radius of curvature is infinite, a positively reflected image and a negatively reflected image can be obtained for each surface Si under test.

When the apparent radius of curvature becomes infinite, because there is no projection position for forming a negatively reflected image, a dummy maximum value is given as the projection position so that a negatively reflected image is not selected. Thereby, when the number of surfaces Si under test to be measured is M (M=20 in the example of [Table 6]), 2M projection positions are obtained.

The calculation result is associated with the number of the surface under test and the type of reflected image and stored in the storage unit 104.

Accordingly, step S31 ends.

After step S31 ends, step S32 is executed. In step S32, the projection positions are sorted in order from a projection position closest to the optical projection system, and sequence Nos. 1 to 2M are assigned to numbers of the surfaces under test.

For example, the general control unit 101 sorts the numbers of the surfaces under test arranged in ascending order of the projection positions on the basis of a magnitude relationship between the projection positions stored in the storage unit 104, assigns sequence Nos. 1 to 2M to the numbers of the surfaces under test arranged in ascending order of projection positions, and causes the storage unit 104 to store the assigned sequence Nos. 1 to 2M. Thereby, a table as shown in [Table 8] is generated in the storage unit 104. Here, M is the number of the surface Si under test to be measured.

Accordingly, step S32 ends.

After step S32 ends, step S33 is executed. In step S33, the distribution range D(a, b) is initialized to a maximum value. Here, a and b are counters indicating sequence numbers for giving lower and upper limit values of the distribution range, respectively. That is, a and b are integers that satisfy a<b, $1 \le a \le M+1$, and $M \le b \le 2M$.

After step S33 ends, step S34 is executed. In step S34, the general control unit 101A initializes a counter a to 1.

After step S34 ends, step S35 is executed. In step S35, the general control unit 101A initializes a counter m to 1.

After step S35 ends, step S36 is executed. In step S36, the general control unit 101A substitutes a+(M−1)+m−1 into a counter b.

After step S36 ends, step S37 is executed. In step S37, the general control unit 101A determines whether or not all Nos. 1 to M of the surfaces under test are included in sequence Nos. a to b with reference to the table of the storage unit 104.

When all Nos. 1 to M of the surfaces under test are included, step S38 is executed.

When all Nos. 1 to M of the surfaces under test are not included, step S39 is executed.

In step S38, the general control unit 101A substitutes a length obtained by subtracting the projection position corresponding to sequence No. a from the projection position corresponding to sequence No. b into the distribution range D(a, b). The values of the distribution range D(a, b) are stored in a storage area corresponding to (a, b) in the storage unit 104.

After step S38 ends, step S39 is executed.

In step S39, the general control unit 101A updates the counter m.

After step S39 ends, step S40 is executed. In step S40, the general control unit 101A determines whether or not b is less than 2M.

When b is less than 2M, step S36 is executed.

When b is not less than 2M, step S41 is executed through the loop of the counter m.

In step S41, the general control unit 101A updates the counter a.

After step S41 ends, step S42 is executed. In step S42, the general control unit 101A determines whether or not a is less than M+2.

When a is less than M+2, step S35 is executed.

When a is not less than M+2, step S43 is executed through the loop of the counter a.

In step S43, the general control unit 101A selects projection positions of Nos. 1 to M of the surfaces under test included in sequence Nos. a to b when D(a, b) is the minimum value.

For example, as described in [Table 9], the projection positions and the types of reflected images from sequence Nos. 2 to 16 are selected. Because different types of reflected images in the same number of the surface under test have different projection positions, the selection of reflected images in the same number of the surface under test is similar to the selection of projection positions.

Here, when the same number of the surface under test is included in the sequence Nos. a to b, either a positively reflected image or a negatively reflected image may be selected from the viewpoint of minimizing the distribution range of the projection position. For example, in the example of [Table 8], Nos. 2, 4, and 12 of the surfaces under test between sequence Nos. 2 to 24 are examples of the surface Si under test in which either a positively reflected image or a negatively reflected image may be selected.

The general control unit 101A selects one type of reflected image corresponding to the number of the surface under test on the basis of a predetermined rule.

For example, it is only necessary to make a rule for selecting the reflected image having the smaller projection position so that the type of reflected image described in [Table 9] is selected. In this case, because the number of surfaces Si under test whose projection position is close to a minimum value increases, the number of surfaces Si under test that are not easily affected by the movement error of the moving stage 2 increases as a whole.

When step S43 ends, the selection of the reflected image ends.

As described above, because the eccentricity measurement device of the present embodiment and the eccentricity measurement method using the same are similar to those of the first embodiment except for the method of selecting the type of reflected image, the eccentricity amount of the surface under test can be accurately measured without rotating the optical unit under test as in the first embodiment.

In particular, according to the present embodiment, because the distribution range of the projection position is minimized by selecting the type of reflected image, the accuracy of eccentricity measurement can be further improved.

Third Embodiment

Next, an eccentricity measurement device and an eccentricity measurement method according to a third embodiment of the present invention will be described.

The eccentricity measurement device 50B according to the present embodiment shown in FIG. 1 includes a measurement control unit 5B and a front wall 3aB instead of the measurement control unit 5 and the front wall 3a of the eccentricity measurement device 50 according to the first embodiment.

Hereinafter, differences from the first embodiment will be mainly described.

The eccentricity measurement device 50B has an endoscope imager 42 (an imager under test) like the eccentricity measurement device 50. However, the eccentricity measurement device 50B is different from the eccentricity measurement device 50 in that it is possible to calculate an eccentricity amount of an imaging surface 42a of the endoscope imager 42 using an image acquired from the endoscope imager 42.

The endoscope imager 42 in the present embodiment is a target of eccentricity measurement. The endoscope imager 42 in the present embodiment is an example of an imager under test in which the imaging surface 42a is arranged on the image surface of the optical system 41 under test in a tip portion 40, which is an optical unit under test.

Figure 24:
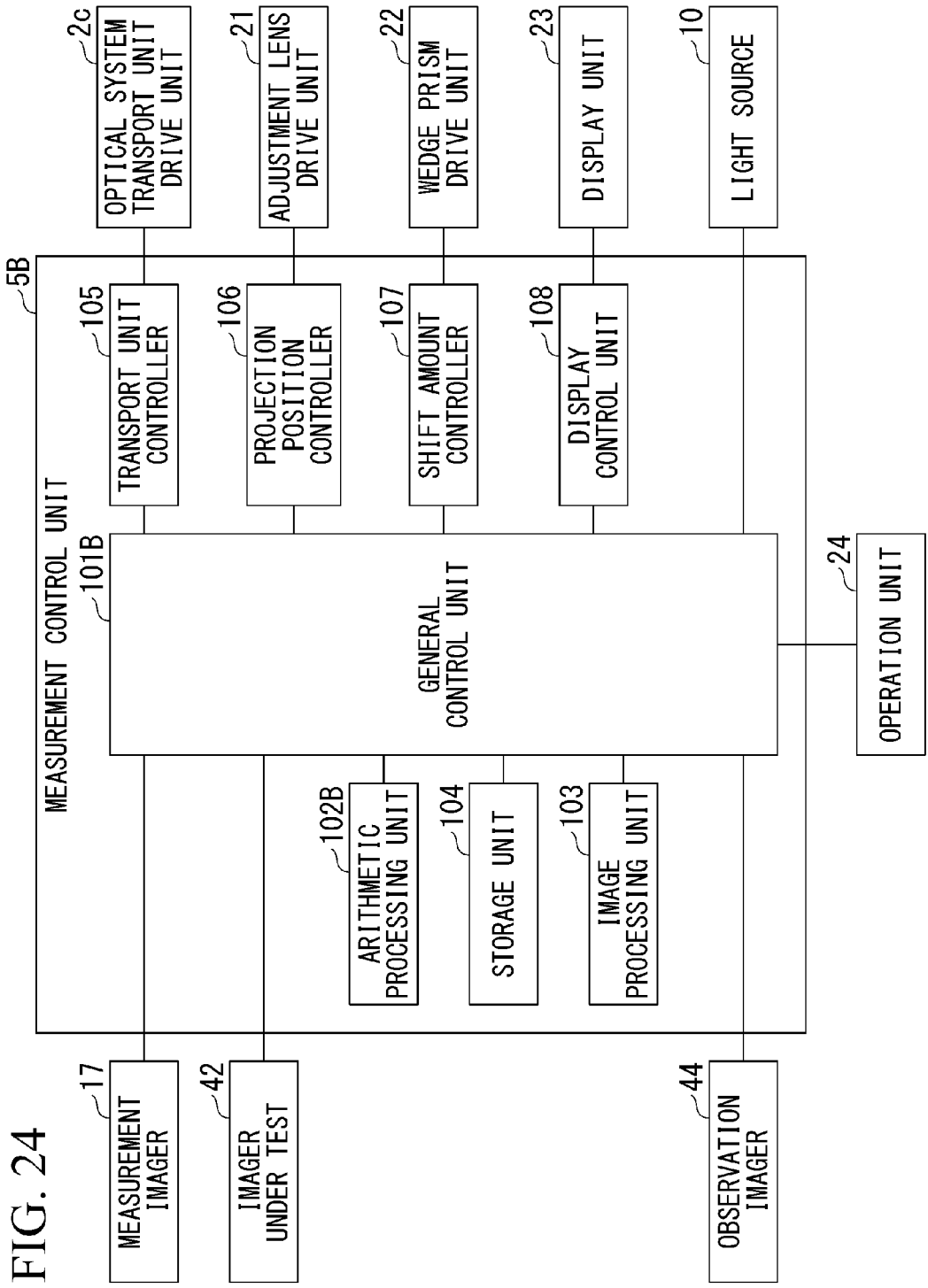
FIG. 24 is a block diagram of a control system in an eccentricity measurement device according to a third embodiment of the present invention.

FIG. 24 is a block diagram of a control system in an eccentricity measurement device according to a third embodiment of the present invention.

As shown in FIG. 24, the measurement control unit 5B includes a general control unit 101B (an imager-under-test image acquisition unit) and an arithmetic processing unit 102B (an imager-under-test eccentricity calculation unit) instead of the general control unit 101 and the arithmetic processing unit 102 of the measurement control unit 5.

The general control unit 101B is communicatively connected to the endoscope imager 42. The general control unit 101B can acquire an image captured by the endoscope imager 42 and transmit the image to the image processing unit 103, the display control unit 108, and the arithmetic processing unit 102B.

The arithmetic processing unit 102B can calculate a rotation amount of the endoscope imager 42 around a reference axis $O_m$ on the basis of the image transmitted from the endoscope imager 42.

Further, the arithmetic processing unit 102B can calculate an amount of shift in an imaging surface of the endoscope imager 42 for the reference axis $O_m$ on the basis of information of an eccentricity amount of each surface Si under test in the optical system under test measured as in the first embodiment.

An example of an arithmetic operation of the arithmetic processing unit 102B will be described in the eccentricity measurement method described below.

The front wall 3aB shown in FIG. 1 is different from the front wall 3a in that a reference mark is provided in a range that can be observed by the endoscope imager 42 through the optical system under test included in the tip portion 40.

Figure 25:
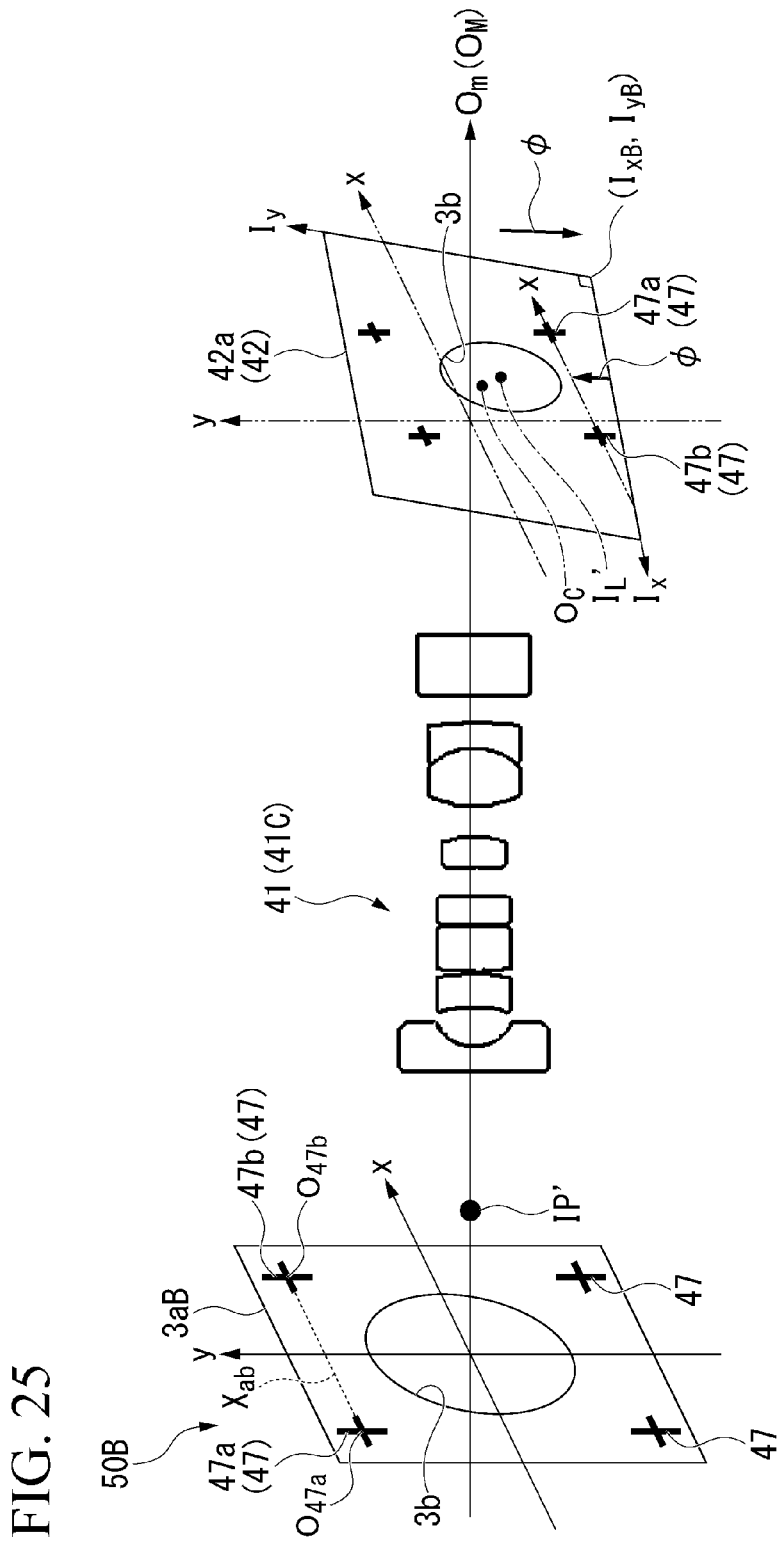
FIG. 25 is a schematic diagram showing a relationship between a coordinate system of a measurement system in the eccentricity measurement device according to the third embodiment of the present invention and an imager-under-test coordinate system.

FIG. 25 is a schematic diagram showing a relationship between a coordinate system of a measurement system in the eccentricity measurement device according to the third embodiment of the present invention and an imager-under-test coordinate system.

In FIG. 25, a reference mark 47 formed on the front wall 3aB is schematically depicted. In the example shown in FIG. 25, reference marks 47 are provided at four locations surrounding an opening 3b in the front wall 3aB. A positional relationship between the reference mark 47 and the z-axis in the eccentricity measurement device 50B is stored in the measurement control unit 5B in advance. In the application of the reference mark 47 for calculating the rotation amount of the endoscope imager 42, because a straightness error of the reference axis $O_m$ and a parallelism error between the z-axis and the reference axis $O_m$ can all be regarded to have small amounts, they hardly affect the measurement accuracy. Thus, in the rotation amount measurement, the reference axis $O_m$ can be regarded as an axis line orthogonal to the xy plane in an xyz coordinate system of the measurement system and parallel to the z-axis. In FIG. 25, a state in which the x-axis and y-axis of the coordinate system of the measurement system are moved in parallel to a position intersecting the reference axis $O_m$ so that it is easy to understand is shown. A positive z-axis direction is a direction from the left of FIG. 25 to the right along the reference axis $O_m$ and a negative z-axis direction is also a direction from the right of FIG. 25 to the left.

The position of the reference mark 47 will be described as having a known positional relationship with the reference axis $O_m$ in a plane orthogonal to the reference axis $O_m$.

A configuration of the reference mark 47 is not particularly limited as long as the rotation amount of the front wall 3aB around the reference axis $O_m$ can be detected using the image of the endoscope imager 42. For example, an image drawn on the front wall 3aB or a structure on the front wall 3aB may be used. In the case of a structure, for example, the reference mark 47 may be a groove carved into the front wall 3aB or a protrusion protruding from the front wall 3aB. For example, the reference mark 47 may be made of a bolt, a nut, a nameplate, or the like attached to the front wall 3aB.

In the example shown in FIG. 25, the reference mark 47 is a crosshair drawn on the front wall 3aB. The horizontal line of the cross extends in the x-axis direction and the vertical line of the cross extends in the y-axis direction.

Among the reference marks 47, a reference mark 47a located on the upper left of FIG. 25 as seen from the negative z-axis direction and a reference mark 47b seen on the upper right of FIG. 25 are positioned on the same line whose line segment extending to each x-axis is parallel to the x-axis. Thereby, a line segment $X_{ab}$ connecting a cross intersection $O_{47a}$ at the reference mark 47a and a cross intersection $O_{47b}$ at the reference mark 47b is parallel to the x-axis.

When the eccentricity of the endoscope imager 42 is measured, it is necessary to measure the horizontal direction of the endoscope imager 42 of the optical system 41 under test and the horizontal direction of the eccentricity measurement device 50B together. However, because the tip portion 40 has a structure that easily rotates, the horizontal direction of the endoscope imager 42 is likely to be shifted to the horizontal direction of the eccentricity measurement device 50B in a state in which the tip portion 40 is held on the holding table 4. Thus, there is a possibility that the eccentricity amount of the endoscope imager 42 cannot be properly measured.

Therefore, in the present embodiment, the rotation errors of the x-axis direction indicating the horizontal direction of the coordinate system of the measurement system of the eccentricity measurement device 50B and the horizontal axis of the imager-under-test coordinate system in the endoscope imager 42 are measured and the eccentricity amount of the endoscope imager 42 is measured after the rotation of the imager-under-test coordinate system is corrected.

Here, the imager-under-test coordinate system in the endoscope imager 42 will be described.

As shown in FIG. 25, the imager-under-test coordinate system is a two-dimensional coordinate system having an $I_x$-axis and an $I_y$-axis. The $I_x$-axis is parallel to the lower side of the imaging surface 42a of FIG. 25 and the $I_y$-axis is parallel to the left side of the imaging surface 42a of FIG. 25 when seen from the positive z-axis direction with the y-axis facing up.

Hereinafter, the imager-under-test coordinate system in the present embodiment may be referred to as an $I_xI_y$ coordinate system.

In FIG. 25, the x-axis and y-axis translated on the imaging surface 42a are shown as two-dot chain lines so that it is easy to see that the endoscope imager 42 is rotated with respect to the coordinate system of the measurement system.

In FIG. 25, a state in which the x-axis of the coordinate system of the measurement system is rotated by $\phi$ with respect to the horizontal direction of the endoscope imager 42 is shown. Here, the positive direction of the rotation direction in the xy plane is a direction in which the right screw travels in the positive z-axis direction.

In the endoscope imager 42 arranged in a direction in which the up, down, left, and right of the inverted image through the optical system 41 under test are imaged correctly, the positive direction of the $I_x$-axis is the positive x-axis direction. The positive direction of the $I_y$-axis is the negative y-axis direction.

The coordinate value in the $I_x I_y$ coordinate system is represented in units of pixel pitches P of the endoscope imager 42. Here, the pixel of the endoscope imager 42 may indicate a unit of a coordinate value output from the endoscope imager 42 and may be different from a physical pixel in the endoscope imager 42.

The origin in the $I_x I_y$ coordinate system is not particularly limited, but is represented by, for example, coordinates ($I_{xB}$, $I_{yB}$) of the lower left corner when seen from the positive z-axis direction with the y-axis facing up.

Figure 26:
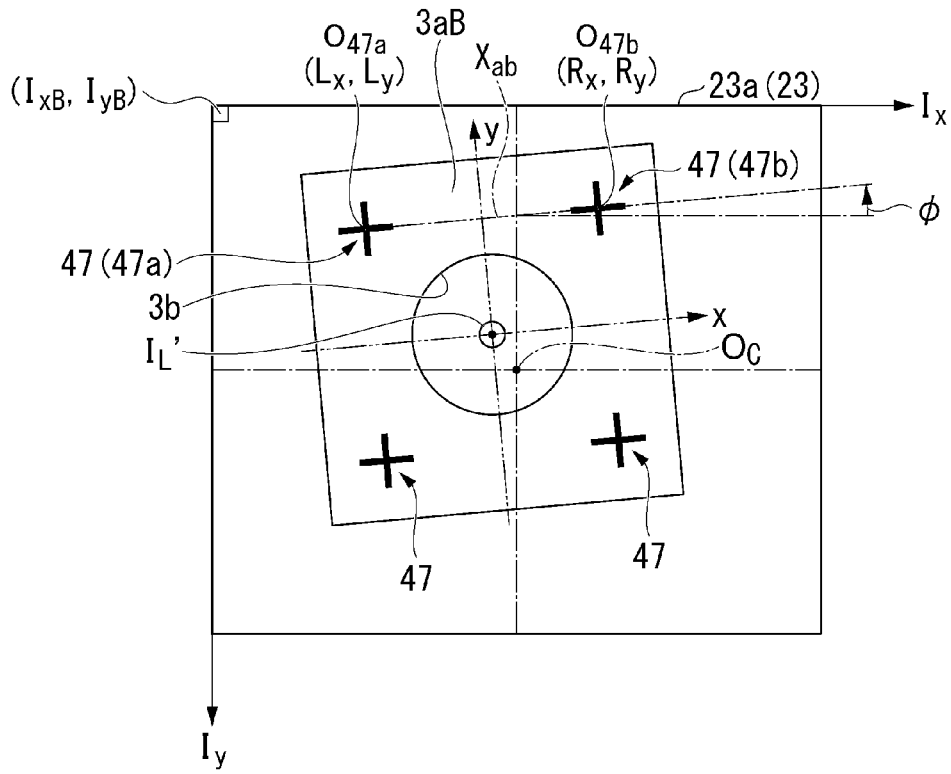
FIG. 26 is a schematic diagram showing an example of an image acquired from an optical unit under test in an eccentricity measurement method according to the third embodiment of the present invention.

FIG. 26 is a schematic diagram showing an example of an image acquired from an optical unit under test in an eccentricity measurement method according to the third embodiment of the present invention.

In FIG. 26, an example of images of the front wall 3aB and the reference mark 47 imaged by the endoscope imager 42 rotated by $-\phi$ with respect to the x-axis and displayed on the display screen 23a of the display unit 23 is shown. For the x-axis and the y-axis indicated by two-dot chain lines in FIG. 26, the x- and y-axes of the coordinate system of the measurement system fixed on the front wall 3aB are moved in parallel.

On the display screen 23a, an image in which the x-axis is rotated by $+\phi$ with respect to the $I_x$-axis of the endoscope imager 42 is obtained.

Next, an eccentricity measurement method of the present embodiment will be described.

Figure 27:
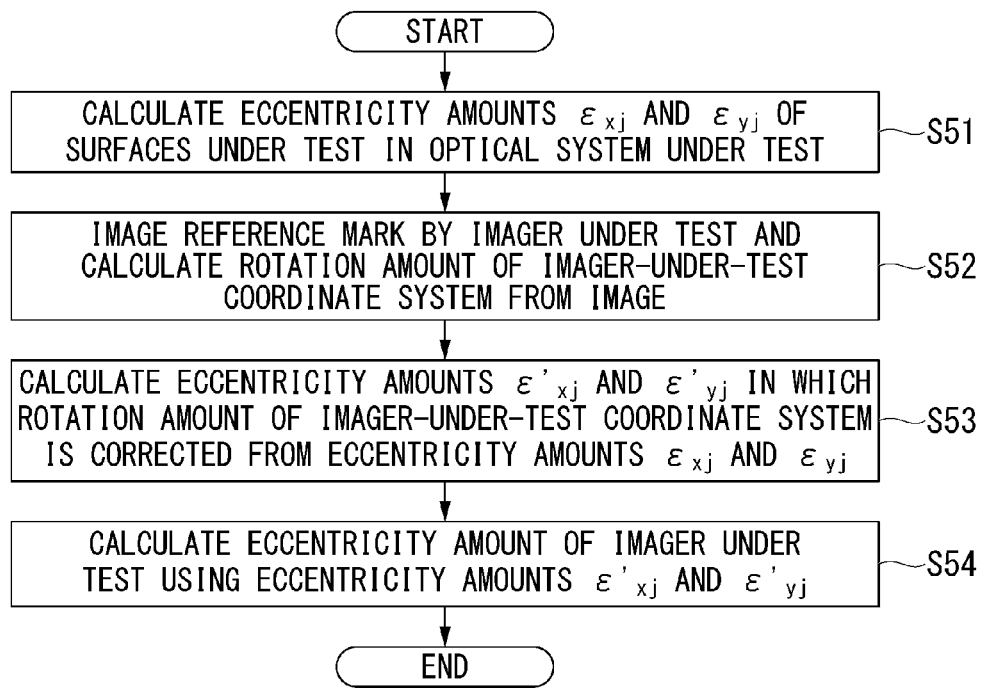
FIG. 27 is a flowchart showing an example of the eccentricity measurement method according to the third embodiment of the present invention.

FIG. 27 is a flowchart showing an example of the eccentricity measurement method according to the third embodiment of the present invention.

The eccentricity measurement method of the present embodiment executes steps S51 to S54 on the basis of the flow shown in FIG. 27.

In step S51, the eccentricity amounts $\varepsilon_{xj}$ and $\varepsilon_{yj}$ (here, j=1, . . . , N, where N is the number of surfaces Si under test) of surfaces Si under test in the optical system 41 under test are calculated. Hereinafter, the amount with the subscript j represents N numerical values of j=1, . . . , N unless otherwise specified.

This step is similar to the step of the eccentricity measurement method of the first embodiment. Specifically, steps S1 to S9 shown in FIG. 13 are executed in the similar way. However, step S1 may be executed like step S21 in the second embodiment.

The design data stored in step S1 of the present embodiment includes information of the coordinate system in the endoscope imager 42 and information of representative points of the endoscope imager 42 to be eccentrically measured.

The calculated eccentricity amounts $\varepsilon_{xj}$ and $\varepsilon_{yj}$ are stored in the storage unit 104.

Here, the signs of eccentricity amounts $\varepsilon_{xj}$ and $\varepsilon_{yj}$ in the coordinate system of the measurement system will be described.

Figure 28:
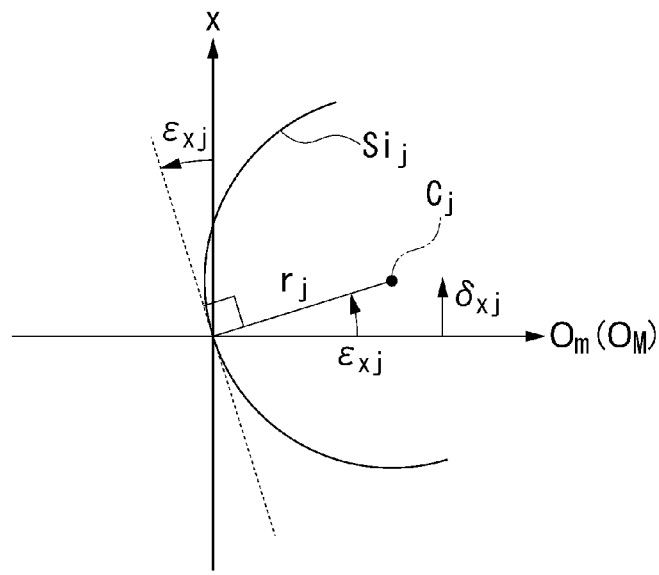
FIG. 28 is a schematic diagram showing a relationship between x-axis components of an amount of eccentricity of a spherical center of a surface under test and tilt eccentricity of a surface under test.
Figure 29:
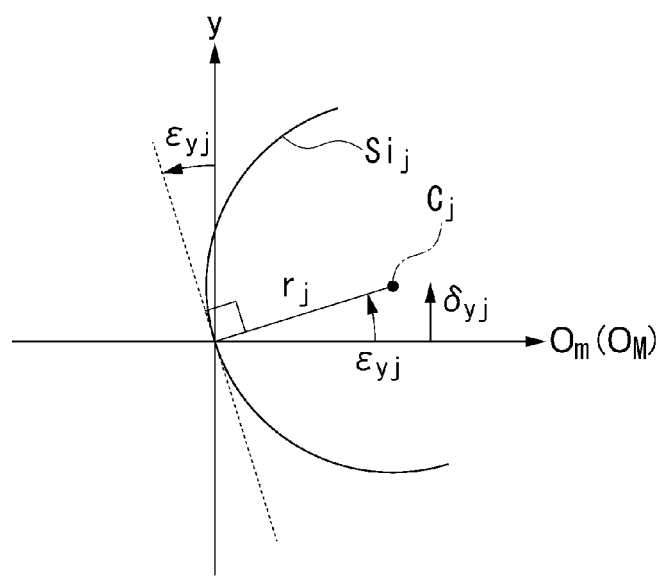
FIG. 29 is a schematic diagram showing a relationship between y-axis components of an amount of eccentricity of a spherical center of a surface under test and tilt eccentricity of a surface under test.

FIG. 28 is a schematic diagram showing a relationship between x-axis components of an amount of eccentricity of a spherical center of a surface under test and tilt eccentricity of a surface under test. FIG. 29 is a schematic diagram showing a relationship between y-axis components of an amount of eccentricity of a spherical center of a surface under test and tilt eccentricity of a surface under test.

As shown in FIG. 28, an eccentricity amount $\varepsilon_{xj}$ of a $j^{th}$ surface $Si_j$ under test from the front side is positive in a direction in which it rotates from the positive direction (the positive z-axis direction) of the reference axis $O_m$ in the zx plane to the positive x-axis direction.

As shown in FIG. 29, an eccentricity amount $\varepsilon_{yj}$ of a $j^{th}$ surface $Si_j$ under test from the front side is positive in a direction in which it rotates from the positive direction (the positive z-axis direction) of the reference axis $O_m$ in the yz plane to the positive y-axis direction.

A relationship between the eccentricity amounts $\varepsilon_{xj}$ and $\varepsilon_{yj}$ and the eccentricity amounts $\delta_{xj}$ and $\delta_{yj}$ of the spherical center $SC_j$ of the surface $Si_j$ under test is represented by the following Eqs. (16) and (17) using the radius $r_j$ of curvature of the surface $Si_j$ under test.

[Math. 14]

$$\varepsilon_{xj} = \frac{\delta_{xj}}{r_j} \quad (16)$$

$$\varepsilon_{yj} = \frac{\delta_{yj}}{r_j} \quad (17)$$

When step S51 ends, step S52 is executed.

In step S52, the reference mark 47 is imaged by the endoscope imager 42 that is the imager under test and the x-axis rotation amount $\phi$ of the coordinate system of the measurement system for the horizontal coordinate axis ($I_x$-axis) of the imager-under-test coordinate system is calculated from the image captured by the endoscope imager 42. The rotation amount of the horizontal coordinate axis ($I_x$-axis) of the imager-under-test coordinate system for the x-axis of the coordinate system of the measurement system is $-\phi$.

The rotation amount of $-\phi$ is an example of the rotation amount of the imager-under-test coordinate system for the reference line orthogonal to the reference axis in a plane orthogonal to the reference axis.

The rotation amount measurement is performed on the basis of the position information of the reference mark 47 in the image captured by the endoscope imager 42 through the optical system 41 under test.

The general control unit 101B acquires an image of the reference mark 47 imaged by the endoscope imager 42 in a state in which eccentricity measurement has ended. At this time, the image of the optical image IP' is not required, but a blurred image $I_L'$ of the optical image IP' is displayed on the display screen 23a when the optical image IP' is projected onto any of the surfaces Si under test.

For example, it is assumed that the general control unit 101B acquires an image as shown in FIG. 26 from the endoscope imager 42.

The general control unit 101B transmits the acquired image to the image processing unit 103. The image processing unit 103 calculates coordinates ($L_x$, $L_y$) of the intersection $O_{47a}$ and coordinates ($R_x$, $R_y$) of the intersection $O_{47b}$ in the $I_x I_y$ coordinate system by executing appropriate image processing such as feature extraction, and transmits the calculated coordinates to the general control unit 101B.

The general control unit 101B transmits each coordinate value to the arithmetic processing unit 102B. The arithmetic processing unit 102B calculates the rotation amount $\phi$ in the x-axis direction of the coordinate system of the measurement system for the horizontal direction of the imager under test on the basis of the following Eq. (18). The calculated rotation amount ϕ is stored in the storage unit 104.

[Math. 15]

$$\phi = \tan^{-1}\left\{\frac{-(R_y - L_y)}{R_x - L_x}\right\} \quad (18)$$

Accordingly, step S52 ends.

Although an example in which the images of the reference marks 47a and 47b are used in the method of measuring the rotation amount has been described above, the present invention is not limited to this example. For example, the rotation amount may be calculated using an image of another reference mark 47 whose positional relationship associated with the reference axis $O_m$ is known.

After step S52, step S53 is executed.

In step S53, corrected eccentricity amounts E and E are calculated from the eccentricity amounts $\varepsilon_{xj}$ and $\varepsilon_{yj}$ so that the horizontal direction of the imager under test matches the x-axis direction of the coordinate system of the measurement system.

The general control unit 101B causes the arithmetic processing unit 102B to execute an arithmetic operation based on the following Eq. (19) using the rotation amount ϕ calculated in step S52.

[Math. 16]

$$\begin{pmatrix} \varepsilon'_{xj} \\ \varepsilon'_{yj} \end{pmatrix} = \begin{pmatrix} \cos\phi & -\sin\phi \\ \sin\phi & \cos\phi \end{pmatrix} \begin{pmatrix} \varepsilon_{xj} \\ \varepsilon_{yj} \end{pmatrix} \quad (19)$$

Accordingly, step S53 ends. After step S53, step S54 is executed.

In step S54, the eccentricity amount of the imager under test is calculated using the eccentricity amounts E and E'.

First, the principle of measuring the eccentricity of the endoscope imager 42 will be described.

Figure 30:
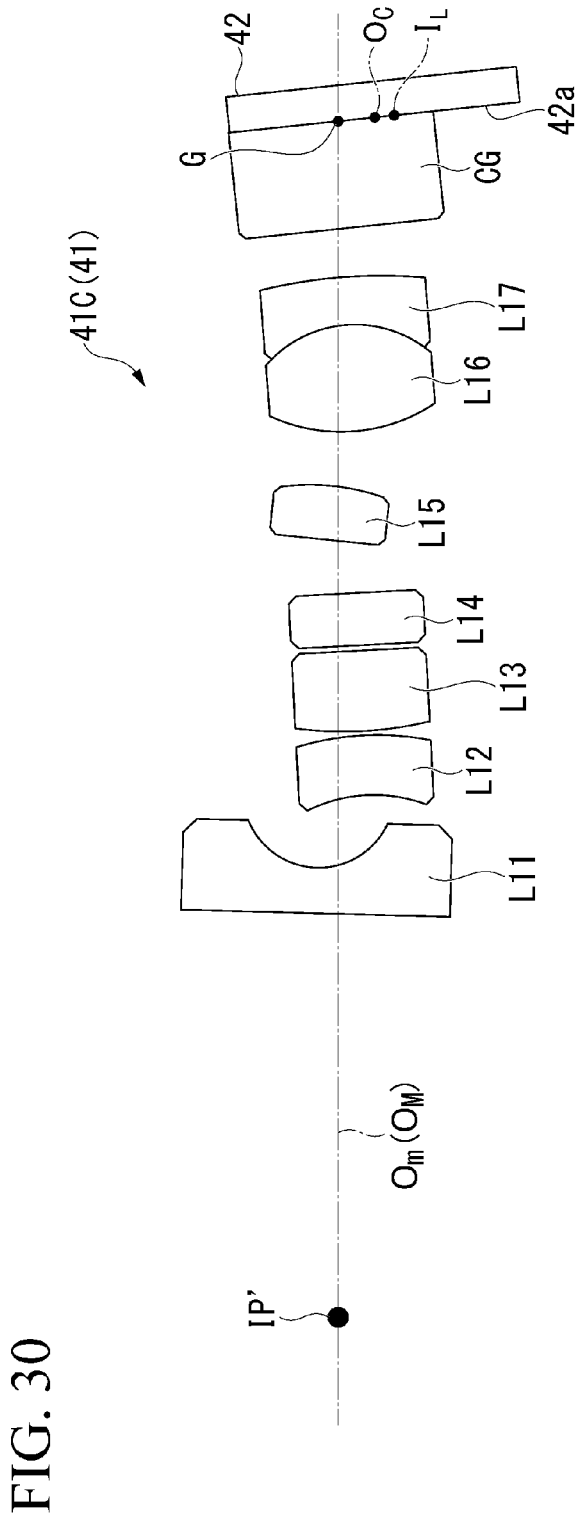
FIG. 30 is a schematic cross-sectional view for describing the principle of measurement in the eccentricity measurement method according to the third embodiment of the present invention.
Figure 31:
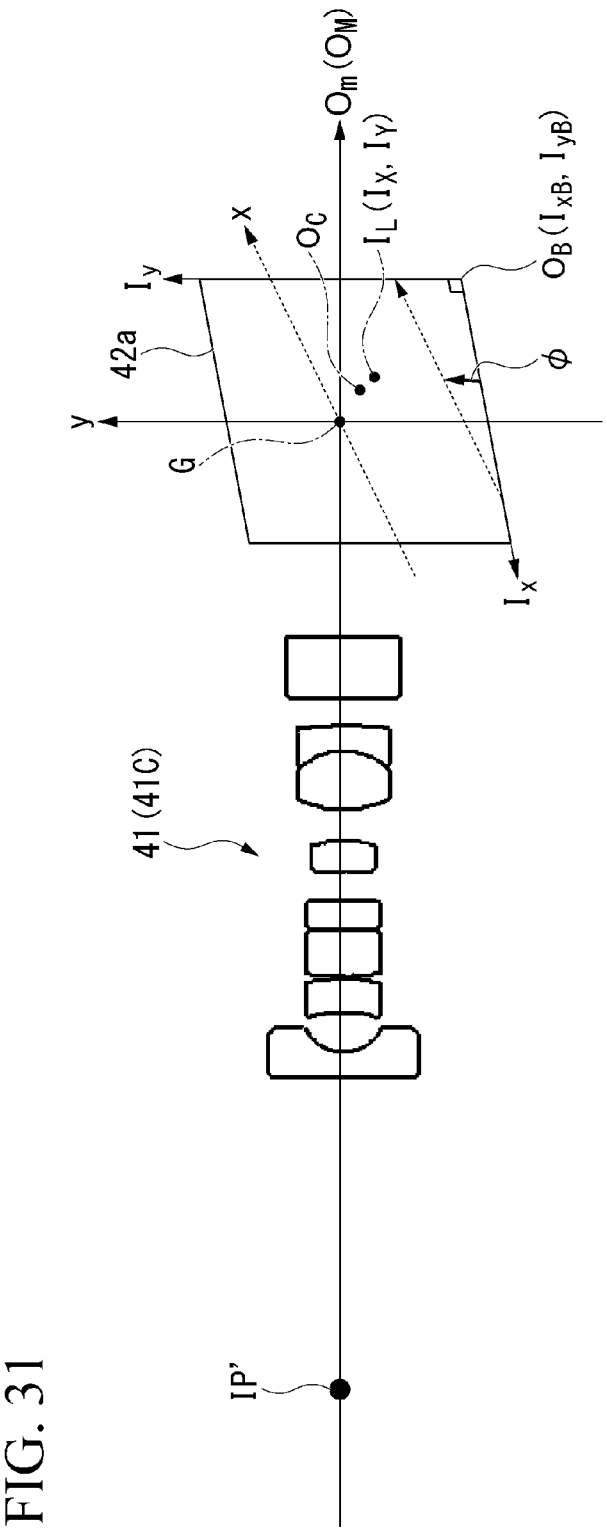
FIG. 31 is a schematic diagram showing relationships between an image on an imager under test, a coordinate system of a measurement system, and an imager-under-test coordinate system in the eccentricity measurement device according to the third embodiment of the present invention.
Figure 32:
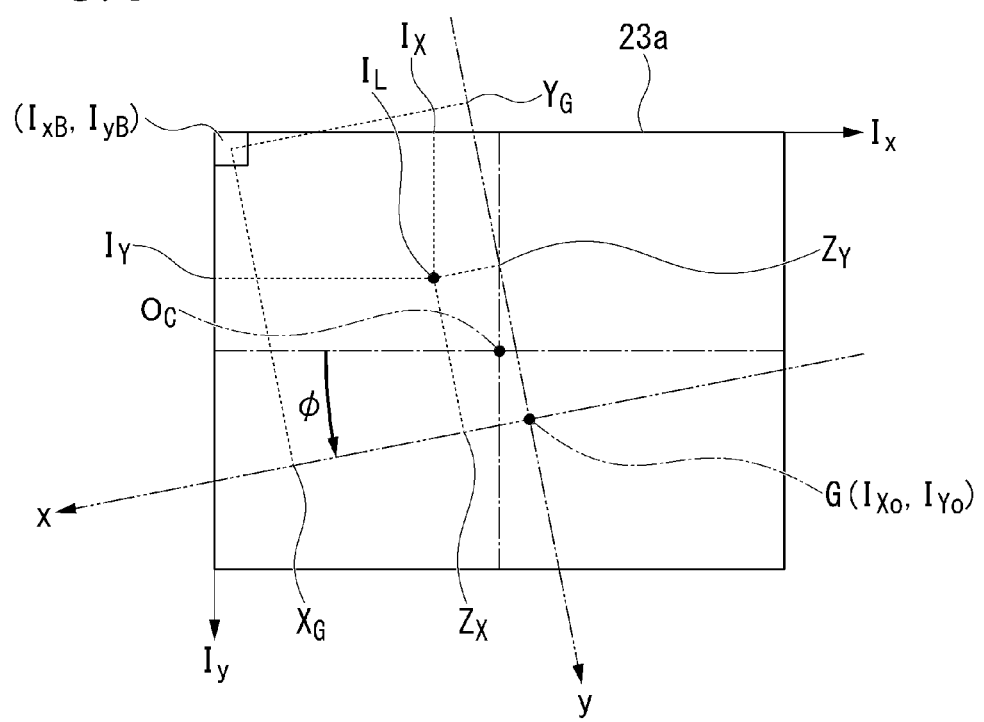
FIG. 32 is a schematic diagram showing a relationship between the imager-under-test coordinate system and an xy coordinate system of the measurement system in a direction displayed on a display unit.

FIG. 30 is a schematic cross-sectional view for describing the principle of measurement in the eccentricity measurement method according to the third embodiment of the present invention. FIG. 31 is a schematic diagram showing relationships between an image on an imager under test, a coordinate system of a measurement system, and an imager-under-test coordinate system in the eccentricity measurement device according to the third embodiment of the present invention. FIG. 32 is a schematic diagram showing a relationship between the imager-under-test coordinate system and an xy coordinate system of the measurement system in a direction displayed on a display unit.

In FIG. 30, an optical system 41C under test is arranged as an example of the optical system 41 under test.

In the optical system 41C under test, seven lenses of lenses L21 to L27 and a cover glass CG are arranged from the object side to the image side. However, the lenses L26 and L27 are cemented lenses.

The optical system 41C under test is eccentric as shown in FIG. 30. The amount of eccentricity (tilt eccentricity) from the reference axis $O_m$ of each optical surface has been calculated in step S51.

Because the imaging surface 42a is attached to the cover glass CG in parallel to the cover glass CG, the tilt eccentricity of the imaging surface 42a matches the tilt eccentricity of the cover glass CG. On the other hand, there is a possibility that the position of the endoscope imager 42 will vary in the direction along the surface of the cover glass CG due to assembly errors.

The shift eccentricity of the imaging surface 42a is defined by an amount of deviation of a representative point on the imaging surface 42a from the reference axis $O_m$ that serves as a reference for eccentricity measurement. As the representative point, any point on the imaging surface 42a can be selected. In the following description, the representative point will be described with an example of the origin of the imager-under-test coordinate system fixed to the imaging surface 42a.

However, because at least a part of the optical surface of the optical system 41C under test is eccentric, in the state of the optical unit in which the optical system 41C under test and the endoscope imager 42 are assembled, it is difficult to measure an intersection between the reference axis $O_m$ and the imaging surface 42a.

In this step, as shown in FIG. 30, an optical image IP' is projected from the eccentricity measurement device 50B at a position optically conjugate to the imaging surface 42a. The optical image IP' is located on the reference axis $O_m$, but the optical image $I_L$ formed on the imaging surface 42a is formed at a position shifted in a direction orthogonal to the reference axis $O_m$ in accordance with the eccentricity amount of the optical system 41C under test. A point $O_C$ is the center of the imaging surface 42a shown as a reference.

For example, as shown in FIG. 31, in general, the optical image $I_L$ is separated from a point G which is an intersection between the reference axis $O_m$ and the imaging surface 42a in the $I_x$-axis direction and the $I_y$-axis direction on the imaging surface 42a.

Hereinafter, the position coordinates of the optical image $I_L$, the point G, and the representative point $O_B$ in the $I_x I_y$ coordinate system are denoted by $(I_X, I_Y)$, $(I_{Xo}, I_{Yo})$, and $(I_{xB}, I_{yB})$, respectively.

The position coordinates of the optical image $I_L$ are denoted by $(Z_x, Z_y)$ when represented in the xy coordinate system of the measurement system. The eccentricity amount of the representative point $O_B$ seen from the point G is denoted by $(X_G, Y_G)$ in the xy coordinate system.

FIG. 32 shows relationships between the optical image $I_L$, the $I_x I_y$ coordinate system, and the xy coordinate system in the image displayed on the display screen 23a on the basis of an image signal transmitted from the endoscope imager 42. Here, $Z_X$, $Z_Y$, $X_G$, and $Y_G$ are quantities and actual dimensions of the xy coordinate system.

$(Z_X, Z_Y)$ is an example of an amount of deviation from the reference axis $O_m$ on the imaging surface 42a of the optical image $I_L$, which is an image generated on the imaging surface 42a, when the optical image IP' is positioned at a position optically conjugate to the imaging surface 42a on the reference axis $O_m$.

$Z_X$ and $Z_Y$ are represented by the following Eqs. (20) and (21).

[Math. 17]

$$Z_X = \sum_{j=1}^{N} K_j \varepsilon_{xj} \quad (20)$$

$$Z_Y = \sum_{j=1}^{N} K_j \varepsilon_{yj} \quad (21)$$

Here, N is the number of surfaces Si under test when the entire optical surface of the optical system 41C under test is used as the surface Si under test. A coefficient $K_j$ is obtained by calculating a position on an image surface at the time of incidence on the optical axis $O_M$ from the object side, for example, in a state in which a unit amount of tilt eccentricity such as 1 min is given to the $j^{th}$ surface $Si_j$ under test in the optical system 41C under test.

Thus, the eccentricity amount of the endoscope imager 42 is obtained as follows using a process in which the position coordinate of the optical image $I_L$ can be measured in the $I_x I_y$ coordinate system and can be calculated in the xy coordinate system and the rotation amount $\phi$ between the $I_x I_y$ coordinate system and the xy coordinate system is obtained.

Figure 33:
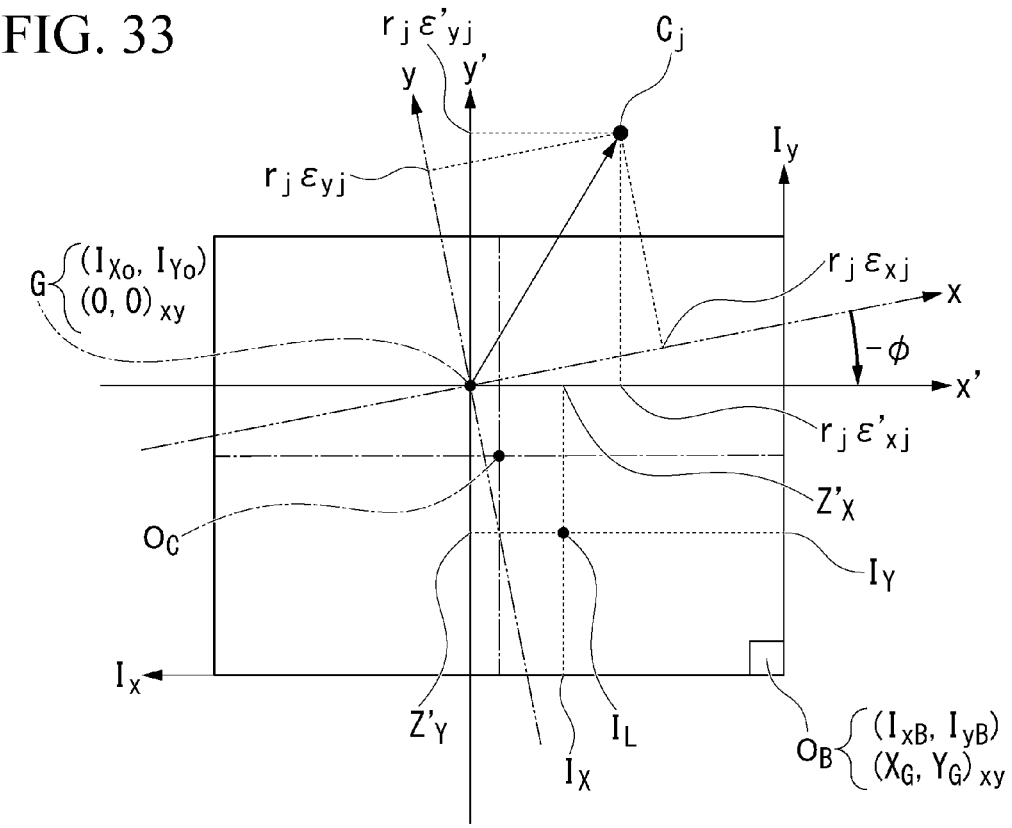
FIG. 33 is a schematic diagram showing a relationship between an amount of eccentricity of a spherical center of a surface under test seen from the imager-under-test coordinate system and an image formation position of an optical image $I_L$.

FIG. 33 is a schematic diagram showing a relationship between an amount of eccentricity of a spherical center of a surface under test seen from the imager-under-test coordinate system and an image-formation position of an optical image $I_L$.

$X_G$ and $Y_G$ representing the eccentric x-axis component and the y-axis component of the endoscope imager 42 with respect to the reference axis $O_m$ are represented by the following Eqs. (22) and (23), respectively.

[Math. 18]

$$X_G = (I_{X_o} - I_{XB})P \qquad (22)$$

$$Y_G = -(I_{Y_o} - I_{YB})P \qquad (23)$$

Here, P is the pixel pitch P of the endoscope imager 42. $I_{X_o}$ and $I_{Y_o}$ are calculated from the following Eqs. (24) and (25) using the position coordinates of $I_L$ in the x'y' coordinate system rotated by $-\phi$ from the xy coordinate system as $(Z'_X, Z'_Y)$.

[Math. 19]

$$I_{XO} = I_X + \frac{Z'_X}{P} \qquad (24)$$

$$I_{YO} = I_Y - \frac{Z'_Y}{P} \qquad (25)$$

As shown in FIG. 33, the position coordinates of the spherical center $C_j$ of the surface $Si_j$ under test are $(r_j \varepsilon_{xj}, r_j \varepsilon_{yj})$ in the xy coordinate system and $(r_j \varepsilon'_{xj}, r_j \varepsilon'_{yj})$ in the x'y' coordinate system. Thus, $Z'_X$ and $Z'_Y$ can be calculated by the following Eqs. (26) and (27) using $K_j$ as in Eqs. (20) and (21). Here, $\varepsilon'_{xj}$ and $\varepsilon'_{yj}$ can be calculated by Eq. (19).

[Math. 20]

$$Z'_X = \sum_{j=1}^{N} K_j \varepsilon'_{xj} \qquad (26)$$

$$Z'_Y = \sum_{i=1}^{N} K_j \varepsilon'_{yi} \qquad (27)$$

In this step, the above-described calculation is performed as follows.

The general control unit 101B acquires an image of the optical image $I_L$ and causes the image processing unit 103 to calculate the position coordinates $(I_X, I_Y)$ of the optical image $I_L$ in the $I_x I_y$ coordinate system. The position coordinates $(I_X, I_Y)$ are stored in the storage unit 104.

The general control unit 101B transmits a control signal to the arithmetic processing unit 102B to perform the following calculation.

The arithmetic processing unit 102B calculates $\varepsilon'_{xj}$ and $\varepsilon'_{yj}$ by rotationally correcting $\varepsilon_{xj}$ and $\varepsilon_{yj}$ on the basis of Eq. (19). The arithmetic processing unit 102B calculates $Z'_X$ and $Z'_Y$ by substituting the eccentricity amounts $\varepsilon'_{xj}$ and $\varepsilon'_{yj}$ in which the rotation amount is corrected into Eqs. (25) and (26). Subsequently, the arithmetic processing unit 102 substitutes $I_X$, $I_Y$, $Z'_X$, and $Z'_Y$ into Eqs. (24) and (25) to calculate $I_{X_o}$ and $I_{Y_o}$, and substitutes $I_{X_o}$ and $T_{Y_o}$ into Eqs. (22) and (23) to calculate $X_G$ and $Y_G$.

In this way, the eccentricity amounts $X_G$ and $Y_G$ of the endoscope imager 42 are obtained and step S54 ends.

Although the example in which the representative point is $O_B$ has been described above, the eccentricity amount of the endoscope imager 42 for any representative point is obtained if $(I_{xB}, I_{yB})$ is changed to the coordinates of the representative point. For example, it is only necessary to use the position coordinates of the center $\theta_C$ in the $I_x I_y$ coordinate system instead of $(I_{xB}, I_{yB})$ when the representative point is the center $\theta_C$.

Step S54 includes an example of a step including: the step of calculating an amount of deviation $(Z_X, Z_Y)$ from the reference axis on the imaging surface of an image generated on the imaging surface when the optical image has been positioned at a position optically conjugate to the imaging surface on the basis of the amount of eccentricity of the surface under test; the step of projecting the optical image onto the position optically conjugate to the imaging surface on the reference axis, acquiring the image of the optical image by the imager under test, and measuring position coordinates $(I_X, I_Y)$ of the image acquired by the imager under test represented in an imager-under-test coordinate system in the imaging surface; and the step of calculating an amount of eccentricity of the imaging surface for the reference axis by calculating position coordinates $(I_{X_o}, I_{Y_o})$ of an intersection between the reference axis and the imaging surface in the imager-under-test coordinate system from the amount of deviation $(Z_X, Z_Y)$ and the position coordinates $(I_X, I_Y)$.

The x'y' coordinate system in FIG. 33 corresponds to an xy coordinate system in which the tip portion 40 is rotated around the reference axis $O_m$ on the basis of a magnitude of the rotation amount. As such, the tip portion 40 is actually rotated and eccentricity measurement of the surface Si under test is performed after the rotation position is corrected. Subsequently, an image of the optical image $I_L$ may be acquired to obtain the eccentricity amount of the endoscope imager 42.

However, because work time for correcting the rotation position of the tip portion 40 is required and it is difficult for the tip portion 40 to adjust the rotation, there is also a possibility that the correction error will remain.

On the other hand, in the present embodiment, because rotation correction is performed by calculation instead without actually rotating the tip portion 40, the faster and more accurate measurement of the eccentricity amount of the endoscope imager 42 can be performed.

In the present embodiment, the general control unit 101B of the measurement control unit 5B is an example of an imager-under-test image acquisition unit that acquires an image from the imager under test.

The arithmetic processing unit 102B of the measurement control unit 5B is an example of an imager-under-test eccentricity calculation unit configured to calculate a position of the optical image on an imaging surface on the basis of an image acquired by the imager-under-test image acquisition unit when the optical image has been moved to a position optically conjugate to the imaging surface of the imager under test using the moving mechanism and calculate relative eccentricity between the optical system under test and the imager under test on the basis of a calculated value of the position.

As described above, because the eccentricity measurement device of the present embodiment and the eccentricity measurement method using the same are similar to those of the first embodiment except for a process of measuring the eccentricity of the imager under test, the eccentricity amount of the surface under test can be accurately measured without rotating the optical unit under test as in the first embodiment.

In particular, according to the present embodiment, the eccentricity amount of the endoscope imager 42 incorporated in the optical unit under test can be accurately measured.

Measurement of the rotation amount of the endoscope imager 42 using the reference mark 47 may be used to adjust the tip portion 40 in the horizontal direction and the xy coordinate system in the horizontal direction.

Fourth Embodiment

Next, an eccentricity measurement device and an eccentricity measurement method according to a fourth embodiment of the present invention will be described.

The eccentricity measurement device 50C according to the present embodiment shown in FIG. 1 includes a measurement control unit 5C instead of the measurement control unit 5 of the eccentricity measurement device 50 according to the first embodiment.

The eccentricity measurement device 50C is similar to the eccentricity measurement device 50 except that an eccentricity amount of a frame member arranged inside of a lens frame 40a can also be measured in addition to the eccentricity measurement of each optical surface of an optical system 41 under test.

Hereinafter, differences from the first embodiment will be mainly described.

As shown in FIG. 2, the measurement control unit 5C includes a general control unit 101C and an arithmetic processing unit 102C, respectively, instead of the general control unit 101 and the arithmetic processing unit 102 of the measurement control unit 5.

The general control unit 101C and the arithmetic processing unit 102C are similar to the general control unit 101 and the arithmetic processing unit 102 except that they are configured to perform control and an arithmetic operation related to eccentricity measurement of the frame member to be described below.

The detailed control and arithmetic operation in the general control unit 101C and the arithmetic processing unit 102C will be described in the eccentricity measurement method to be described below.

The frame member in the present embodiment will be described.

Figure 34:
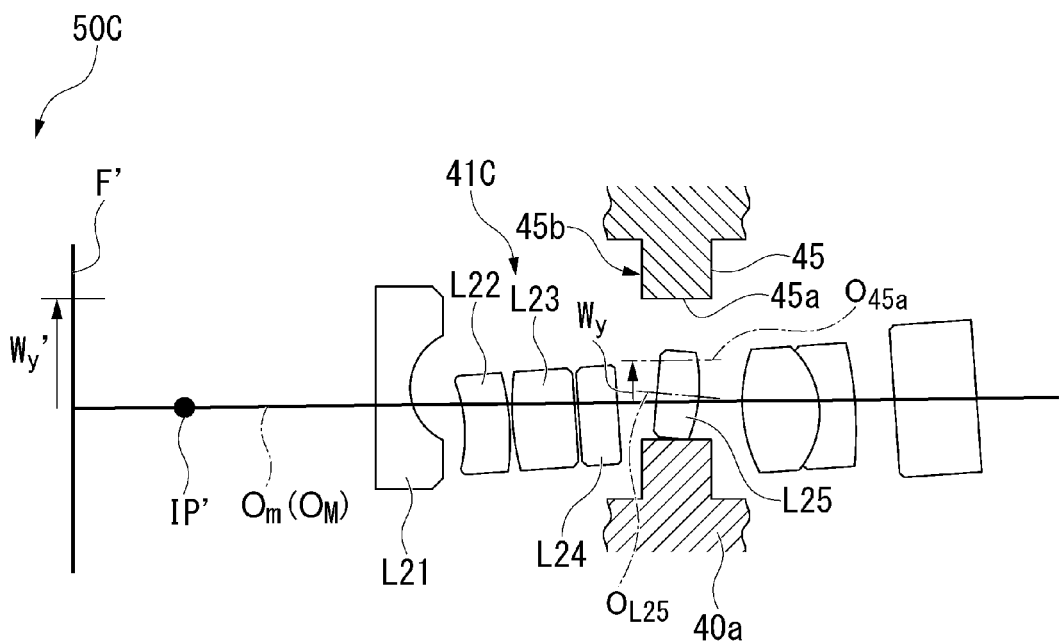
FIG. 34 is a cross-sectional view showing an example of a frame member in an eccentricity measurement device according to a fourth embodiment of the present invention.
Figure 35:
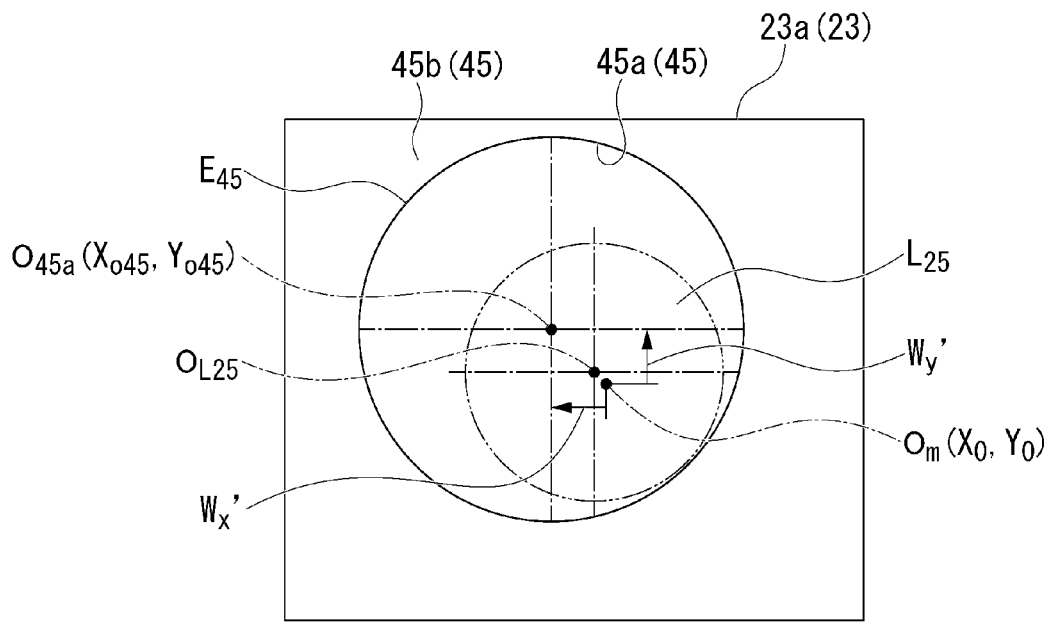
FIG. 35 is a schematic diagram showing an image of a frame member captured by a measurement imager.

FIG. 34 is a cross-sectional view showing an example of the frame member in the eccentricity measurement device according to the fourth embodiment of the present invention. FIG. 35 is a schematic diagram showing an image of the frame member captured by a measurement imager. In FIGS. 34 and 35, for ease of viewing, a dimensional difference between an outer diameter of a lens L25 and an inner diameter of an opening 45a is exaggerated.

As long as the frame member is observable from the front side of the optical system 41 under test, the arrangement position and the number of arrangements in the lens frame 40a are not limited.

In FIG. 34, a frame member 45 protruding from the inside of the lens frame 40a is shown.

The frame member 45 is an annular protrusion when seen from a direction along a reference axis $O_m$. In the example shown in FIG. 34, the optical system 41C under test similar to that of the third embodiment is used as the optical system 41 under test. The frame member 45 is provided to regulate a position of the outer periphery of a lens L25 arranged fifth from the front side in the optical system 41C under test.

The frame member 45 has a plate portion thicker than a lens thickness of the lens L25. In the plate portion of the frame member 45, an opening 45a having an inner diameter larger than an outer diameter of the lens L25 penetrates in a thickness direction. An edge 45b consisting of a plane orthogonal to the central axis of the lens frame 40a is formed around the opening 45a on the front side of the frame member 45.

The edge 45b is arranged behind a lens L24 arranged fourth from the front side in the optical system 41C under test.

The opening 45a positions an optical axis $O_{L25}$ of the lens L25 to be substantially coaxial with the central axis of the lens frame 40a. The opening 45a may be used as an adhesive surface when the lens L25 is adhered to the lens frame 40a.

Because the opening 45a is used for positioning the lens L25, the optical performance of the optical unit under test and the assembly error can be evaluated by measuring an eccentricity amount of a center $O_{45}$ of the opening 45a with respect to the reference axis $O_m$.

For example, when the eccentricity of the opening 45a is compared with the shift eccentricity of the lens L25 in the optical system 41C under test, it is possible to accurately evaluate which of the manufacturing error of the lens L25 itself, the manufacturing error of the lens frame 40a, and the assembly error largely contributes to the eccentricity of the lens L25.

Next, the principle of the eccentricity measurement method of the frame member 45 will be described.

Although the eccentricity of the edge 45b may be measured by focusing on any portion of an edge $E_{45}$ that forms the opening 45a at the edge 45b, an example in which the eccentricity amount is measured at the center of the edge $E_{45}$ will be described below.

In the eccentricity measurement of the frame member according to the present embodiment, the position of the adjustment lens 13 is fixed, the main body portion 3 is moved using the moving stage 2, and the observed surface F' in the optical observation system is moved to a position conjugate to the edge 45b. Thereby, the edge 45b can be observed by the measurement imager 17.

When the observed surface F' moves to a position optically conjugate to the edge 45b, an image of the edge 45b is displayed on the display screen 23a as shown in FIG. 35. For reference, the position of the lens L25 is indicated by a two-dot chain line, but the image of the lens L25 may be blurred.

This image is an image seen through an optical system (hereinafter referred to as an incidence-side optical system related to the edge 45b) in front of the edge 45b in the optical system 41C under test. The incidence-side optical system related to the edge 45b includes lenses L21, L22, L23, and L24.

The image of the edge 45b is displayed at a position shifted from the reference point ($X_0$, $Y_0$) in accordance with the eccentricity amount of the incidence-side optical system for the edge 45b and the eccentricity amount of the edge 45b itself.

The x- and y-axis components of the distance from the reference point ($X_0$, $Y_0$) to the center $O_{45}$ of the opening 45a measured from the reference point ($X_0$, $Y_0$) in the display screen 23a are denoted by $W'_x$ and $W'_y$, respectively. The position coordinates of the center $O_{45}$ are obtained as the center of the edge $E_{45}$ of the edge 45b.

$W'_x$ and $W'_y$ are represented by the following Eqs. (28) and (29).

[Math. 21]

$$W'_x = mW_x + \sum_{j=1}^{k}\varepsilon_{xj}N_j \quad (28)$$

$$W'_y = mW_y + \sum_{j=1}^{k}\varepsilon_{yj}N_j \quad (29)$$

Here, m denotes the magnification of the image of the edge 45b on the observed surface observed through the incidence-side optical system related to the edge 45b. Lateral magnification calculated from design data of the incidence-side optical system is used as m. $W_x$ and $W_y$ are eccentricity amounts for the reference axis $O_m$ of the edge 45b. k is the number of optical surfaces in front of the edge 45b in the optical system 41C under test. In the example of FIG. 34, k=8. $N_j$ (j=1, . . . , k) is a coefficient for obtaining deviation of the imaging position by the incidence-side optical system. $N_j$ can be obtained as in the calculation for obtaining the coefficient $K_j$ in the third embodiment. However, for calculation, the design data of the incidence-side optical system is used instead of the optical system 41C under test.

When Eqs. (28) and (29) are solved for $W_x$ and $W_y$, the following Eqs. (30) and (31) are obtained.

[Math. 22]

$$W_x = \frac{1}{m}\left(W'_x - \sum_{j=1}^{k}\varepsilon_{xj}N_j\right) \quad (30)$$

$$W_y = \frac{1}{m}\left(W'_y - \sum_{i=1}^{k}\varepsilon_{yj}N_j\right) \quad (31)$$

Next, an eccentricity measurement method of the present embodiment will be described.

The eccentricity measurement method of the present embodiment is similar to that of the first embodiment except that the eccentricity amount for the reference axis $O_m$ of the edge 45b forming the front end edge of the opening 45a is measured.

However, it is necessary to measure each eccentricity amount using all optical surfaces of the incidence-side optical system related to the edge 45b as the surface Si under test so that the eccentricity of the edge 45b is measured. Because the eccentricity of the optical surface excluding the incidence-side optical system is not necessary for eccentricity measurement of the edge 45b in the optical system 41C under test, it may be removed from the measurement target of eccentricity measurement or may be a measurement target as in the first embodiment.

The eccentricity measurement of the edge 45b can be performed continuously or discretely at appropriate timings between the time after step S4 in FIG. 13 and the time after step S9.

Hereinafter, differences from the first embodiment will be mainly described focusing on steps related to the eccentricity measurement of the edge 45b.

Figure 36:
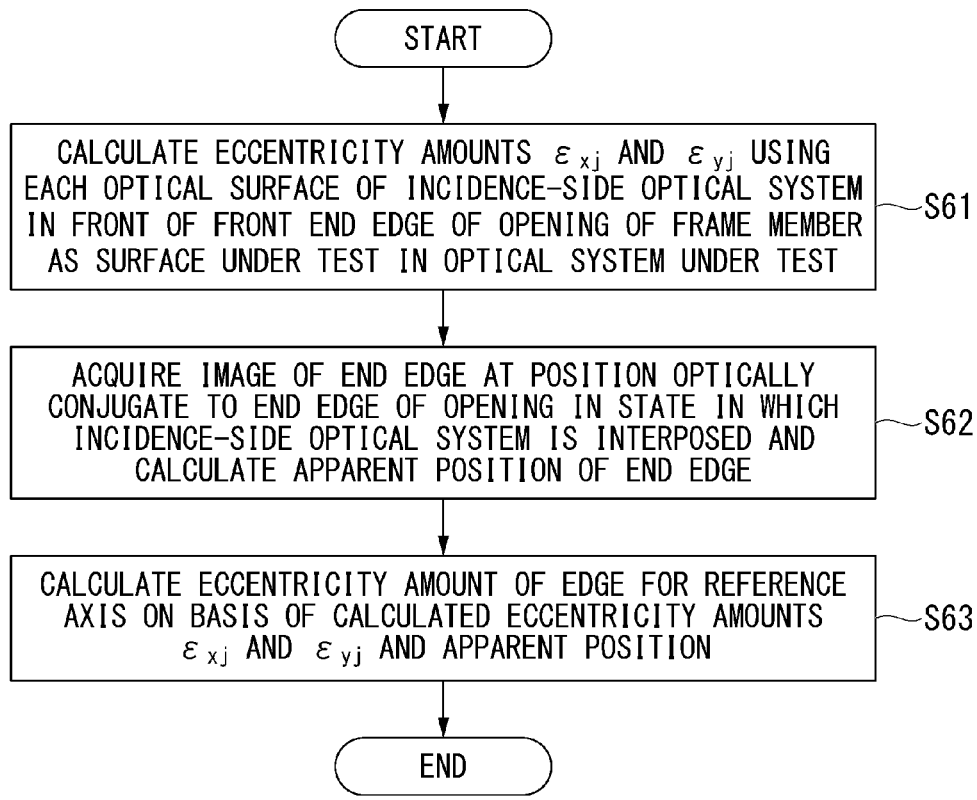
FIG. 36 is a flowchart showing an example of an eccentricity measurement method according to the fourth embodiment of the present invention.

FIG. 36 is a flowchart showing an example of the eccentricity measurement method according to the fourth embodiment of the present invention.

The eccentricity measurement method of the present embodiment executes steps S61 to S63 on the basis of the flow shown in FIG. 36.

In step S61, the eccentricity amounts $\varepsilon_{xj}$ and $\varepsilon_{yj}$ are calculated using each optical surface of the incidence-side optical system in front of the edge 45b forming the front end edge of the opening 45a of the frame member 45 as the surface under test.

This step may execute a flow similar to that of the first embodiment shown in FIG. 13 or steps S1 to S9 may be executed by replacing N with k if only the eccentricity of the frame member 45 is measured in the flow shown in FIG. 13.

In this regard, in the present embodiment, the design data stored in step S1 includes data of a position and shape of the lens frame 40a that is an eccentricity measurement target and data of m and $N_j$ calculated from the design data of the optical system 41C under test.

After step S61, step S62 is executed.

In step S62, an image of the edge 45b is acquired at a position optically conjugate to the edge 45b in a state in which the incidence-side optical system is interposed therebetween and the apparent position of the edge 45b is calculated.

The general control unit 101C transmits a control signal for driving the optical system transport unit drive unit 2c to the transport unit controller 105 so that the focal plane F' of the optical observation system is located at a position optically conjugate to the edge 45b. The optical system transport unit drive unit 2c moves the optical system transport unit 2b in accordance with a control signal transmitted from the transport unit controller 105 on the basis of the control signal of the general control unit 101C.

At this time, the general control unit 101C may perform a control process for moving the optical image IP' to a position where the edge 45b is illuminated and easily observed by the optical image IP'. In this case, the general control unit 101C transmits a control signal to the adjustment lens drive unit 21 via the projection position controller 106 and moves the adjustment lens 13. The appropriate movement position of the optical image IP' can be calculated in advance on the basis of the design data of the incidence-side optical system and stored in the storage unit 104.

In this case, because the optical image IP' is only used for the purpose of illumination, the movement error of the adjustment lens 13 and the error of the movement position of the optical image IP' according to the movement error do not affect the measurement accuracy of the eccentricity of the frame member 45.

For example, when a light intensity on the edge 45b is insufficient when the edge 45b is observed, the light intensity of the light source 10 may be increased.

For example, in addition to the beam forming the optical image IP', or instead of this beam, an illumination light source for observing the edge 45b may be provided.

When the focal plane F' moves to a position optically conjugate to the edge 45b, for example, an image of the edge 45b is displayed on the display screen 23a as shown in FIG. 35.

The general control unit 101C acquires an image from the measurement imager 17, transmits the acquired image to the image processing unit 103, extracts an edge $E_{45}$ from the image of the edge 45b, causes the image processing unit 103 to calculate the position coordinates $(X_{o45}, Y_{o45})$ of a center $O_{45}$ of the edge $E_{45}$. The position coordinates $(X_{o45}, Y_{o45})$ are stored in the storage unit 104.

The position coordinates $(X_{o45}, Y_{o45})$ represent the apparent position of the edge 45b seen through the incidence-side optical system.

Accordingly, step S62 ends.

Step S62 is an example of a step including: the step of calculating each amount of eccentricity using at least each optical surface in front of a front end edge of the opening among the plurality of optical surfaces as the surface under test and arranging an imaging surface of the measurement imager at a position optically conjugate to the end edge of the opening by interposing an incidence-side optical system in front of the end edge within the optical system under test and acquiring an image of the end edge through the incidence-side optical system by the measurement imager; and the step of calculating an apparent position of the end edge for the reference point on the basis of the image of the end edge.

After step S62, step S63 is executed.

In step S63, the eccentricity amount of the edge 45b for the reference axis $O_m$ is calculated on the basis of the calculated eccentricity amounts $\varepsilon_{xj}$ and $\varepsilon_{yj}$ (j=1, ..., k) and the apparent position $(X_{o45}, Y_{o45})$.

When the general control unit 101C transmits a control signal for calculating the eccentricity amount of the edge 45b to the arithmetic processing unit 102C, the arithmetic processing unit 102C performs the following arithmetic operation.

The arithmetic processing unit 102C calculates an amount of apparent positional deviation with respect to the reference point $(X_0, Y_0)$ like $(W'_x, W'_y)=(X_{o45}-X_0, Y_{o45}-Y_0)$.

Subsequently, the arithmetic processing unit 102C calculates the eccentricity amount $(W_x, W_y)$ of the edge 45b by executing the arithmetic operations of Eqs. (30) and (31) on the basis of the numerical values stored in the storage unit 104. The calculated eccentricity amount $(W_x, W_y)$ is stored in the storage unit 104 and displayed on the display screen 23a as necessary.

Accordingly, step S63 ends.

Step S63 is an example of a step of calculating the eccentricity amount of the end edge for the reference axis on the basis of the eccentricity amount and apparent position calculated in step S62.

Although a case where step S63 is executed after step S61 has been described above, step S63 may be executed before step S61 after step S4 of the flow shown in FIG. 13.

Step S63 may be executed at any time after steps S61 and S62 and after step S4 of the flow shown in FIG. 13.

As described above, because the eccentricity measurement device of the present embodiment and the eccentricity measurement method using the same are similar to those of the first embodiment except for a process of measuring the eccentricity of the frame member, the eccentricity amount of the surface under test can be accurately measured without rotating the optical unit under test as in the first embodiment.

In particular, according to the present embodiment, the eccentricity of the frame member for holding the optical system under test for the reference axis can be accurately measured in a state in which the frame member is incorporated in the optical unit under test.

Although an example in which a lens of the optical system under test is located inside of the opening of the frame member has been described above, a type of frame member is not limited as long as the frame member has an opening and is provided at a position where an image can be acquired by a measurement imager through an incidence-side optical system and an optical observation system related to the end edge of the opening. For example, the frame member may be a stop in the optical system under test.

In each of the above-described embodiments, an example in which the reference axis $O_m$ of eccentricity measurement extends in the horizontal direction has been described. However, the extension direction of the reference axis $O_m$ is not limited to the horizontal direction. For example, the reference axis $O_m$ may extend in a direction intersecting the horizontal plane.

In each of the above-described embodiments, an example in which the moving mechanism includes the moving stage 2 and the optical image IP' moves toward the optical unit under test held on the holding table 4 along the reference axis $O_m$ has been described. However, it is only necessary for the moving mechanism to relatively move the optical image IP' to the optical unit under test along the reference axis $O_m$. For example, in the eccentricity measurement device 50, the main body portion 3 is fixed to the base 1 and a linear moving stage for moving the holder 4a, the holding table 4, and the like together with the optical unit under test may be provided as a moving mechanism instead of the moving stage 2. In this case, because the optical image IP' is stationary and the optical unit under test moves, the movement trajectory of the optical image IP' in the air is defined by a relative movement trajectory based on the optical unit under test.

Furthermore, if a movement accuracy that does not interfere with eccentricity measurement is obtained, both the optical measurement system and the optical unit under test may be movably supported by a moving mechanism that moves each of the optical measurement system and the optical unit under test.

In each of the above-described embodiments, an example in which the optical image IP' is moved in alignment with the surface top of the surface 43a under test every time the optical image IP' is moved to the projection position when the reference point is measured has been described. However, if the alignment with the surface top of the surface 43a under test is initially performed when the reference point is measured, the alignment with the surface top of the surface 43a under test may not be performed when a second reflected image is measured.

In each of the above-described embodiments, when the optical image IP' is aligned with the surface top of the surface 43a under test when the reference point is measured, the observation imager 44 is used to observe the optical image IP' and the surrounding image has been described in an example. However, when the optical image IP' can be aligned with the surface top of the surface 43a under test without observation by the observation imager 44, the observation imager 44 and the beam splitter 11 may be omitted.

In each of the above-described embodiments, an example when the set value L of the I-O distance is not 0 has been described. However, even if L=0, when the reflected image can be identified, similar eccentricity measurement may be performed using the set value L as 0. In this case, by projecting the optical image for measurement and performing eccentricity measurement using the movement trajectory of the projected optical image in the air as a reference axis, the eccentricity amount of the surface under test can be accurately and quickly measured without rotating the optical unit under test.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

Accordingly, the invention is not to be considered as being limited by the foregoing description, and is only limited by the scope of the appended claims.

For example, in the first and second embodiments, eccentricity measurement of the endoscope imager 42 similar to that in the third embodiment may be performed.

For example, in the first and second embodiments, eccentricity measurements of the frame member similar to those in the fourth embodiment may be performed. In this case, the frame member may include the aperture stop $S_A$ in the optical system 41A under test and the aperture stop $S_B$ in the optical system 41B under test.

INDUSTRIAL APPLICABILITY

According to each embodiment described above, it is possible to provide an eccentricity measurement method and an eccentricity measurement device capable of accurately and quickly measuring an amount of eccentricity of a surface under test without rotating an optical unit under test even if positions of apparent spherical centers of optical surfaces of the optical unit under test are close together.

REFERENCE SIGNS LIST

2 Moving stage (moving mechanism)
3 Main body portion
3a, 3aB Front wall
4 Holding table
5, 5A, 5B, 5C Measurement control unit (eccentricity amount calculation unit, reflection magnification measurement unit, reflection magnification measurement control unit)
10 Light source (light source unit)
12 Collimating lens (light source unit)
13 Adjustment lens (light source unit)
15 Objective lens (optical projection system, optical observation system)
16 Image-formation lens (optical observation system)
17 Measurement imager
18 Wedge prism
20 Optical measurement system
21 Adjustment lens drive unit
22 Wedge prism drive unit (reflection magnification measurement unit)
23a Display screen
24 Operation unit
40 Tip portion (optical unit under test)
40A Lens frame
41, 41B Optical system under test
42 Endoscope imager (imager under test)
43 Optical reference element
43a Surface under test
45 Frame member
45A Opening
45b Edge (front end edge of opening)
47, 47a, 47b Reference mark
50, 50A, 50B, 50C Eccentricity measurement device
101, 101A, 101C General control unit
101B General control unit (imager-under-test image acquisition unit)
102B Arithmetic processing unit (imager-under-test eccentricity calculation unit)
$b_{Px1}$ First horizontal line part (magnification measurement unit)
$b_{Py1}$ First vertical line part (magnification measurement unit)
$b_{Px2}$ Second horizontal line part (magnification measurement unit)
$b_{Py2}$ Second vertical line part (magnification measurement unit)
$b_{Py3}$ Third vertical line part (magnification measurement unit)
$C_{ref}$ Spherical center
$D_P$, $D_N$ Displacement
$E_{45}$ Edge
F, P Focal plane
F' Focal plane (observed surface)
F2 Parallel beam
I, $I_B$, $I_N$, $I_P$ Image surface (observation position)
IP Optical image (optical image for measurement)
$I_L$, IP' Optical image
$I_R$, $I_{RN}$, $I_{RP}$, $I_{Ra}$, $I_{Rb}$, $I_{Rc}$, $I_{Ri}$ Reflected image
$I_{RN}$ Negatively reflected image
$I_{RP}$, $I_{RP'}$ Positively reflected image
L I-O distance
Lm Measured value
$O_m$ Reference axis
$O_M$, GB Optical axis
P' Projection plane (projection position)
SC, SCi Apparent spherical center
si Apparent surface under test
Si, $Si_j$ Surface under test

The invention claimed is:

1. An eccentricity measurement method comprising:
a first step of providing an eccentricity measurement device configured to hold an optical unit under test having a surface under test, project an optical image for measurement onto the optical unit under test, and relatively linearly move the projected optical image to the optical unit under test and having a measurement imager configured to acquire an image of an observed surface orthogonal to a reference axis defined by a relative movement trajectory of the projected optical image in air for the optical unit under test;
a second step of identifying a position of a reference point corresponding to an intersection between the observed surface and the reference axis in the image acquired by the measurement imager;
a third step of arranging the optical unit under test on the reference axis;
a fourth step of projecting the optical image onto a projection position on the reference axis and forming a reflected image of the optical image reflected on the surface under test at an observation position set so that a distance from the projection position along the reference axis is a set value L;

a fifth step of arranging the observed surface at the observation position, capturing an image of the observed surface using the measurement imager, and acquiring a measurement image;

a sixth step of identifying an image of the reflected image at the observation position in the measurement image;

a seventh step of measuring an amount of positional deviation from the reference point of the identified image of the reflected image; and an eighth step of calculating an amount of eccentricity of an apparent spherical center of the surface under test for the reference axis on the basis of the amount of positional deviation.

2. The eccentricity measurement method according to claim 1,
wherein the optical unit under test has a plurality of surfaces under test,
wherein the fourth step, the fifth step, the sixth step, the seventh step, and the eighth step are executed by making the set value L of the distance constant with respect to each of the surfaces under test after the third step is executed, and
wherein the eccentricity measurement method further comprises a ninth step of calculating an amount of eccentricity of each of the surfaces under test for the reference axis on the basis of a value of the calculated amount of eccentricity of the apparent spherical center.

3. The eccentricity measurement method according to claim 2,
wherein the optical unit under test includes an optical system under test having a plurality of optical surfaces constituting the surface under test and an imager under test having an imaging surface arranged on an image surface of the optical system under test,
wherein the optical unit under test is arranged on the reference axis so that the optical image can be projected from a front side of the optical system under test in the third step, and
wherein the eccentricity measurement method further comprises:
a tenth step of calculating an amount of deviation ($Z_X$, $Z_Y$) from the reference axis on the imaging surface of an image generated on the imaging surface when the optical image has been positioned at a position optically conjugate to the imaging surface on the reference axis on the basis of the amount of eccentricity of the surface under test;
an eleventh step of projecting the optical image onto the position optically conjugate to the imaging surface on the reference axis, acquiring the image of the optical image by the imager under test, and measuring position coordinates ($I_X$, $I_Y$) of the image acquired by the imager under test represented in an imager-under-test coordinate system in the imaging surface; and
a twelfth step of calculating an amount of eccentricity of the imaging surface for the reference axis by calculating position coordinates ($I_{Xo}$, $I_{Yo}$) of an intersection between the reference axis and the imaging surface in the imager-under-test coordinate system from the amount of deviation ($Z_X$, $Z_Y$) and the position coordinates ($I_X$, $I_Y$).

4. The eccentricity measurement method according to claim 2,
wherein the optical unit under test includes an optical system under test having a plurality of optical surfaces constituting the surface under test and a frame member having an opening,
wherein at least each optical surface in front of a front end edge of the opening among the plurality of optical surfaces is used as the surface under test so that each amount of eccentricity is calculated in the ninth step, and
wherein the eccentricity measurement method further comprises:
a tenth step of arranging an imaging surface of the measurement imager at a position optically conjugate to the end edge of the opening by interposing an incidence-side optical system in front of the end edge within the optical system under test and acquiring an image of the end edge through the incidence-side optical system by the measurement imager; and
an eleventh step of calculating an apparent position of the end edge for the reference point on the basis of the image of the end edge; and
a twelfth step of calculating an amount of eccentricity of the end edge for the reference axis on the basis of the amount of eccentricity calculated in the ninth step and the apparent position measured in the eleventh step.

5. The eccentricity measurement method according to claim 2, further comprising a tenth step of selecting the projection position for use in measurement of the amount of positional deviation at each surface under test so that a distribution range in a direction along the reference axis is minimized until the fourth step is initially executed after the third step.

6. The eccentricity measurement method according to claim 3,
wherein the eccentricity measurement device includes a reference mark whose positional relationship associated with the reference axis is known in advance in a plane orthogonal to the reference axis in front of the optical system under test,
wherein the eccentricity measurement method further comprises:
a thirteenth step of imaging the reference mark by the imager under test after the third step and calculating an amount of rotation of the imager-under-test coordinate system for a reference line orthogonal to the reference axis in a plane orthogonal to the reference axis from an image of the imaged reference mark; and
a fourteenth step of correcting the amount of eccentricity in an observation coordinate system calculated in the ninth step to an amount of eccentricity based on the imager-under-test coordinate system on the basis of the amount of rotation, and
wherein the amount of eccentricity corrected in the fourteenth step is used as the amount of eccentricity of the surface under test in the tenth step.

7. The eccentricity measurement method according to claim 1, wherein the second step includes:
arranging an optical element including a spherical surface having a known radius of curvature on the reference axis;
moving the optical image on the reference axis, acquiring an image of a positively reflected image formed on a first observed surface with positive reflection magnification $\beta_P$ of the spherical surface by the measurement imager, and measuring the position of the image of the positively reflected image acquired by the measurement imager as position coordinates ($X_P$, $Y_P$) represented by an observation coordinate system in an imaging surface of the measurement imager;
moving the optical image on the reference axis, acquiring an image of a negatively reflected image formed on a second observed surface with negative reflection magnification $\beta_N$ of the spherical surface by the measurement imager, and measuring the position of the image of the negatively reflected image acquired by the measurement imager as position coordinates $(X_N, Y_N)$ represented in the observation coordinate system; and identifying position coordinates $(X_0, Y_0)$ obtained from the following Eqs. (c) and (d) as position coordinates of the reference point.

[Math. 1]

$$X_0 = \frac{X_P(1-\beta_N) - X_N(1-\beta_P)}{\beta_P - \beta_N} \quad (c)$$

$$Y_0 = \frac{Y_P(1-\beta_N) - Y_N(1-\beta_P)}{\beta_P - \beta_N}. \quad (d)$$

8. The eccentricity measurement method according to claim 7, wherein the radius of curvature of the spherical surface has a range of 50% to 200% of the set value L of the distance.

9. The eccentricity measurement method according to claim 1, wherein the second step includes:
arranging an optical element having a reflective surface including a spherical surface having a known radius of curvature or a plane on the reference axis;
projecting the optical image onto a projection position on the reference axis and forming a reflected image of the optical image reflected on the surface under test at an observation position set so that the distance from the projection position along the reference axis becomes 0;
moving the optical image on the reference axis, acquiring an image of a positively reflected image formed with positive reflection magnification $\beta_P$ of the reflective surface by the measurement imager at an observation position which is the same as the projection position of the optical image in a direction along the reference axis, and measuring the position of the image of the positively reflected image acquired by the measurement imager as position coordinates $(X_P, Y_P)$ represented by an observation coordinate system in an imaging surface of the measurement imager; and
identifying the position coordinates $(X_P, Y_P)$ as position coordinates of the reference point,
wherein the set value L of the distance is set to 0 in the fourth step.

10. The eccentricity measurement method according to claim 1, wherein the sixth step includes:
measuring lateral magnification of the observed image for the optical image indicated by an observed image formed by reflection of the optical image on the basis of the image of the observed surface acquired by the measurement imager; and
identifying the observed image from which the lateral magnification closest to a design value of reflection magnification of an apparent surface of the surface under test is measured as the reflected image.

11. The eccentricity measurement method according to claim 10,
wherein the fifth step includes:
acquiring the measurement image in a state in which the optical image is arranged on the reference axis; and
acquiring a reflected image identification image by shifting the optical image in a direction orthogonal to the reference axis, and wherein the sixth step includes:
measuring displacement in the observed surface of the observed image corresponding to an amount of shift of the optical image by comparing the measurement image with the reflected image identification image; and
measuring the lateral magnification indicated by the observed image from the amount of shift and the displacement.

12. The eccentricity measurement method according to claim 10,
wherein a magnification measurement unit configured to expand and contract the optical image in accordance with the reflection magnification of the apparent surface is provided, and
wherein the sixth step includes measuring the lateral magnification by measuring dimensions of the magnification measurement unit in the observed image in the measurement image.

13. The eccentricity measurement method according to claim 1, further comprising, before the amount of eccentricity of the apparent spherical center of the surface under test is calculated after the first step,
a ninth step of obtaining a measured value Lm by measuring the distance that has been set using an optical element including a reference surface including a spherical surface having a known radius of curvature; and
a tenth step of calculating reflection magnification of the surface under test using the measured value Lm instead of the set value L.

14. The eccentricity measurement method according to claim 13, wherein the ninth step includes:
arranging the optical element on the reference axis;
projecting the optical image onto a projection position on the reference axis and capturing an image of the observed surface of a positively reflected image reflected on the reference surface and formed at the observation position with positive reflection magnification at an observation position set so that a distance from the projection position along the reference axis is a set value L using the measurement imager;
projecting the optical image onto a projection position on the reference axis and capturing an image of the observed surface of a negatively reflected image reflected on the reference surface and formed at the observation position with negative reflection magnification at an observation position set so that a distance from the projection position along the reference axis is a set value L using the measurement imager;
calculating a ratio C of the positive reflection magnification to the negative reflection magnification on the basis of the image of the positively reflected image and the image of the negatively reflected image; and
obtaining the measured value Lm of the distance L on the basis of the following Eq. (a), wherein R denotes a radius of curvature of the reference surface.

[Math. 2]

$$L = \frac{-R^2(C+1)}{2\sqrt{-CR^2}}. \quad (a)$$

15. An eccentricity measurement device comprising:
a light source unit configured to form an optical image for measurement;
a holding table configured to hold an optical unit under test having a surface under test;
an optical projection system configured to project the optical image onto the optical unit under test;
a moving mechanism configured to movably hold at least one of the light source unit, the optical projection system, and the holding table and relatively linearly move the optical image projected from the optical projection system to the holding table in air;
a measurement imager configured to acquire an image of an observed surface orthogonal to a reference axis at an observation position set so that a distance from the projection position of the optical image on the reference axis is a set value L when a relative movement trajectory of the optical image for the holding table formed by the moving mechanism is set as the reference axis; and
an eccentricity amount calculation unit configured to measure an amount of positional deviation from a reference point corresponding to an intersection between the observed surface and the reference axis on the basis of the image acquired by the measurement imager at the observation position and calculate an amount of eccentricity of an apparent spherical center of the surface under test for the reference axis on the basis of the amount of positional deviation.

16. The eccentricity measurement device according to claim 15, further comprising:
an imager-under-test image acquisition unit configured to acquire an image from an imager under test when the optical unit under test has an optical system under test with a plurality of optical surfaces constituting the surface under test and the imager under test arranged on an image surface of the optical system under test in that order in a direction from the front closest to the optical projection system to the rear farthest from the optical projection system along the reference axis; and
an imager-under-test eccentricity calculation unit configured to calculate a position of the optical image on an imaging surface on the basis of an image acquired by the imager-under-test image acquisition unit when the optical image has been moved to a position optically conjugate to the imaging surface of the imager under test using the moving mechanism and calculate relative eccentricity between the optical system under test and the imager under test on the basis of a calculated value of the position.

17. The eccentricity measurement device according to claim 15, further comprising a reflection magnification measurement unit configured to measure lateral magnification of the observed image for the optical image indicated by an observed image formed by reflection of the optical image on the basis of an image in the observation position acquired by the measurement imager.

18. The eccentricity measurement device according to claim 17,
wherein a parallel optical path for forming a parallel beam is formed between the light source unit and the projection position along an optical path different from an optical path of an optical observation system in which the measurement imager is optically conjugate to the projection position, and
wherein the reflection magnification measurement unit includes:
a wedge prism inserted into the parallel optical path; and
a reflection magnification measurement control unit configured to cause the measurement imager to acquire an image at the observation position in a state in which the optical image is moved at the projection position by inserting the wedge prism into the parallel optical path and measure the lateral magnification indicated by the observed image on the basis of the image at the observation position.

19. The eccentricity measurement device according to claim 16, further comprising a reference mark whose positional relationship associated with the reference axis is known in advance in a plane orthogonal to the reference axis in a visual field range of the optical system under test.

* * * * *